United States Patent [19]

Matsunaga et al.

[11] Patent Number: 5,444,621
[45] Date of Patent: Aug. 22, 1995

[54] SUSPENSION CONTROL SYSTEM FOR CONTROLLING SUSPENSION OF AUTOMOTIVE VEHICLE BASED ON WHEEL SPEED DATA

[75] Inventors: Eiju Matsunaga, Anjo; Akira Fukushima, Kariya; Noriyuki Nakashima; Toshiyuki Murai, both of Nagoya; Shinya Takemoto, Chiryu; Mikio Tanabe, Kariya; Hisashi Kinoshita, Okazaki, all of Japan

[73] Assignee: Nippondenso Co., Ltd., Kariya, Japan

[21] Appl. No.: 896,930

[22] Filed: Jun. 10, 1992

[30] Foreign Application Priority Data

Jun. 10, 1991 [JP] Japan .................. 3-138009
Nov. 11, 1991 [JP] Japan .................. 3-294658
Mar. 19, 1992 [JP] Japan .................. 4-063916

[51] Int. Cl.⁶ .............. B60G 17/00; B60G 17/015
[52] U.S. Cl. .................. 364/424.05; 280/707; 280/840
[58] Field of Search ............ 364/424.05, 426.02, 364/426.01; 280/707, 688, 703, 840; 361/240; 324/160, 166; 180/902

[56] References Cited

U.S. PATENT DOCUMENTS

| | | | |
|---|---|---|---|
| 4,506,909 | 3/1985 | Nakashima et al. | 280/707 |
| 4,651,290 | 3/1987 | Masaki et al. | 364/550 |
| 4,722,547 | 2/1988 | Kishi et al. | 364/424.05 |
| 4,749,210 | 6/1988 | Sugasawa | 280/707 |
| 4,787,650 | 11/1988 | Doi et al. | 280/707 |
| 4,804,203 | 2/1989 | Glab et al. | 280/707 |
| 4,807,128 | 2/1989 | Ikemoto et al. | 364/424.05 |
| 4,939,656 | 7/1990 | Hoashi et al. | 364/426.02 |
| 4,989,148 | 1/1991 | Gurke et al. | 364/424.05 |
| 5,071,157 | 12/1991 | Majeed | 280/707 |
| 5,072,965 | 12/1991 | Wada et al. | 364/424.05 |
| 5,085,288 | 2/1992 | Shiraishi et al. | 180/197 |
| 5,124,917 | 6/1992 | Kanamori | 364/424.05 |
| 5,159,555 | 10/1992 | Wada | 364/424.05 |
| 5,161,816 | 11/1992 | Okuda et al. | 280/707 |
| 5,168,448 | 12/1992 | Matsumoto et al. | 364/424.05 |
| 5,172,319 | 12/1992 | Shiraishi et al. | 364/426.03 |
| 5,204,815 | 4/1993 | Yamamoto | 364/424.05 |

FOREIGN PATENT DOCUMENTS 58-112819 7/1983 Japan .

*Primary Examiner*—Kevin J. Teska
*Assistant Examiner*—Tyrone V. Walker
*Attorney, Agent, or Firm*—Cushman, Darby & Cushman

[57] ABSTRACT

A suspension control system capable of controlling a suspension of an automotive vehicle in such a manner as to improve the riding comfort and maneuverability of the vehicle without the need for many sensors is disclosed, in which a speed difference signal obtained by subtracting an estimated vehicle speed from a wheel speed is filtered with band-pass filters which pass sprung resonance frequency components and unsprung resonance frequency components, respectively. After amplification, the filtered speed difference are compared with a reference value so that a damping force of a shock absorber is set in accordance with a road surface condition. Since the damping force of the shock absorber is shifter by using only information based on the wheel speed detected by a wheel speed sensor, a total number of sensor to be mounted on the vehicle for controlling the suspension can be considerably reduced. The suspension control system is simple in construction and can be manufactured at a relatively low cost.

61 Claims, 52 Drawing Sheets

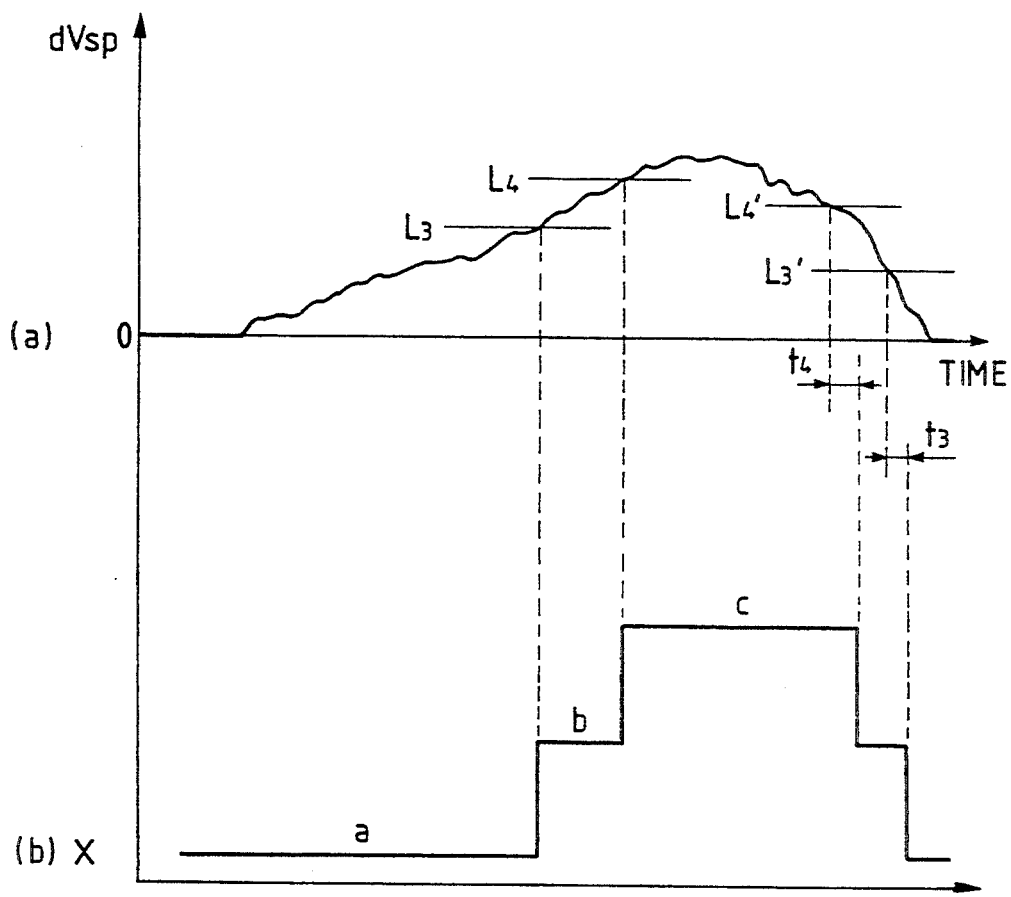

FIG. 27

|  | GOOD ROAD | BAD ROAD |
|---|---|---|
| CONSTANT SPEED (NORMAL) | 0.5 ~ 3Hz | 0.5 ~ 2Hz |
| ACCELERATED DECELERATED | 1 ~ 3Hz | 1 ~ 2Hz |

FIG. 28

|  | GOOD ROAD | BAD ROAD |
|---|---|---|
| CONSTANT SPEED (NORMAL) | PRIMARY | SECONDARY |
| ACCELERATED DECELERATED | SECONDARY | TERTIARY |

| $V_{W126}$ \ $V_{Wu26}$ | SMALL | GREAT |
|---|---|---|
| SMALL | A (GOOD) | B (WAVY) |
| GREAT | C (BUSY) | D (COMPLEX) | ns
SUSPENSION CONTROL SYSTEM FOR CONTROLLING SUSPENSION OF AUTOMOTIVE VEHICLE BASED ON WHEEL SPEED DATA

This application is generally related to U.S. Application of TSUTSUMI et al, application Ser. No. 07/580,388, filed Sept. 11, 1990.

BACKGROUND OF THE INVENTION

1. Field of the Invention

The present invention relates a suspension control system for controlling a suspension of an automotive vehicle.

2. Description of the Prior Art

There are known various suspension control systems in which the spring constant of a coil spring and the damping force of a shock absorber, that are incorporated in a suspension of an automotive vehicle, can be altered according to the road surface condition so that riding comfort is increased and maneuverability of the vehicle is improved.

The known suspension control systems, however, need various sensors for detecting the road surface condition. For example, a stroke sensor for detecting a relative displacement of the suspension, a sprung acceleration sensor for detecting the behavior of a sprung structure of the suspension, and many other sensors must be mounted on the vehicle. These sensors make the suspension control system complicated in construction as a whole, are likely to case problems when they are mounted on teh vehicle, and increase the production cost of the suspension control system.

SUMMARY OF THE INVENTION

It is accordingly a general object of the present invention to provide an improved suspension control system in which the above-mentioned disadvantages are eliminated.

A specific object of the present invention is to provide a suspension control system which includes a small number of sensors and hence is simple in construction and can be manufactured less costly, and is able to improve the riding comfort and maneuverability of the vehicle.

The present invention is based on the experimental findings that the wheel speed of an automotive vehicle is susceptible to change according to the road surface condition and the degree of change of the wheel speed is closely related to the roughness of a road surface on which the vehicle is running. This means that the road surface condition can be estimated from the wheel speed. It is also true that a sprung structure and an unsprung structure of a suspension will resonate in accordance with the road surface condition. In view of the foregoing findings, the present inventors have devised an improved suspension control system in which a road surface condition is detected on the basis of a wheel speed and, in accordance with the detected road surface condition, the stiffness of the suspension is altered so that the riding comfort and maneuverability of the vehicle are improved.

The above-mentioned objects of the present invention are achieved by a suspension control system for controlling a suspension of an automotive vehicle having a wheel, comprising: wheel speed detection means for detecting a rotational speed of the wheel of the vehicle and generating a wheel speed signal corresponding to the detected rotational speed of the wheel, the wheel speed signal containig a first resonance frequency component having a sprung resonance frequency of the suspension, and a second resonance frequency component having an sprung resonance frequency of the suspension; extraction means, coupled to the wheel speed detection means, for extracting at least one of the first and second resonance frequency components from the wheel speed signal; and altering means, coupled to the extraction means, for altering the stiffness of the suspension on the basis of said at least one resonance frequency component extracted by the extraction means.

With the suspension control system thus constructed, a wheel speed is detected and, based on the detected wheel speed, a signal containing at least one of a sprung resonant frequency component and an unsprung frequency component is outputted. From the signal thus outputted is extracted a signal containing a resonance frequency component based on which the stiffness of a suspension is altered.

The above and other objects, features and advantages of the present invention will become more apparent from the following description when making reference to the detailed description and the accompanying sheets of drawings in which preferred structural embodiments incorporating the principles of the present invention are shown by way of illustrative example.

BRIEF DESCRIPTION OF THE DRAWINGS

FIG. 20 is a graph illustrating the relationship between a road surface condition signal $dV_{SP}$ and a road surface judgement level x;

FIG. 21 is a map used for setting a damping force based on the long-term vibration judgment level x and the road surface judgement level x;

FIG. 27 is a diagram showing cutoff frequencies of filters;

FIG. 28 is a diagram showing the degree of filters;

DETAILED DESCRIPTION OF THE INVENTION

Certain preferred embodiments of the present invention will be described below in greater detail with reference to the accompanying drawings.

Figure 1:
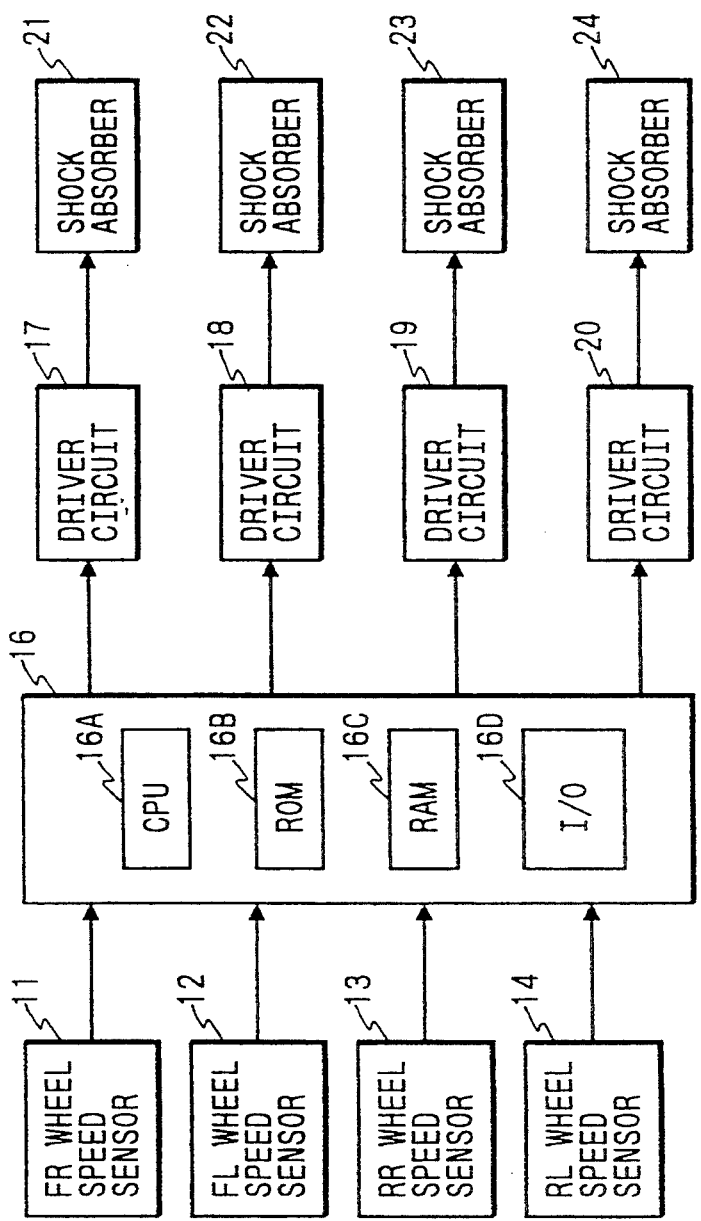
FIG. 1 is a block diagram showing the principle of a suspension control system according to a first preferred embodiment of the present invention.

FIG. 1 is a block diagram showing the general construction of a first embodiment of the invention, which embodiment is so constructed as to switch the damping force of each shock absorber for altering the stiffness of a suspension. In FIG. 1, numerals 11, 12, 13 and 14 are wheel speed sensors each producing a speed signal having a frequency proportional to the number of rotation of a corresponding one of a right front wheel (FR), a left front wheel (FL), a right rear wheel (RR) and a left rear wheel (RL). Numeral 16 is a microcomputer coupled with the wheel speed sensors 11-14 and outputs control signals to driver circuits 17-20. The microcomputer 16 is constructed as an arithmetic and logic unit including a central processing unit (CPU) 16A, a read-only memory (ROM) 16B, a random access memory (RAM) 16C, and an input/output unit (I/O) 16D that are well-known per se. When the control signals are inputted from the microcomputer 16 to the driver circuits 17-20, the driver circuits 17-20 drive actuators (not shown) to alter the damping force of shock absorbers 21, 22, 23 and 24.

The shock absorbers 21, 22, 23, 24 are of the type which is capable of changing its damping force between two states. Each of the shock absorbers 21-24 is provided between a vehicle body (not shown) and a suspension lower arm (not shown) for a corresponding one of the right front wheel (FR), left front wheel (FL), right rear wheel (RR) and left rear wheel (RL), together with a coil spring (not shown). The shock absorbers 21-24 each include a built-in piezoelectric load sensor and a piezoelectric actuator pair, as will be described later on. The piezoelectric road sensors in the shock absorbers 21-24 detect force exerted on the shock absorbers 21-24, respectively. The piezoelectric actuators in the shock absorbers 21-24 switch the setting of damping force generation patterns relative to the strokes of the respective shock absorbers 21-24.

A description will now be given of the shock absorbers 21-24. Since all the shock absorbers 21-24 are identical in construction, only the shock absorber 21 provided for the right front wheel (FR) is described for the sake of convenience. It will be noted that when there is no difference among the four shock absorbers 21-24, suffixes such as FR, FL, RR and RL are omitted.

Figure 2:
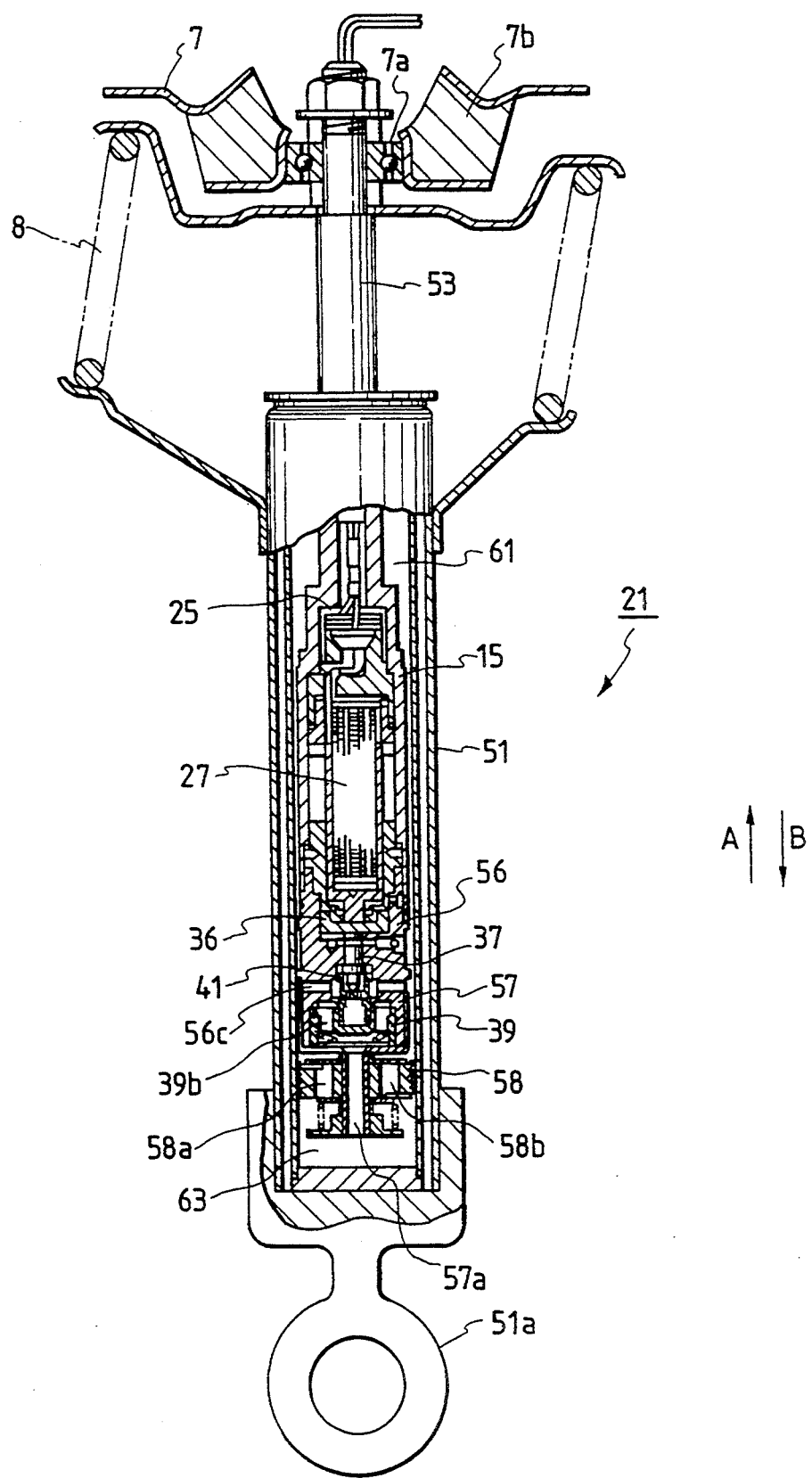
FIG. 2 is a partial cross-sectional view of a shock absorber of an automotive vehicle in which the suspension control system is installed.

As shown in FIG. 2, the shock absorber 21 is fixed to a suspension lower arm (not shown) through a wheel-shaft-side member 51a at a lower end of a cylinder 51. On the other hand, the shock absorber 21 is fixed, together with a coil spring 8, to a vehicle body 7 through a bearing 7a and a rubber cushion element 7b at an upper end of a rod 53 which penetrates into the cylinder 53.

Inside the cylinder 51, there are provided an internal cylinder 15, a connecting member 56 and a cylindrical member 57 which are coupled to the lower end of the rod 53, as well as a main piston 58 which is slidable along an inner surface of the cylinder 51. A piezoelectric load sensor 25 and a piezoelectric actuator 27 are accomodated in the internal cylinder 15 connected to the rod 53 of the shock absorber 21.

Figure 3:
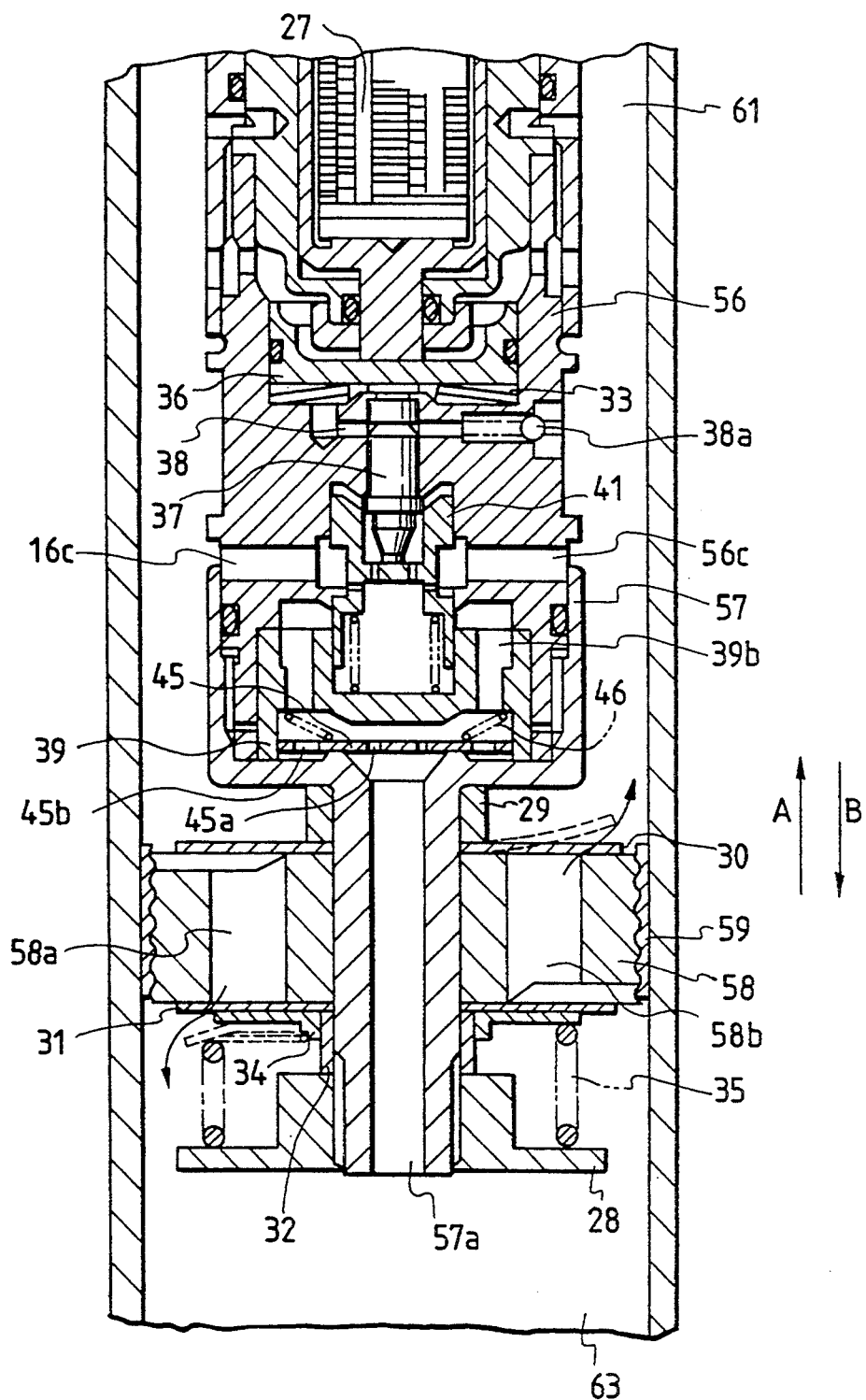
FIG. 3 is an enlarged cross-sectional view of a main part of the shock absorber.

The main piston 58 is provided outside of the cylindrical member 57 and engages therewith. A seal member 59 is provided between a circumferential outer surface of the main piston 58 and the inner surface of the internal cylinder 15. An internal space of the cylinder 51 is separated into a first fluid chamber 61 and a second fluid chamber 63 by the main piston 58. As shown in FIG. 3, a backup member 28 is threaded to the front end of the cylindrical member 57. The backup member 28 presses a spacer 29 and a leaf valve 30 against the cylindrical member 57 together with the main piston 58. In this state, the spacer 29 and the leaf spring 30 are fixed. A leaf valve 31 and a collar 32 are provided between the backup member 28 and the main piston 58. The lead valve 31 and the collar 32 are pressed against the backup member 28 and fixed thereto in this state. A main valve 34 and a spring 35 are interposed between the leaf valve 31 and the backup member 28. The main valve 34 and the spring 35 urge the leaf valve 31 toward the main piston 58.

In a state where the main piston 58 is in a stationary state, the leaf valves 30 and 31 close an expansion-side path 58a and a contraction-side path 58b provided in the main piston 58 on a single side of both the expansion-side path 58a and the contraction-side path 58b. The paths 58a and 58b are opened on respective single sides thereof in accordance with a movement of the main piston 58 indicated by the arrow A or B. Thus, a working fluid filled in the first and second fluid chamber 61 and 63 passes through one of the paths 58a and 58b so that it moves between the first fluid chamber 61 and the second fluid chamber 63. In a state where the movement of the working fluid between the first fluid chamber 61 and the second fluid chamber 63 is limited to the movement between the paths 58a and 58b, a damping force generated with respect to the movement of the rod 53 is great so that the characteristic of the suspension is "HARD".

As shown in FIGS. 2 and 3, both the piezoelectric load sensor 25 and the piezoelectric actuator 27 provided inside the internal cylinder 15 are electrostriction element laminated members in which thin plates formed of piezoelectric ceramics are laminated through electrodes. In other words, one electrode is elevationally sandwiched between two adjacent thin plates. Each of the piezoelectric thin plates in the piezoelectric load sensor 25 is polarized due to a force exerted on the shock absorber 21, that is a damping force. An electrical output signal from each of the piezoelectric thin plates in the piezoelectric load sensor 25 is supplied to an impedance circuit, which generates a voltage signal. Thus, it is possible to obtain a rate of change of the damping force from the voltage signal related to each of the piezoelectric thin plate.

The piezoelectric actuator 27 has laminated electrostriction elements, each of which expands or contracts with a high response characteristic when a high voltage is applied thereto. The piezoelectric actuator 27 directly drives a piston 36. When the piston 36 is moved in the direction indicated by the arrow B shown in FIG. 3, a plunger 37 and a spool 41 having a substantially H-shaped cross section are moved in the same direction through the movement of the working fluid in an oil-tight chamber 33. When the spool 41 is moved from the position shown in FIG. 3 (original position) in the direction of the arrow B, a sub fluid path 56c connected to the first fluid chamber 61 and a sub fluid path 39b in a bush 39 connected to the second fluid chamber 63 become connected to each other. The sub fluid path 39b further becomes connected to a fluid path 57a in the cylindrical member 57 through an oil hole 45a formed in a plate valve 45. Thus, the movement of the spool 41 in the direction of the arrow B causes an increase in the amount of working fluid which is transferred between the first fluid chamber 61 and the second fluid chamber 63. In other words, when the piezoelectric actuator 27 expands with the high-voltage applied thereto, the damping characteristic of the shock absorber 21 is altered from a large damping force ("HARD") state to a small damping force ("SOFT") state. When the piezoelectric actuator 27 is discharged so that no charge is stored therein, the damping characteristic of the shock absorber 21 is returned to the "HARD" state.

The degree of movement of the leaf valve 31 provided on the lower surface of the main piston 58 is controlled by the spring 35 in comparison with the leaf valve 30. An oil hole 45b having a diameter greater than that of the oil hole 45a is formed in the plate valve 45 at a position farther from the center of the plate valve 45 than the oil hole 45a. When the plate valve 45 moves toward the bush 39 against the force of the spring 46, the working fluid is allowed to move through the oil hole 45b. Thus, the amount of working fluid obtained when the main piston 58 moves in the direction of the arrow B is greater than that obtained when the main position 58 moves in the direction of the arrow A, irrespective of the position of the spool 41. That is, the damping force is altered due to the movement direction of the main piston 58 so that improved characteristics of the shock absorber can be obtained. An oil refilling path 38 is provided together with a check valve 38a between the oil-tight chamber 33 and the first fluid chamber 61 so that the amount of working fluid in the oil tight chamber 33 is fixed.

Figure 4:
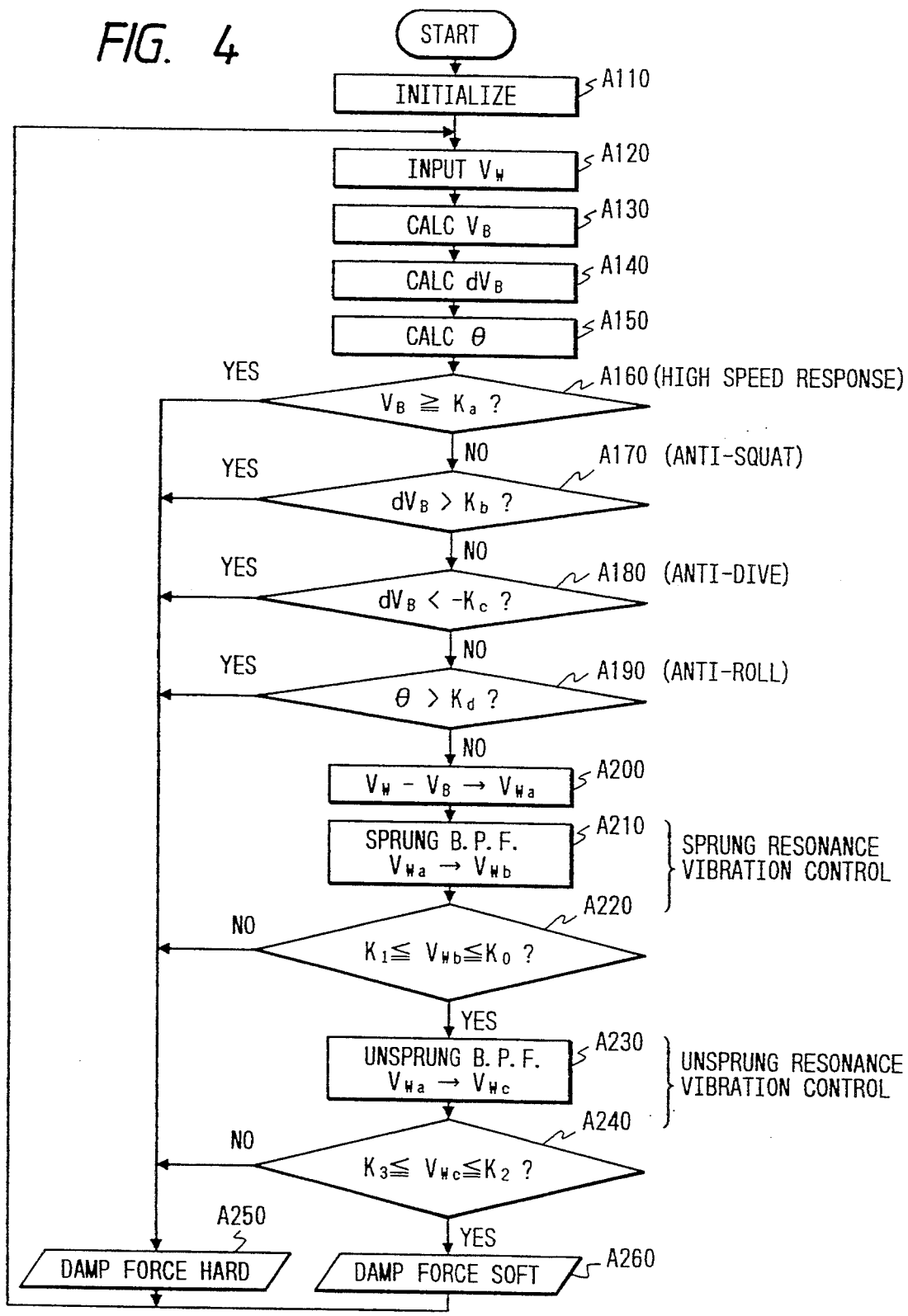
FIG. 4 is a flowchart illustrating the operation of the suspension control system according to the first embodiment of the present invention.

FIG. 4 is a flowchart illustrating a shock-absorber damping force control procedure (routine) executed by the microcomputer 16 based on the outputs of the wheel speed sensors 11-14. This control procedure (routine) is performed independently with respect to each of the shock absorbers 21-24 of the respective wheels. Since the control procedure (routine) is common to all the wheels, the control procedure (routine) will be described below without distinction of individual wheels.

At first, when an ignition key switch to the microcomputer 16 is closed, the microcomputer 16 achieves initialization at step A110. Then, step A120 reads or inputs a wheel speed $V_W$. Subsequently, step A130 computes an estimated vehicle speed $V_B$ of the vehicle based on the input wheel speed $V_W$. More concretely, the maximum value among four wheel speeds is used for the estimated vehicle speed $V_B$, in the same manner as done in an anti-skid control operation. Alternatively, taking into account of a condition where the vehicle is making a turn, the average value of left and right wheel speeds may be set to the estimated vehicle speed $V_B$.

Step A140 computes acceleration $dV_B$ in a longitudinal direction (i.e., moving direction) of the vehicle body based on the estimated vehicle speed $V_B$ computed at step A130. The acceleration $dV_B$ is used as a judgment signal for discerning a sign of the occurrence of anti-squat and anti-dive motions, as described later. The acceleration $dV_B$ may be computed either by obtaining a rate of change of the estimated vehicle speed $V_B$ computed at step A130, or alternatively from a rate of change of the wheel speed $V_W$ inputted at step A120, as disclosed in Japanese Patent Publication No. 1-47324.

Then, step A150 estimates a steering angle $\theta$ from the difference between the left and right wheel speeds. The steering angle $\theta$ is calculated in accordance with the following equation.

$$\theta = \frac{N \cdot L}{W} \cdot \frac{V_{WFR} - V_{WFL}}{V_B} \cdot \frac{180}{\pi} \cdot (1 + K \cdot V_B^2) \quad (1)$$

where N is the steering gear ratio, L is the wheel base, W is the tread, K is the stability factor, $V_{WFR}$ is the wheel speed of right front wheel, and $V_{WFL}$ is the wheel speed of left front wheel.

In this embodiment, the steering angle $\theta$ is estimated and computed by a speed difference between two front wheels, however, it is possible to estimate the steering angle $\theta$ through a calculation based on a speed difference between two rear wheels.

After the wheel speed $V_W$, estimated vehicle speed $V_B$, acceleration $dV_B$ and steering angle $\theta$ are obtained at steps A120-A150, respectively, the control procedure advances to step A160 onward.

Step A160 compares the estimated vehicle speed $V_B$ with a reference value $K_a$ for judging whether or not a high speed response operation is necessary. If $V_B \geq K_a$, it is judged that the vehicle is running at a high speed. Then, the control procedure advances to step A250 at which the damping force of the shock absorber is set to the hard state so that it is possible to improve the stability of the vehicle running at high speeds. On the other hand, if $V_B < K_a$, then the control procedure proceeds to step A170.

Step A170 compares the acceleration $dV_B$ with a reference value $K_b$ for judging whether or not an anti-squat control operation is necessary. If $dV_B > K_b$, it is judged that the vehicle is in a suddenly accelerated condition. Then, the control procedure advances to step A250. Thus, the damping force of the shock absorber is set to the hard state so that the vehicle body is prevented from squatting or tilting backward. On the other hand, if $dV_B \leq K_b$, the control procedure proceeds to step A180.

Step A180 compares the acceleration $d_{VB}$ with a reference value $-K_c$ for judging whether or not an anti-dive control operation is necessary. If $dV_B < -K_c$, it is judged that the vehicle is in a suddenly decelerated condition. Then, the control procedure advances to step A250 at which the damping force of the shock absorber is set to the hard state so that the vehicle body is prevented from diving or tilting forward. On the other hand, if $dV_B \geq -K_c$, the control procedure proceeds to step A190.

Step A190 compares the steering angle $\theta$ with a reference value $K_d$ for judging whether or not an anti-roll control operation is necessary. If $d\theta > K_d$, it is judged that the vehicle is rolling. Then, the control procedure advances to step A250 at which the damping force of the shock absorber is set to the hard state, so that the rolling of the vehicle body is prevented. On the other hand, if $\theta \leq K_d$, the control procedure proceeds to step A200.

Figure 6:
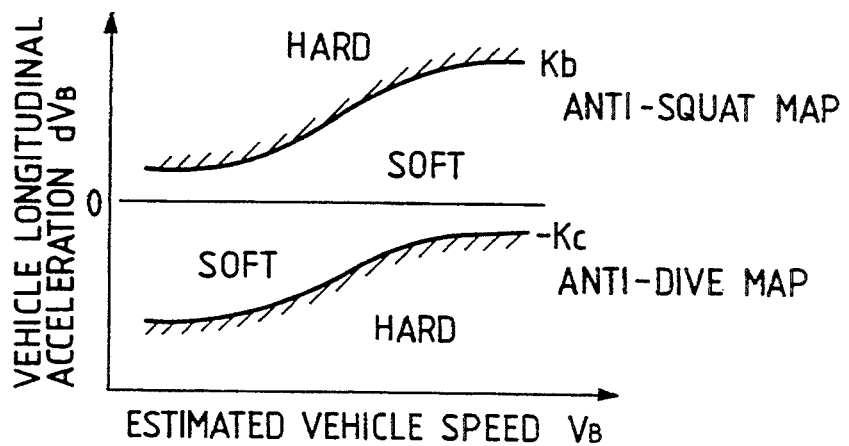
FIG. 6 is a graph used for setting reference values $K_b$ and $K_c$.
Figure 7:
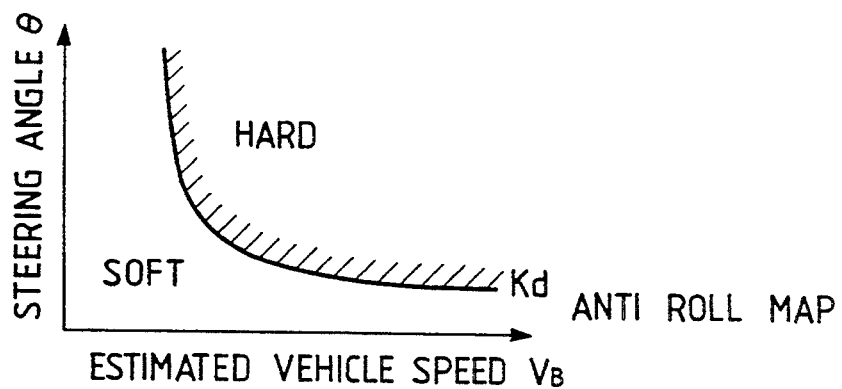
FIG. 7 is a graph used for setting a reference value $K_d$.
Figure 8:
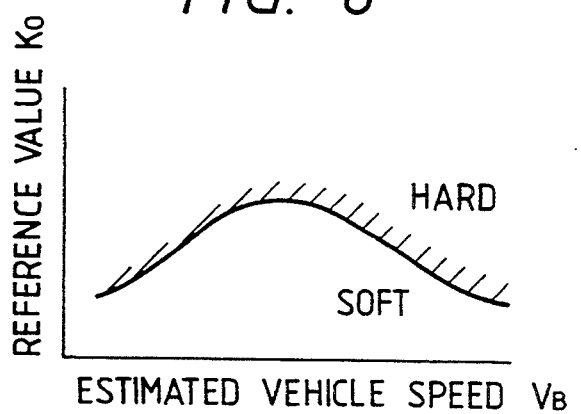
FIG. 8 is a graph used for setting a reference value $K_0$.
Figure 9:
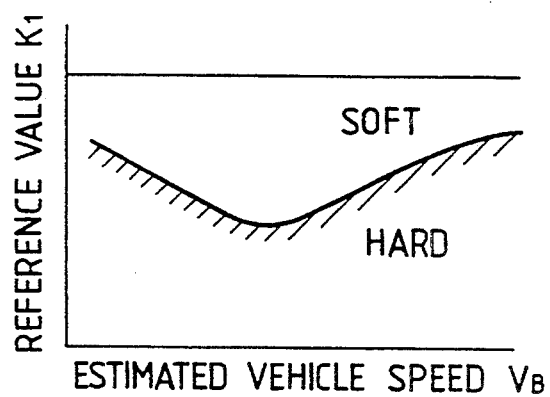
FIG. 9 is a graph used for setting a reference value $K_1$.
Figure 10:
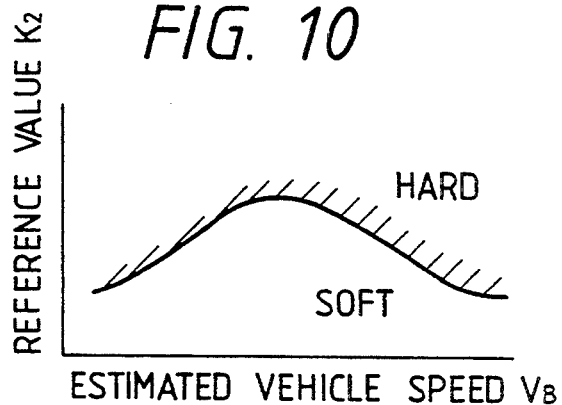
FIG. 10 is a graph used for setting a reference value $K_2$.
Figure 11:
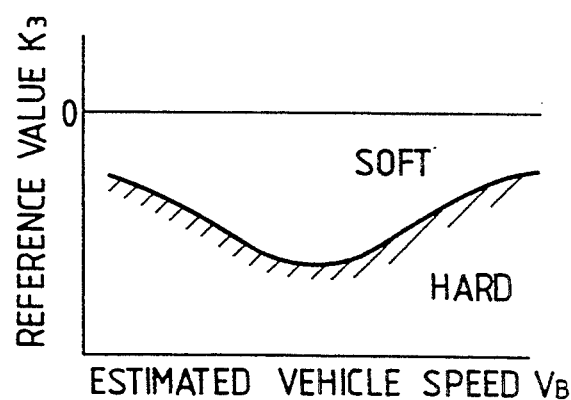
FIG. 11 is a graph used for setting a reference value $K_3$.

The reference value $-K_c$ used at step A170 and the reference value $K_d$ used at step A180 may be fixed values, or alternatively they may be determined by using maps which are prepared in conjunction with the estimated vehicle speed $V_B$, as shown in FIGS. 6 and 7.

Steps A200–A240 estimate the roughness of a road surface from a change of the wheel speed, in order to control the damping force of the shock absorber.

At first, step A200 computes a speed difference $V_{Wa}$ by subtracting the estimated vehicle speed $V_B$ from the wheel speed $V_W$ in accordance with the following equation (2).

$$V_{Wa} = V_W - V_B \qquad (2)$$

This procedure is achieved to remove an offset value which is produced by the vehicle speed when a variation of the wheel speed caused by a roughness on a road surface is to be extracted.

Figure 5:
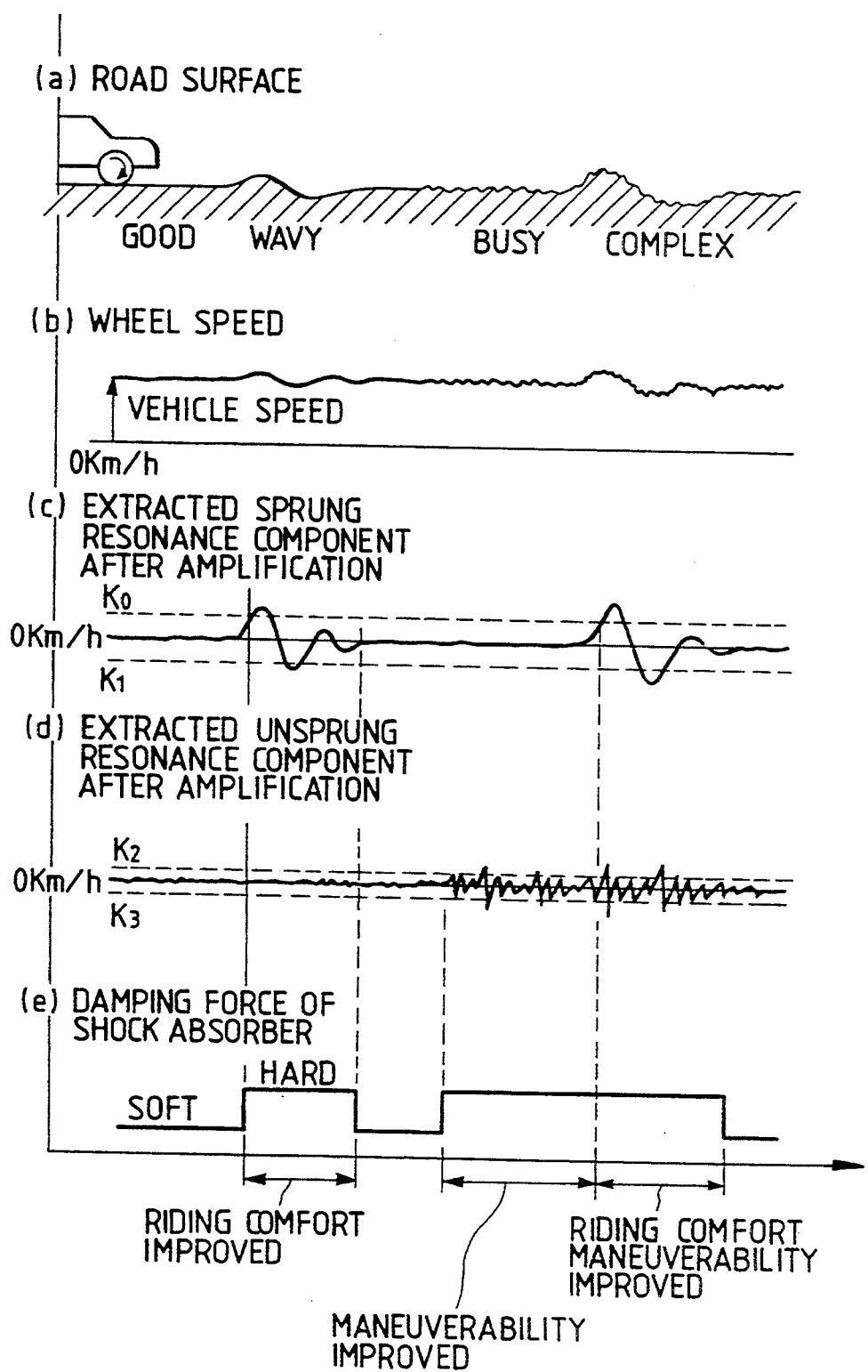
FIG. 5 is a diagram illustrating how to control the suspension according to the first embodiment of the present invention.

Subsequently, Steps A210 and A220 are executed in succession for controlling the sprung vibrations. This sprung vibration control operation is performed to suppress or dampen a "long-term vibration" which will occur due to the presence of a roughness on a road surface such as on an undulated or wavy road surface. The long-term vibration of the automative vehicle has a long term approximately equal to one second and causes a car sickness. The frequency of the long-term vibration is substantially equal to a sprung resonance frequency (about 1.0–2.0 Hz). At step A210, the speed difference $V_{Wa}$ signal is subjected to a band-pass filtering process using a band-pass filter which passes components having frequencies around a sprung resonance frequency in the range of 1 to 2 Hz. After the band-pass filtering process, the speed difference signal is amplified and thus a filtered speed difference $V_{Wb}$ is computed. The thus computed filtered speed difference $V_{Wb}$ is as shown in FIG. 5(c). Then, the control procedure proceeds to step A220 at which the filtered speed difference $V_{Wb}$ is compared with two reference values $K_0$ and $K_1$. In this instance, when $K_0 < V_{Wb}$ or $K_1 > V_{Wb}$, it is judged that the vehicle is continuously running on a wavy road and a complex road such as shown in FIG. 5(a). Then, the control procedure goes on to step A250 at which the damping force of the shock absorber is set to the hard state as shown in FIG. 5(a) so that the long-term vibration of the vehicle is suppressed and, hence, the riding comfort of the vehicle is improved. On the other hand, if $K_1 \leq V_{Wb} \leq K_0$, the control procedure proceeds to step A230.

At step A230, the speed difference $V_{Wa}$ signal is subjected to a filtering process using a band-pass filter which components having frequencies around an unsprung resonance frequency in the range of 10 to 15 Hz. After the filtering process, the speed difference signal is amplified and thus a filtered speed difference $V_{Wc}$ is computed. The thus computed filtered speed difference $V_{Wc}$ is as shown in FIG. 5(d). Then, the control procedure proceeds to step A240 at which the filtered speed difference $V_{Wc}$ is compared with two reference values $K_2$ and $K_3$. In this instance, when $K_2 < V_{Wc}$ or $K_3 > V_{Wc}$, it is judged that the vehicle is continuously running on a busy road and a complex road such as shown in FIG. 5(a) and, hence, an unsprung vibration is great. In this instance, the control procedure advances to step A250 at which the damping force of the shock absorber is set to the hard state as shown in FIG. 5(e) so that the road holding characteristic of the tires is improved and thus the maneuvering stability of the vehicle increases. On the other hand, if $K_3 \leq V_{Wb} \leq K_2$, the control procedure proceeds to step A260 at which the damping force of the shock absorber is set to the soft state.

Step A250 has a timer counter which sets a predetermined period of time T (that is, T=T) when a damping force of the shock absorber is set to the hard state. Thus, once a damping force of the shock absorber is set to the hard state, this hard-state setting continues at least for the predetermined time period T. Even the result of judgment at step A240 is YES, the damping force of the shock absorber is continuously set on the hard state unless the timer counter T is reset to 0 (zero).

Figure 12:
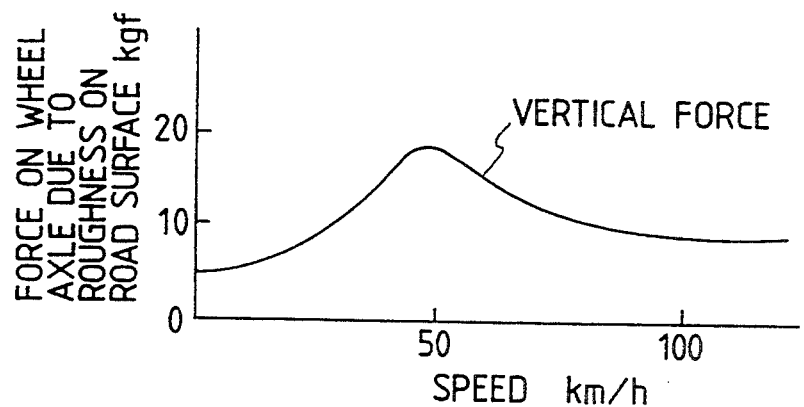
FIG. 12 is a graph showing the relationship between a vehicle speed and force exerted on an axle due to a roughness on a road surface.

The reference values $K_0$, $K_1$, $K_2$ and $K_3$ may be fixed values. Alternatively, in view of the fact that a force exerted on a wheel axle due to irregularities on a road surface depends on the vehicle speed (see, FIG. 12), these reference values may be determined on the basis of the estimated vehicle speed $V_B$ with the use of maps such as shown in FIGS. 8 through 11.

After the setting of the damping force of the shock absorber has completed at step A250 or step A260, the control procedure returns to step A120.

As described above, in the suspension control system according to the first embodiment of this invention, a speed difference signal $V_{Wa}$ obtained by subtracting an estimated vehicle speed $V_B$ from a wheel speed $V_W$ is subjected to first and second filtering processes to extract a first signal containing sprung resonance frequency components and a second signal containing unsprung resonance frequency component. These signals are amplified and first and second filtered speed difference signals $V_{Wb}$ and $V_{Wc}$ are obtained. Each of the filtered speed difference signals $V_{Wb}$ and $V_{Wc}$ is compared with two reference values so that the damping force of the shock absorber is set in accordance with to the road surface condition. For instance, when the vehicle is running continuously on a wavy road and a complex road shown in FIG. 5(a), a sprung structure of the vehicle will resonate greatly with the result that the filtered speed difference $V_{Wb}$ obtained by the band-pass filtering process for the sprung resonance frequency components has a great absolute value, as shown in FIG. 5(c). Thus, the filtered speed difference $V_{Wb}$ exceeds the reference values, as shown in FIG. 5(c) with the result the damping force of the shock absorber is set to the hard state for a predetermined period of time, as shown in FIG. 5(e). On the other hand, when the vehicle is running continuously on a busy road and a complex road such as shown in FIG. 5(a), an unsprung structure of the vehicle resonates greatly and, hence, the filtered speed difference $V_{Wc}$ obtained after the band-pass filtering process for the unsprung resonance frequency components has a great absolute value, as shown in FIG. 5(d). As a result, the filtered speed difference $V_{Wc}$ exceeds the reference values, as shown in FIG. 5(d) so that the damping force of the shock absorber is set to the hard state for the predetermined period of time, as shown in FIG. 5(e). In the first embodiment described above, the damping force of the shock absorber is switched only by means of information based on the wheel speed detected by the wheel speed sensor, so that the riding comfort and running stagbility of the vehicle are improved.

A description will now be given of a suspension control system according to a second preferred embodiment of the present invention.

Figure 13:
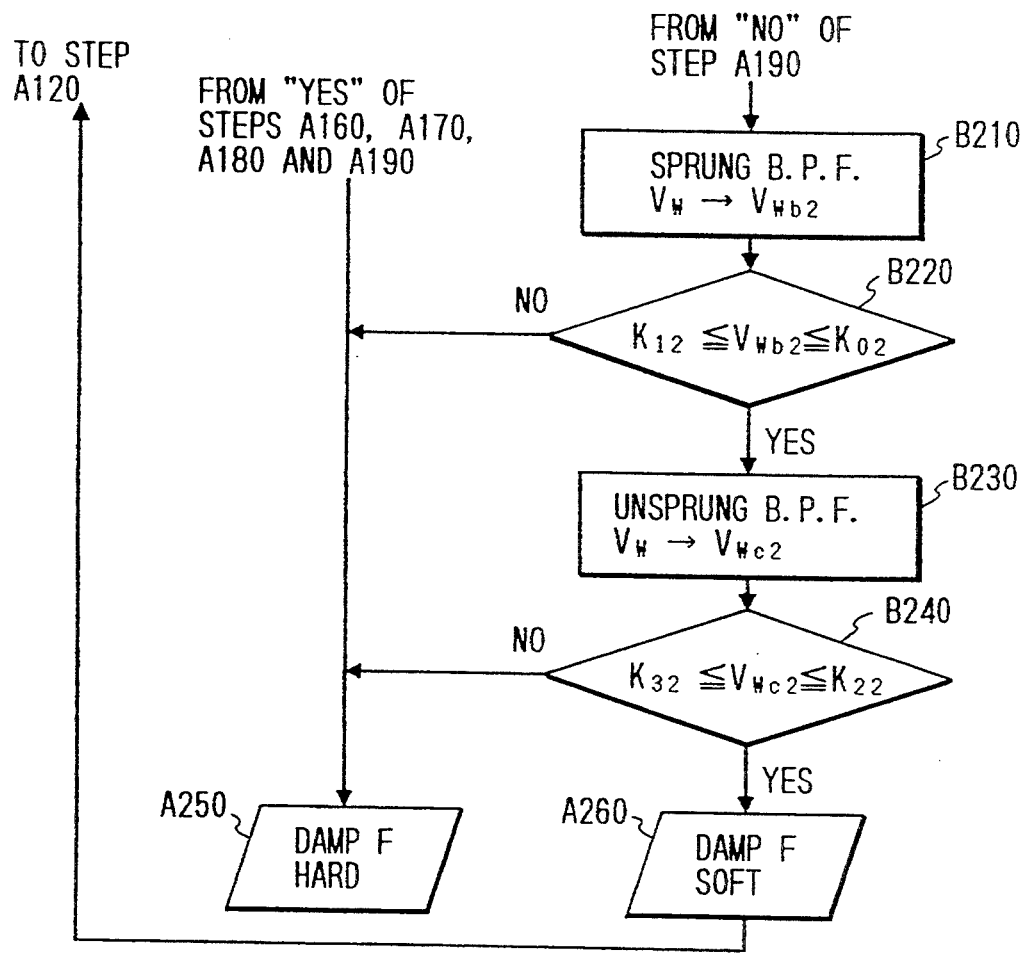
FIG. 13 is a flowchart illustrating a main portion of a control operation according to a second preferred embodiment of the present invention.

In the first embodiment described above, in order to extract both of the sprung and unsprung resonance frequency components, the speed difference signal $V_{Wa}$ obtained by subtracted the estimated vehicle speed $V_B$ from the wheel speed $V_W$ is subjected to two filtering processes using a band-pass filter for sprung resonance frequency components and a band-pass filter for unsprung resonance frequency components. After the band-pass filtering process, the speed difference signal is amplified and thus a filtered speed difference signal is computed. As against the first embodiment, the second embodiment is characterized in that in place of steps A200-A240 shown in FIG. 4, the wheel speed $V_W$ is directly subjected to a band-pass filtering process effected with respect to each of the sprung vibration and the unsprung vibration, as shown in FIG. 13. A description given below is limited to these features shown in FIG. 13 which are different from those shown in FIG. 4.

As shown in FIG. 13, at step B120, the wheel speed $V_W$ signal is subjected to a band-pass filtering process using a band-pass filter passing sprung resonance frequency components having frequencies in the range of 0.3 to 3 Hz. After the filtering process, the wheel speed signal is amplified and thus a filtered wheel speed $V_{Wb2}$ is computed. Then, the control procedure proceeds to step B220 at which the filtered wheel speed $V_{Wb2}$ is compared with two reference values $K_{02}$ and $K_{12}$. In this instance, when $K_{02} < V_{Wb2}$ or $K_{12} > V_{Wb2}$, it is judged that the vehicle is running on a wavy road and a complex road, and based on this judgment, the control procedure advances to step A250. At step A250, the damping force of the shock absorber is set to the hard state so that a long-term vibration of the vehicle is suppressed. Thus, the riding comfort of the vehicle is improved. On the other hand, if the result at step B220 is $K_{12} \leq V_{Wb2} \leq K_{02}$, the control procedure proceeds to step B230.

At step B230, the wheel speed $V_W$ signal is subjected to a band-pass filtering process using a band-pass filter which passes unsprung resonance frequency components having frequencies in the range of 10 to 15 Hz. After the filtering process, the wheel speed signal is amplified and thus a filtered wheel speed $V_{Wc2}$ is computed. Then, the control procedure proceeds to step B240 at which the filtered wheel speed $V_{Wc2}$ is compared with two reference values $K_{22}$ and $K_{32}$. In this instance, if $K_{22} < V_{Wc2}$ or $K_{32} > V_{Wc2}$, it is judged that the vehicle is running on a busy road and a complex road and, hence, an unsprung structure is vibrating greatly. Based on this judgment, the control procedure advances to step A250 at which the damping force of the shock absorber is set to the hard state so that it is possible to improve the road holding characteristic of the tires and increase the maneuvering stability of the vehicle. On the other hand, if $K_{32} \leq V_{Wb2} \leq K_{22}$, the control procedure proceeds to step A260 at which the damping force of the shock absorber is set to the soft state.

The reference values $K_{02}$, $K_{12}$, $K_{22}$ and $K_{32}$ may be fixed values or may be determined based on the estimated vehicle speed $V_B$.

A description will now be given of a suspension control system according to a third preferred embodiment of the present invention. In this embodiment, these procedures executed after step A220 are modified in a manner as shown in FIG. 14.

Figure 14:
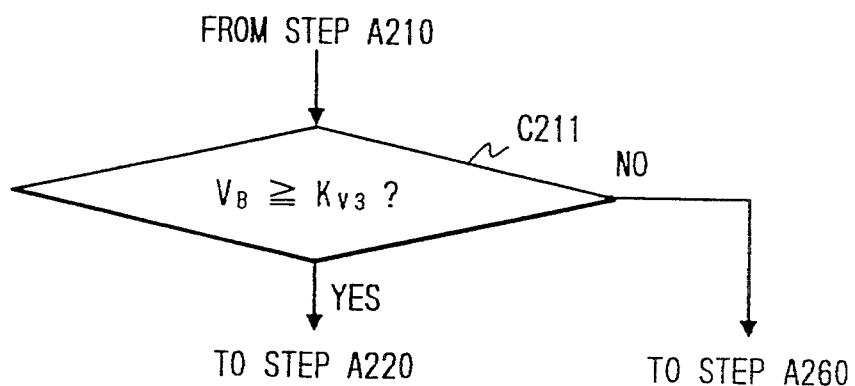
FIG. 14 is a flowchart illustrating a main portion of a control operation according to a third preferred embodiment of the present invention.

As shown in FIG. 14, step A210 is followed by step C211. Step C211 judges whether or not the estimated vehicle speed $V_B$ is greater than or equal to a predetermined value $K_{V3}$ (for example, 20 km/h). When the result at step C211 is YES, then the control procedure goes on to step A220. On the other hand, if the result at step C211 is NO, then the control procedure advances to step A260 at which the damping force of the shock absorber is set to the soft state. To this end, even when the vehicle is running on a wavy road. if the running speed is low and hence vertical movement of the vehicle is small, then the judgment at step A220 is skipped and at step A260, the damping force of the shock absorber is set to the soft state. Thus, the riding comfort of the vehicle during a low-speed running (and at the vehicle's take-off time, in particular) is improved.

A description will now be given of a suspension control system according to a fourth preferred embodiment of the present invention. The suspension control system according to this embodiment partly differs in operation from that of the first embodiment described above with reference to the flowchart shown in FIG. 4. More specifically, the procedures executed at steps A200-A240 shown in FIG. 4 are replaced by the procedures shown in FIG. 15.

Figure 15:
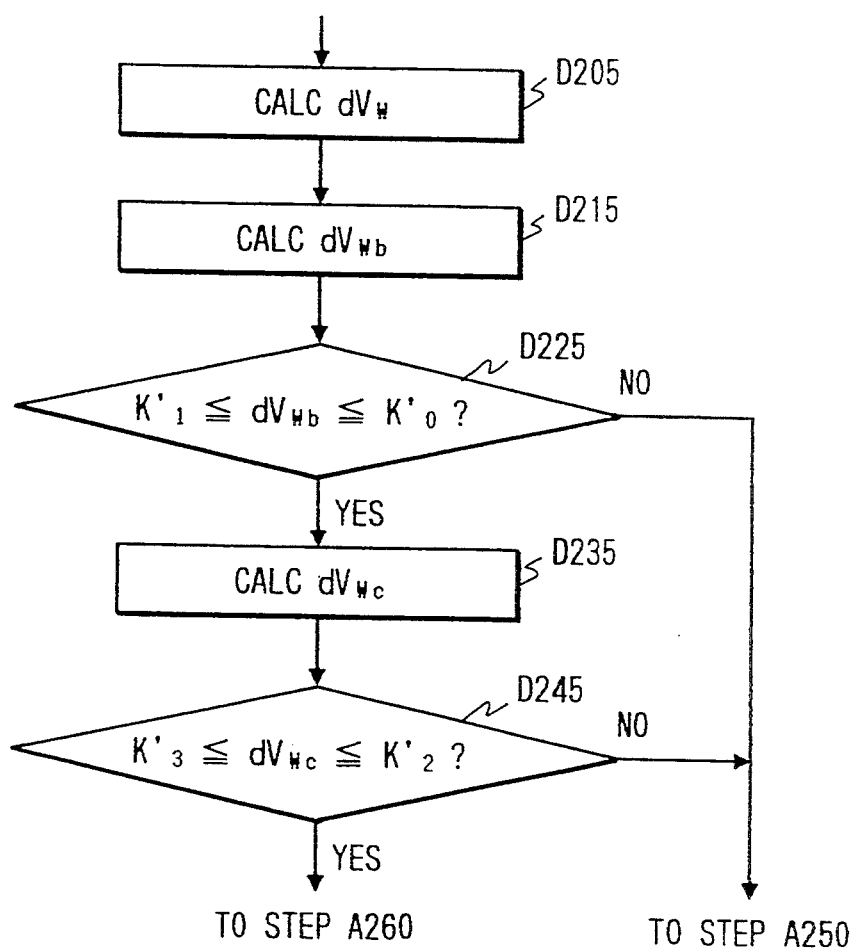
FIG. 15 is a flowchart illustrating a main portion of a control operation according to a fourth preferred embodiment of the present invention.
Figure 16:
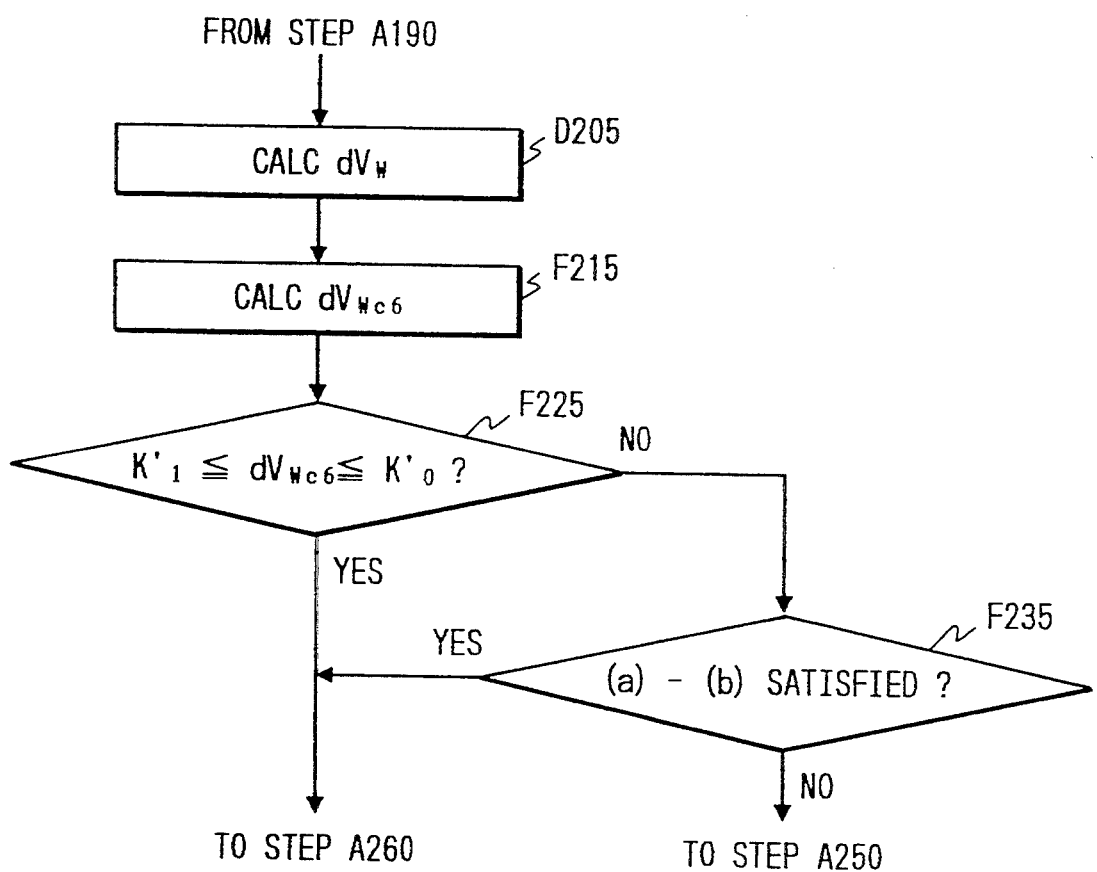
FIG. 16 is a flowchart illustrating a main portion of a control operation according to a fifth preferred embodiment of the present invention.

As shown in FIG. 15, step D205 computes an angular acceleration $dV_W$ of the wheel on the basis of the wheel speed $V_W$ calculated at step A120. In this instance, computation is carried out by obtaining a rate of change of the wheel speed $V_W$.

Then, at steps D215 and D225, a sprung vibration control process is executed in the same manner as done in the first embodiment described above. At step D215, the angular acceleration $dV_W$ signal is subjected to a band-pass filtering process using a band-pass filter which passes sprung resonance frequency components having frequencies in the range of 1 to 2 Hz. With this filtering process, a filtered angular acceleration $dV_{Wb}$ is computed. Then, the control procedure advances to step D225 at which the filtered angular acceleration $dV_{Wb}$ is compared with two reference values $K_0'$ and $K_1'$. In this instance, if $K_0' < dV_{Wb}$ or $K_1' > dV_{Wb}$, it is judged that the vehicle is running on a wavy road and, based on this judgment, the control procedure goes on to step A250. At the step A250, the damping force of the shock absorber is set to the hard state so that the occurrence of a long-term vibration is suppressed. On the other hand, if the result at step D225 is $K_1' \leq dV_{Wb} \leq K_0'$, the control procedure advances to step D235.

At step D235, the angular acceleration $dV_W$ signal is subjected to a band-pass filtering process using a band-pass filter which passes unsprung resonance frequency components having frequencies in the range of 10-15 hz. Thus, a filtered angular acceleration $dV_{Wc}$ is computed. Then, the control procedure advances to step D245 at which the filtered angular acceleration $dV_{Wc}$ is compared with two reference values $K_2'$ and $K_3'$. In this instance, if $K_2' < dV_{Wc}$ or $K_3' > dV_{Wc}$, it is judged that unsprung vibrations of the vehicle are great and, based on this judgment, the control procedure goes on to step A250. At step A250, the damping force of the shock absorber is set to the hard state with the result that the road holding characteristic of the tires is improved and the steering stability of the vehicle is increased. On the other hand, if the result at step D245 is $K_3' \leq dV_{Wc} \leq K_2'$, the control procedure advances to step A260 at which the damping force of the shock absorber is set to the soft state.

The reference values $K_0'$, $K_1'$, $K_2'$ and $K_3'$ may be fixed values. Alternatively, they may be determined based on the estimated vehicle speed $V_B$ in the same manner as done in the first embodiment because a force exerted on the wheel axle due to the presence of a roughness on a road surface depends on the vehicle speed.

After the damping force of the shock absorber is set at step A250 or A260, the control procedure returns to step A120.

As described above, according to the fourth embodiment, each of the filtered angular accelerations $dV_{Wb}$ and $dV_{Wc}$ are compared with two reference values for setting the damping force of the shock absorber in accordance with the road surface condition. Accordingly, likewise the first embodiment, the fourth embodiment is also able to switch the damping force of the shock absorber to improve the riding comfort and driving stability by using only information based on the wheel speed detected by the wheel sensor.

In the fourth embodiment, step D245 may be replaced by a bad road judgment process which is disclosed in Japanese Patent Laid-open Publication No. 60-596. In this instance, if the known bad road judgment judges the current road surface condition as a bad road, the control procedure advances to step A250 and, hence, the damping force of the shock absorber is set to the hard state. On the other hand, when the result of the bad road judgment indicates a road surface condition other than the bad road, then the control procedure goes on to step A260 at which the damping force of the shock absorber is set to the soft state.

A suspension control system according to a fifth preferred embodiment of the present invention will be given below in conjunction with the fourth embodiment. In the fourth embodiment, a band-pass filtering process using an unsprung band-pass filter passing unsprung resonance components having frequencies in the range of 10 to 15 Hz is effected against the angular acceleration $dV_W$ signal to compute a filtered angular acceleration $dV_{Wc}$, as described above with reference to step D235 shown in FIG. 15. Unlike the fourth embodiment, according to the fifth embodiment, the angular acceleration $dV_W$ signal is subjected to a band-pass filtering process using a band-pass filter which passes vibration components having frequencies in the range of 1 to 20 Hz. A filtered angular acceleration $dV_{Wc5}$ computed through the filtering process is compared with two reference values for setting the damping force of the shock absorber. As a result, the effect of the vehicle speed during accelerated and decelerated conditions is controlled, while at the same time, the stiffness of the suspension is changed according to the filtered angular acceleration $dV_{Wc5}$ containing those frequency components (1–20 Hz) tending to deteriorate the riding comfort which range between the sprung resonance frequency and the unsprung resonance frequency. Thus, the riding comfort of the vehicle is improved. The frequency band of the band-pass filter may be in the range of from a level slightly higher than the sprung resonance frequency to the unsprung resonance frequency (i.e., 3–20 Hz).

A description will now be given of a suspension control system according to a sixth preferred embodiment of the present invention.

The sixth embodiment is a modification of the fourth embodiment shown in FIG. 15. As described above, at step D235 in the fourth embodiment, the angular acceleration $dV_W$ signal is filtered with an unsprung band-pass filter having a frequency band ranging from 10 to 15 Hz, so as to calculate the filtered angular acceleration $dV_{Wc}$. This step D235 is replaced with step F215 in the sixth embodiment which is executed after step D205. At step F215, a low-pass filtering process with a frequency of 20 Hz is effected against the angular acceleration $dV_W$ signal to remove noise and calculate a filtered angular acceleration $dV_{Wc6}$. The filtered angular acceleration $dV_{Wc6}$ is then compared with two reference values $K_0'$ and $K_1'$ at step F225 for setting the damping force of the shock absorber.

In this case, even a frequency range below 1 Hz is subjected to the low-pass filtering process. Accordingly, when the vehicle is in the accelerated or decelerated condition, a fluctuating component generated due to acceleration or deceleration becomes present in the filtered angular acceleration $dV_{Wc6}$. The fluctuating component contained in the filtered angular acceleration $dV_{Wc6}$ due to acceleration or deceleration is still observed even at such a low acceleration/deceleration level where the squat or dive of the vehicle body does not take place. On the other hand, the reference values used for judging the largeness of the filtered angular acceleration $dV_{Wc6}$ are also set to low levels where the squat and dive of the vehicle do not occur. This means that even though the squat or the dive does not take place, the fluctuating component generated due to acceleration or deceleration may set the damping force of the shock absorber to the hard state, thereby deteriorating the riding comfort of the vehicle. With this problem in view, according to the sixth embodiment, step F235 is executed to discern an accelerated or decelerated condition of the vehicle through a judgement as to whether or not any of the following conditions (a)–(c) is satisfied.

(a) the estimated vehicle speed $V_B$ is smaller than a predetermined speed $V_{20}$ (for example, 20 km/h);

(b) a predetermined time period $T_{E6}$ (for example, 0.3 sec.) from switching of a brake signal from the ON state to the Off state, and vice versa has not elasped; and (c) a predetermined time period $T_{EGF}$ (for example, 0.3 sec.) has not elasped since the shift of an engine angular acceleration from a first state where the absolute value of engine angular acceleration |engine angular acceleration| is greater than or equal a predetermined angular acceleration $K_{D61}$ (for example, 500 rpm/s) to a second state where |engine angular acceleration| is less than a predetermined angular acceleration $K_{D62}$.

When any one of the foregoing conditions (a)–(c) is satisfied, it is judged that the vehicle is in an accelerated or decelerated condition and, hence, the filtered angular acceleration $dV_{Wc6}$ contains a fluctuating component generated due to acceleration and deceleration. Then, the control procedure advances to step A260 for setting the damping force of the shock absorber to the soft state. On the other hand, when none of the foregoing conditions are satisfied, it is judged that the vehicle is not in the accelerated or decelerated condition. Then, the control procedure goes on to step A250 at which the damping force of the shock absorber is set to the hard state. With this control, it is possible to prevent the damping force from switching accidentally to the hard state and thereby deteriorating the riding comfort when the vehicle is in the accelerated or decelerated condition. In other words, according to this embodiment, it is possible to overcome the problem that the setting of the damping force is changed to the hard state and eventually deteriorates the riding comfort when the underlying accelerated or decelerated condition is of the level where the squat or the dive of the vehicle does not occur.

A suspension control system according to a seventh preferred embodiment of the present invention will be described below with reference to a flowchart shown in FIG. 17.

Figure 17:
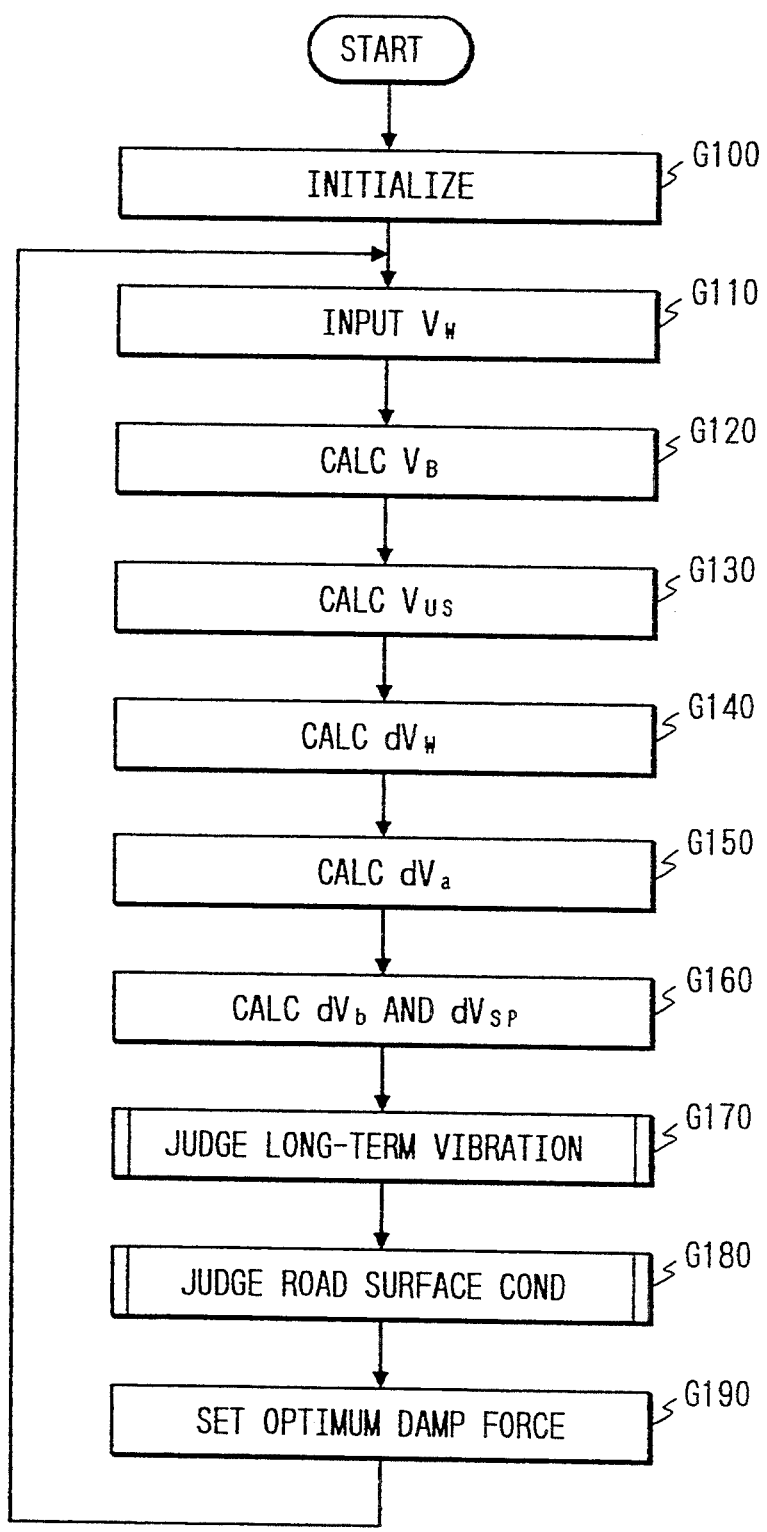
FIG. 17 is a flowchart illustrating the operation of a seventh preferred embodiment of the present invention.

A control operation shown in FIG. 17 is characterized in that sprung information about the long-term vibration is combined with unsprung information about the road surface condition (i.e. the roughness of a road surface) so as to soften a feeling of jolting or bumpy riding (hereinafter referred to as "bumpy feeding") caused by a roughness on the road surface and also prevent the generation of a long-term vibration, at the same time.

At first, when an ignition key switch is closed, a microcomputer incorporated in the suspension control system performs initialization at step G100. Then, at step G110, a wheel speed $V_W$ is read or inputted in the microcomputer. Subsequently, step G120 computes an estimated vehicle speed $V_B$ of the vehicle from the input wheel speed $V_W$. More concretely, computation in this step is performed by picking up or choosing the maximum value four wheel speeds of the respective wheels, as the estimated vehicle speed $V_B$. Alternatively, in account of the condition where the vehicle is making a turn, the average value of left and right wheel speeds may be used as the estimated vehicle speed $V_B$.

Figure 18:
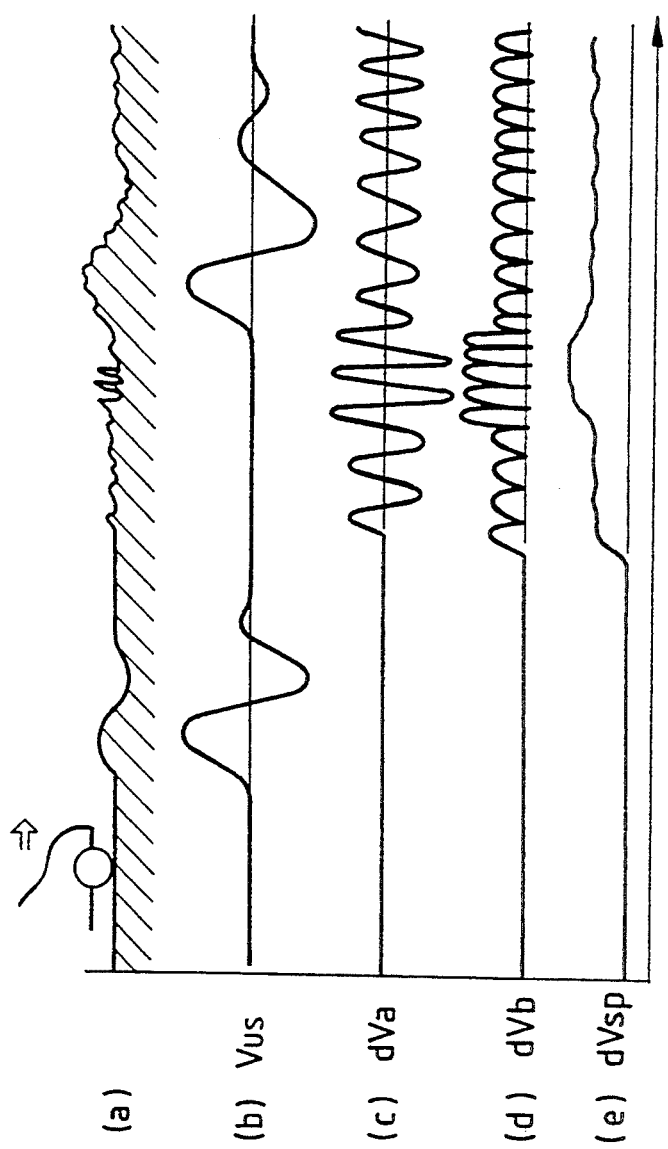
FIG. 18 is a diagram illustrating characteristics explanatory of the operation of the seventh embodiment.

Subsequently, at step G130, the wheel speed $V_W$ read at step G110 is subjected to a band-pass filtering process at sprung resonance frequencies of 1 to 2 Hz. The thus filtered speed signal is amplified so that a sprung vibration estimation signal $V_{US}$ is computed. The computed sprung vibration estimation signal $V_{US}$ is as shown in FIG. 18(b). Then, step G140 computes a wheel acceleration $dV_W$ by obtaining a rate of change per unit time of the wheel speed $V_W$ inputted at step G110. Then, at step G150, the wheel acceleration $dV_W$ is subjected to a low-pass filtering process effected for frequencies around 20 Hz which is higher than frequencies of unsprung resonance components in the range of 10 to 15 Hz. The filtered acceleration signal is amplified so that a filtered wheel acceleration $dV_a$ is computed. The thus computed filtered wheel acceleration $dV_a$ is as shown in FIG. 18(c). Subsequently, at step G160, the filtered wheel acceleration $dV_a$ is subjected to a full-wave rectification process so that a filtered wheel acceleration absolute value $dV_b$ is computed. At this step G160, the filtered wheel acceleration absolute value $dV_b$ is subjected to a filtering process using a filter having a predetermined time constant (for example, about 0.5 sec.) with the result that the filtered wheel acceleration absolute value $dV_b$ is smoothed and thus a road surface condition signal $dV_{SP}$ is computed. The filtered wheel acceleration absolute value $dV_b$ and the road surface condition signal $dV_{SP}$ are as shown in FIGS. 18(d) and 18(e), respectively.

As described above, the wheel speed $V_W$, estimated vehicle speed $V_B$, sprung vibration estimation signal $V_{US}$, wheel acceleration $dV_W$, filtered wheel acceleration $dV_a$, filtered wheel acceleration absolute value $dV_b$ and road surface condition signal $dV_{SP}$ are computed at steps G110–G160. Thereafter, the control procedure advances to step G170.

Figure 19:
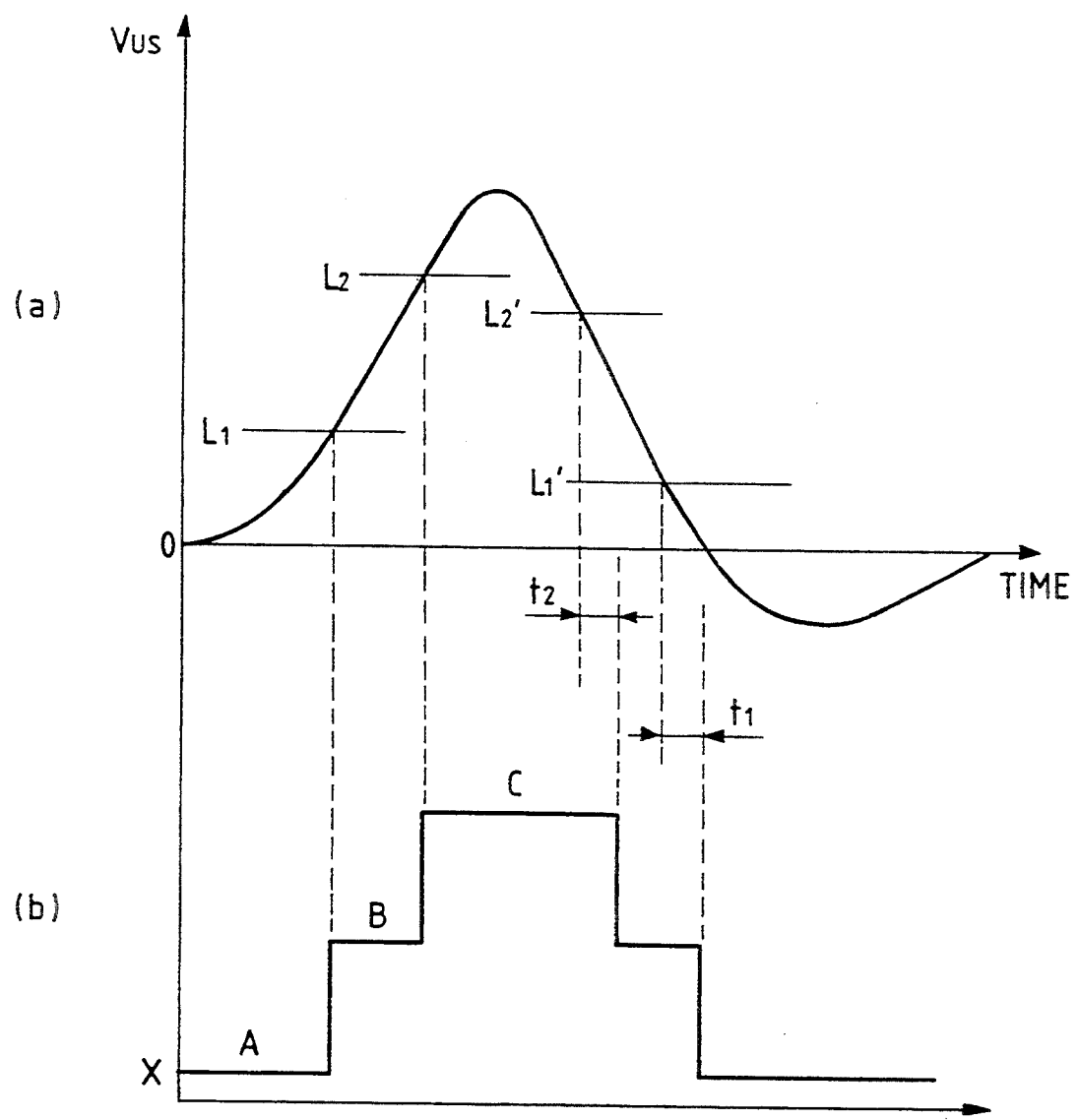
FIG. 19 is a graph illustrating the relationship between a sprung vibration estimation signal $V_{US}$ and a long-term vibration judgement level X.

Step G170 compares the sprung vibration estimation signal $V_{US}$ with predetermined long-term vibration judgment levels (threshold levels) to discern the vehicle long-term vibration condition. Step G170 will be described below in greater detail with reference to FIG. 19. When the sprung vibration estimation signal $V_{US}$ is smaller than a first threshold level L1 ($V_{US}<L1$), it is judged that vibration components having frequencies around the sprung resonance frequency are small and hence the long-term vibration does not take place. Then, based on the result of judgment, the long-term vibration judgment level $X_{07a}$ is set to level A ($X_{07}=A$). When the sprung vibration estimation signal $V_{US}$ is greater than or equal to the first threshold level L1 and is smaller than or equal to a second threshold level L2 ($L1 \leq V_{US} \leq L2$), it is judged that a slight long-term vibration is generated, and on the basis of this judgment, the long-term vibration judgment level $X_{07}$ is set to level B ($X_{07}=B$). Similarly, when $V_{US}>L2$, it is judged that a considerable long-term vibration takes place, and on the basis of this judgment, the long-term vibration judgment level $X_{07}$ is set to level C ($X_{07}=C$). In order to prevent chattering, the long-term vibration judgment level $X_{07}$ is set to change from the level C to the level B when a predetermined delay period t2 expires after the sprung vibration estimation signal $V_{US}$ goes down below a return level (threshold level) L2'. Similarly, a change of the long-term vibration judgment level $X_{07}$ from the level B to the level A takes place upon expiration of a predetermined delay period t1 running after the sprung vibration estimation signal $V_{US}$ goes down below a return level (threshold level) L1'.

Thereafter, the control procedure advances to step G180 at which the road surface condition signal $dV_{SP}$ is compared with predetermined threshold levels for discerning the road surface condition (that is, the roughness of the road surface). Step G180 will be described below in greater detail with reference to FIG. 20. When the road surface condition signal $dV_{SP}$ is smaller than a first threshold level L3 ($dV_{SP}<L3$), it is judged that vibration components having frequencies around the unsprung resonance frequency are small and hence the vehicle is running on a flat or good road. Then, based on this judgment, the road surface judgment level $x_{07}$ is set to level "a" ($x_{07}=$"a"). When the road surface condition signal $dV_{SP}$ is greater than or equal to the first threshold level L3 and is smaller than or equal to a second threshold level L4 ($L3 \leq dV_{SP} \leq L4$), it is judged that the vehicle is running on an average road, and on the basis of this judgment, the road surface judgment level $x_{07}$ is set to level "b" ($x_{07}=$"b"). Similarly, when $dV_{SP}>L4$, it is judged that the vehicle is running on a rough or bad road, and on the basis of this judgment, the road surface judgment level $x_{07}$ is set to level "c" ($x_{07}=$"c"). In the same manner as done at step 170, in order to prevent chattering, the road surface judgment level $x_{07}$ is set to switch from the level "c" to the level "b" when a predetermined delay period t4 elapses after the road surface condition signal $dV_{SP}$ goes down below a threshold level L4'. Similarly, the road surface judgment level $x_{07}$ changes from the level "b" to the level "a" upon an elapse of a predetermined delay period t3 after the road surface condition signal $dV_{SP}$ is less than a threshold level L3'.

After the vehicle long-term vibration condition and the roughness of the road surface are discerned respectively at step G170 and G180, step G190 sets an optimum damping force for the shock absorber based on the information obtained at steps G170 and G180. At step G190, the damping force of the shock absorber is set in a manner described below with reference to a map shown in FIG. 21. When a long-term vibration occurs while the vehicle is running on a good road, the damping force is set to the hard state as in a conventional manner. When a slight long-term vibration takes place while the vehicle is running on an average road having a slight roughness (under the condition "B"), the damping force is set to the medium state. With the control thus executed, it is possible to suppress the long-term vibration caused by a roughness of the road surface and thus lighten a bumpy feeling. In the case where a great long-term vibration occurs, the damping force is set to the hard state to thereby control or suppress the vibrations. Further, when the vehicle is running on the bad road, the damping force is set to the medium state.

After the damping force of the shock absorber is set at step G190, the control procedure returns to step G110.

The characteristic of the map shown in FIG. 21 is illustrative rather than restrictive, so that a map of a different character can be used.

The seventh embodiment described above may be modified in a manner described below.

(1) Step G150 at which the wheel acceleration $dV_a$ is subjected to the low-pass filtering process having a transmittable frequency band of 20 Hz is replaced with a band-pass filtering process having a transmittable frequency band of 1–20 Hz. With the last-mentioned filtering process, these components having frequencies lower than 1 Hz are removed. It is, therefore, possible to remove or exclude fluctuating components caused by acceleration or deceleration. Thus, the wheel acceleration $dV_a$ is prevented from increasing during accelerated or decelerated condition, so that the road surface condition judgment process at step G180 can be performed with an increased accuracy.

(2) The frequency band of the above-mentioned band-pass filtering process is set in the range of 3–20 Hz. With this frequency band, it is possible to detect a road surface condition represented by these frequency components other than sprung resonance frequency and also prevent the wheel acceleration $dV_a$ from increasing during accelerated and decelerated conditions.

(3) The procedure achieved at step G180 is replaced by a bad-road judgment procedure disclosed in Japanese Patent Laid-open Publication No. 60-596.

(4) an accelerated/decelerated condition judgment is achieved in the same manner as the sixth embodiment, and the long-term vibration condition judgment at step G170 is omitted during accelerated condition.

A suspension control system according to an eighth preferred embodiment of the present invention will be described below. The eighth embodiment differs from the seventh embodiment in that the accelerated/decelerated condition of the vehicle is detected to alter the characteristic of a filter for precluding the possibility that the result of the long-term vibration judgment tends to indicates the occurrence of a long-term vibration due to an increase of the sprung vibration estimation signal $V_S$ during accelerated and decelerated conditions.

Figure 22:
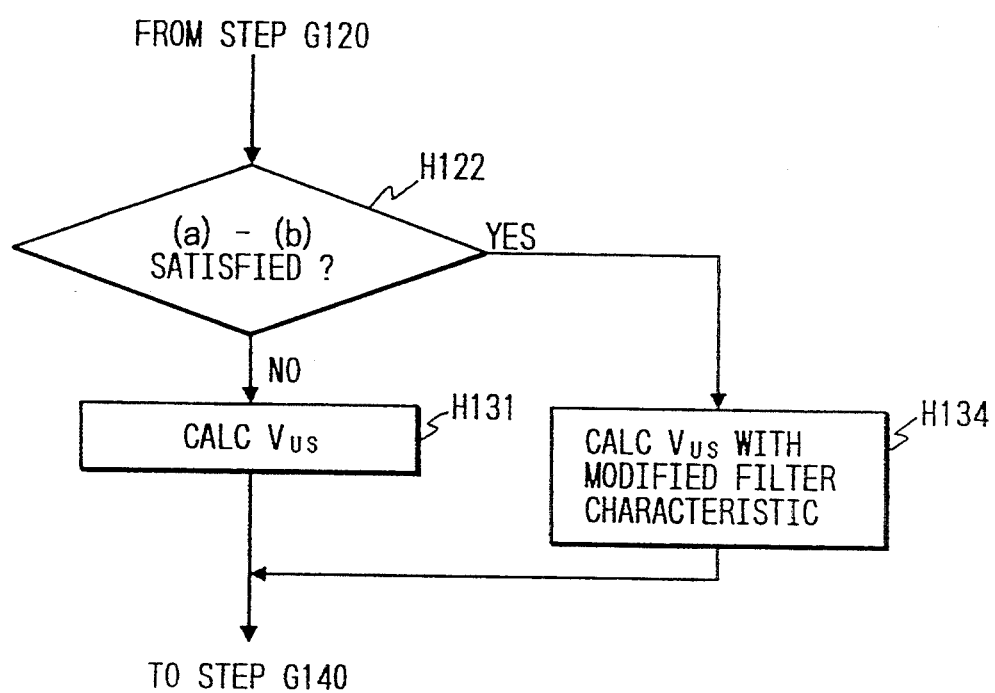
FIG. 22 is a flowchart illustrating the operation of an eighth preferred embodiment of the present invention.

To this end, a part of the procedures shown in the flowchart of FIG. 17 is replaced with the procedure shown in FIG. 22.

As shown in FIG. 22, step H122 inputs a brake signal SW, a throttle opening signal, an engine speed (number of revolution) signal, a shift lever signal, a steering angle signal, etc. When a behavior of the vehicle in the longitudinal direction caused by acceleration or deceleration of the vehicle is estimated, in order to prevent an erroneous long-term vibration judgment, a judgment is achieved to determine whether or not any one of the conditions (a)-(c) described above the reference to the sixth embodiment is satisfied.

When any one of the foregoing conditions (a)-(c) is satisfied, it is concluded that the vehicle is in an accelerated or decelerated condition and hence a behavior of the vehicle in the longitudinal direction is generated, and on the basis of this judgment, a long-term vibration judgment correction flag $X_{08}$ is set to 1 ("ON" state). In this instance, the long-term vibration judgment correction flag $X_{08}$ may be set to the ON state when at least one or any combination of the conditions (a)-(c) is satisfied.

The accelerated/decelerated condition judgment (vehicle's longitudinal behavior judgment) executed at step H122 may be carried out in a manner described below. A vehicle longitudinal acceleration which is obtained either directly from the wheel acceleration $dV_a$ or by filtering the wheel acceleration $dV_a$, or a variation of the vehicle longitudinal acceleration is computed. Then, when the computed value exceeds a predetermined value, it is concluded that the vehicle is in an accelerated/decelerated condition and a longitudinal behavior of the vehicle occurs, and on the basis of this judgment, the long-term vibration judgment correction flag $X_{08}$ is set to the ON state. On the other hand, when the computed vehicle longitudinal acceleration or the computed variation of vehicle longitudinal acceleration is less than the predetermined value, it is concluded that the vehicle is not in the accelerated/decelerated condition. Accordingly, the long-term vibration judgment correction flag $X_{08}$ is reset to 0 ("OFF" state).

When the conditions required for the long-term vibration judgment correction are not satisfied at step H122 and, hence, the vehicle is not in the accelerated or decelerated condition, this means that the long-term vibration judgment correction flag $X_{08}$ is in the OFF state. Then, the control procedure advances to step H131 at which a filtering process is achieved using a low-frequency side cutoff frequency which is lower than that used at step H134.

On the other hand, when the conditions required by step H122 are satisfied and hence the vehicle is in an accelerated/decelerated condition, this means that the long-term vibration judgment correction flag $X_{08}$ is set to the "ON" state. Then, the control procedure goes on to step H134 at which the characteristic of a band-bass filter used for computing the sprung vibration estimation signal $V_{US}$ is altered. More specifically, in order to reduce the effect of acceleration or deceleration, the low-frequency side cutoff frequency of the filter is increased (for example, from 0.5 Hz set at the time when the long-term vibration judgment correction flag $X_{08}$ is in the "OFF" state, to 1 Hz when $X_{08}$ is in the "ON" state). As an alternative, it is possible to increase the degree of a high-pass filter (for example, from the primary in the normal condition, to the secondary when $X_{08}$ is set to the "ON" state). The thus altered band-pass filtering process is applied to the wheel speed $V_W$ for computing a sprung vibration estimation signal $V_{US}$. Thus, when the vehicle is in the accelerated/decelerated condition, the cutoff frequency is increased so that fluctuating frequency components generated by acceleration/deceleration of the vehicle can be removed.

A description will be given below of a suspension control system according to a ninth preferred embodiment of the present invention.

According to this embodiment, at step G150 of the flowchart shown in FIG. 17, a judgment as to whether or not any of the above-mentioned conditions (a)-(c) is satisfied is carried out to determine whether or not the long-term vibration correction flag is ON. When the result of this judgment represents the ON state of the long-term vibration judgment correction flag, then the characteristic of a filter used for calculation of the filtered wheel acceleration $dV_a$ is altered. More concretely, the filter characteristic is altered to perform only a low-pass filtering process with a cutoff frequency of 20 Hz. On the other hand, when the result of the foregoing judgment indicates the OFF state of the long-term vibration judgment correction flag, then a band-pass filtering process for frequencies in the range of 1-20 Hz or from a predetermined frequency selected from 1 to 3 Hz to 20 Hz is effected.

It is also possible to switch the degree of the filter in response to the on-off state of the long-term vibration judgment correction flag in such a manner that when the long-term vibration judgment correction flag is "ON", the degree of the filter is set to the primary, while the degree of the filter is set to the secondary when the long-term vibration judgment correction flag is "OFF".

As described above, by altering the characteristic of a filtering process effected against the wheel acceleration during the accelerated or decelerated condition, a road surface condition signal $dV_{SP}$ calculated in the same procedure as step G160 shown in FIG. 17 increases during the accelerated or decelerated condition. As a result, the road surface condition (roughness of a road surface) which is judged in the same procedure as step G180 is likely to be judged as a bad road during the accelerated or decelerated condition. Accordingly, a damping force setting value which is calculated in the same procedure as step G190 is unlikely to represent the hard state during the accelerated or decelerated condition.

A suspension control system according to a tenth preferred embodiment of the present invention will be described below.

The tenth embodiment differs from the seventh embodiment in that the long-term vibration estimation signal is corrected in view of a signal representing an accelerated/decelerated condition of the vehicle. This correction will preclude the possibility that the long-term vibration judgment tends to represent the occurrence of a long-term vibration in view of an increase of the sprung vibration estimation signal during the accelerated or decelerated condition.

Figure 23:
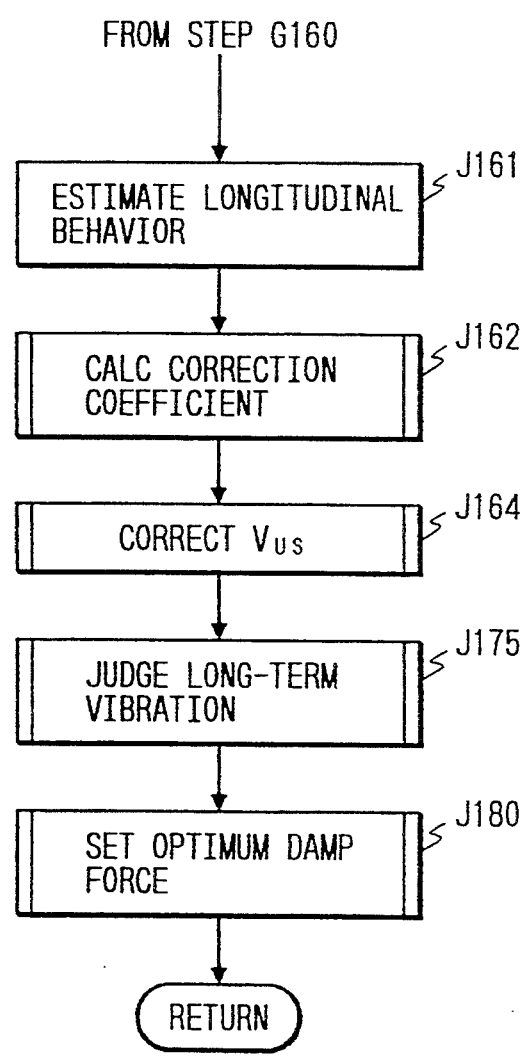
FIG. 23 is a flowchart illustrating the operation of a tenth preferred embodiment of the present invention.

More specifically, according to the tenth embodiment, a part of the flowchart shown in FIG. 17 (steps G170 through G190, in particular) is replaced by the procedures shown in FIG. 23.

In FIG. 23, step J161 judges the vehicle's accelerated/decelerated condition (vehicle behavior estimation) in the same manner as done at step H122 of the eighth embodiment. When it is judged that the vehicle is in the accelerated/decelerated condition, the long-term vibration judgment correction signal is set to 1 ("ON" state). On the other hand, when the vehicle is not in the accelerated or decelerated condition, the long-term vibration judgment correction flag $X_{10}$ is reset to zero ("OFF" state).

Figure 24:
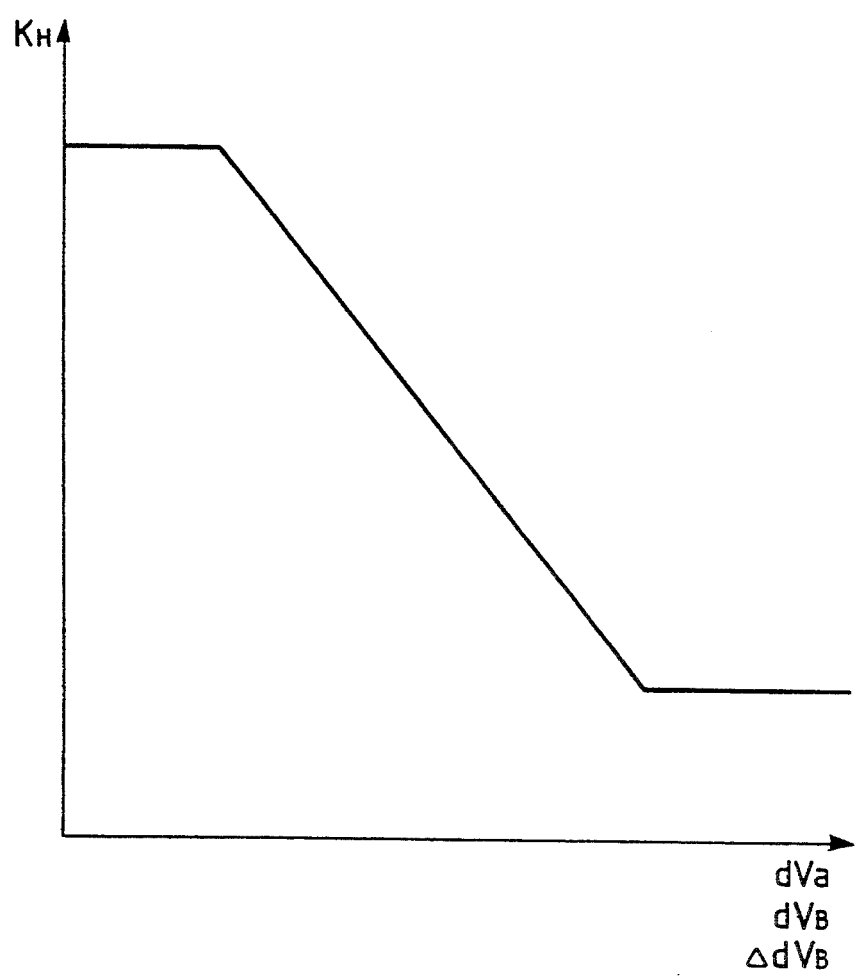
FIG. 24 is a map showing the relationship between the signals $dV_a$, $dV_B$ and $\Delta V_B$ and a correction coefficient $K_H$.

Step 162 sets a correction coefficient $K_H$ for the sprung vibration estimation signal based on the ON-OFF state of the long-term vibration judgment correction flag $X_{10}$. When the long-term vibration judgment correction flag $X_{10}$ is ON, the correction coefficient $K_H$ is set to a lower level. As an alternative, if the longitudinal behavior of the vehicle is estimated at step J161 based on a wheel acceleration $dV_a$, a vehicle longitudinal acceleration $dV_B$ obtained by filtering the wheel acceleration $dV_a$, or a variable of the vehicle longitudinal acceleration $\Delta dV_B$, the correction coefficient $K_H$ may be calculated from a map shown in FIG. 24, in accordance with an intensity signal of the wheel acceleration $dV_a$, vehicle longitudinal acceleration $dV_B$ or variable of the vehicle longitudinal acceleration $\Delta dV_B$. The map shown in FIG. 24 has a characteristic that $dV_a$, $dV_B$ or $\Delta dV_B$ on an axis of ordinates decreases with an increase of the correction coefficient $K_H$ on an axis of abscissas.

Thereafter, step J164 corrects the sprung vibration estimation signal $VU_S$ calculated at step G130 with the correction coefficient $K_H$, thereby computing a corrected sprung vibration estimation signal $V_{USH}$, as indicated by the following equation (3).

$$V_{USH} = K_H \times Y_{US} \quad (3)$$

Then, step J175 executes the same procedure as step G180 except that the corrected sprung vibration estimation signal $V_{USH}$ is compared with two predetermined return levels L1 and L2 for determining the nature of the long-term vibration. In this instance, the greater the road surface condition signal $dV_{SP}$, the smaller the corrected sprung vibration estimation signal $V_{USH}$. As a result, it occurs unlikely that the long-term vibration judgment concludes the occurrence of the long-term vibration. Thus, the greater the roughness of the road surface (i.e., bad road), lesser the possibility of setting the damping force to the hard state.

With the foregoing control, a tendency to switch the damping force to the hard state due to an increase of the corrected sprung vibration estimation signal $V_{USH}$ during the accelerated or decelerated condition is eliminated. The damping fore is controlled thereafter. Accordingly, an erroneous judgment of the occurrence of long-term vibration during accelerated and decelerated conditions can be avoided so that an unnecessary switching of the damping force during accelerated and decelerated conditions no longer takes place. Thus, the riding comfort during accelerated and decelerated conditions is improved.

A description will be given of an eleventh preferred embodiment of the present invention. This embodiment is characterized by a control procedure in which long-term vibration judgment levels L1 and L2, return threshold levels L1' and L2', and delay periods t1 and t2 are switched according to the road surface condition (good road, average road, or bad road) judged based on the road surface condition signal $dV_{SP}$.

Figure 25:
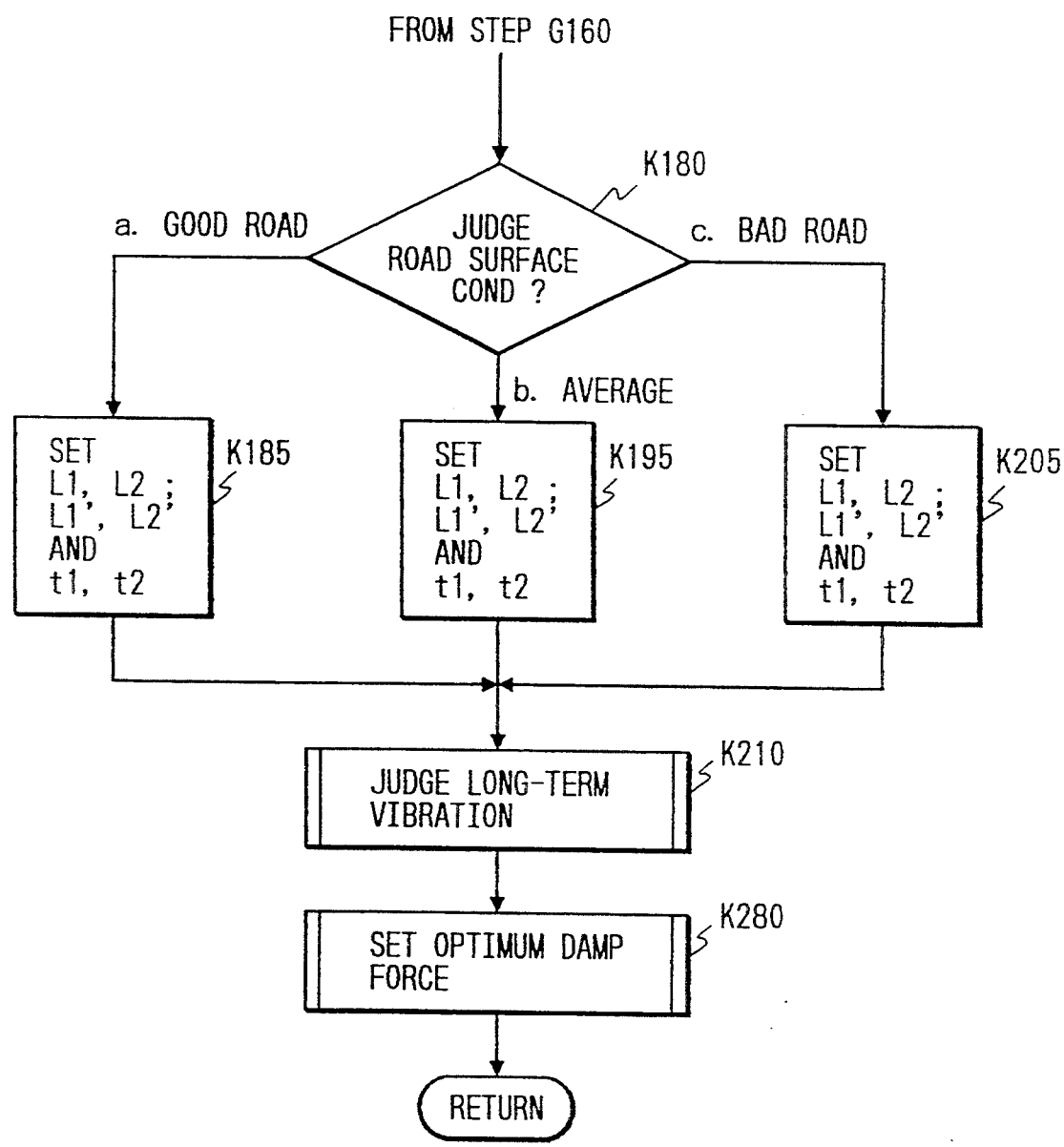
FIG. 25 is a flowchart illustrating the operation of an eleventh preferred embodiment of the present invention.

More specifically, according to the eleventh embodiment, these procedures shown in FIG. 25 are performed in place of a certain part of the flowchart shown in FIG. 17.

As shown in FIG. 25, step K180 executes the same procedure as step G180 so that the road surface condition is judged among three levels, that is, level "a" (good road), level "b" (average road) and level "c" (bad road), in accordance with the road surface condition signal $dV_{SP}$. Thereafter, at steps K185, K195 and k205, long-term vibration judgment levels L1 and L2, return threshold levels L1' and L2', and delay periods t1 and t2 are set in correspondence to the road surface judgment level "a", "b" or "c" determined at step K180. Then, step K210 achieves the same procedure as step G170 with the exception that for the long-term vibration judgment levels L1 and L2, return threshold levels L1' and L2' and delay periods t1 and t2, those values set at step K185, K195 or K205 are used. The long-term vibration judgment levels and the return threshold levels is so set as to gradually increase with a shift of the road surface judgment level in a direction from level "a" to level "b" and from level "b" to level "c", so that a judgment result representing the occurrence of long-term vibration is more and more difficult to occur as the road surface condition becomes worse. Thus, as the road surface condition becomes worse (i.e, as the roughness of the road surface becomes greater), the judgment result representing the occurrence of a long-term vibration is difficult to come out.

As a result, as the road surface condition becomes worse, it becomes difficult more and more to set the damping force to the hard state at step K280. It is, therefore, possible to improve the bumpy feeling while the vehicle is running on the bad road. The road surface judgment levels may be two or more levels optionally, or a continuously varying level.

A description will be given of a twelfth preferred embodiment of the present invention. This embodiment is characterized in that the long-term vibration judgment levels and return levels used in the eleventh embodiment described above are prepared as a function map of the vehicle speeds. More specifically, according to the twelfth embodiment, the long-term vibration judgment levels and return levels set at steps K185, K195 and K205 of the eleventh embodiment are determined by using a map in which these levels are variable with the vehicle speeds. The map has a feature described below. In a vehicle speed range (40-60 km/h) in which the vehicle tends to cause long-term vibration, the long-term vibration judgment levels and the return levels are set to slightly higher levels. On the other hand, in a high speed range which is frequently selected when the vehicle is running at a relatively flat road, the long-term vibration judgment levels and the return levels are set to slightly lower levels. Thus, the long-term vibration of the vehicle is judged according to the vehicle speed so that an improved riding comfort can be obtained.

In addition, the long-term vibration judgment levels and the return levels are provided separately for each of the three different road surface conditions (good road, average road, and bad road). By setting the long-term vibration judgment levels and the return levels in such a manner as to gradually increases with an increase in the roughness of the road surface, it is possible to control or suppress the vehicle long-term vibration and also soften the bumpy feeling while the vehicle is running on the bad road.

A description will now be given below of a thirteenth preferred embodiment of the present invention. This embodiment is characterized in that the delay periods t1 and t2 used in the eleventh embodiment described above are prepared as a function map of the vehicle speeds. More specifically, according to the thirteenth embodiment, the delay periods t1 and t2 which are set at steps K185, K195 and K205 of the eleventh embodiment are determined by using a map in which these delay periods are variable with the vehicle speeds.

Figure 26A:
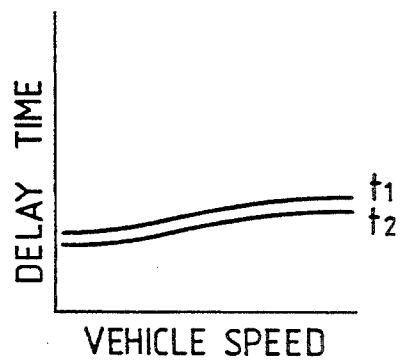
FIGS. 26A through 26C are maps illustrating the relationship between a vehicle speed and a delay period.
Figure 26B:
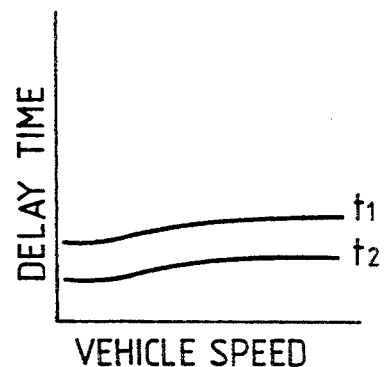
Figure 26C:
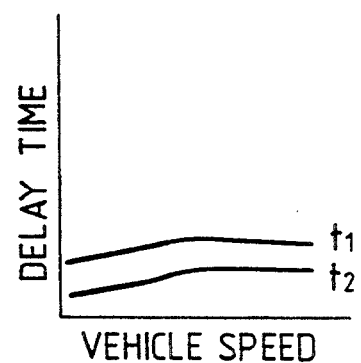

In addition, the delay periods t1 and t2 may be prepared separately for each of the three different road surface conditions (good road, average road, and bad road), as shown in FIG. 26. By setting the delay periods t1 and t2 in such a manner as to increase with an increase in the roughness of the road surface, it is possible to control the occurrence of a long-term vibration and also soften the bumpy feeling during a running on the bad road.

Hereinafter will be described a fourteenth preferred embodiment of the present invention. This embodiment is characterized in that the characteristic of a filter is altered according to the road surface condition signal. More specifically, according to this embodiment, in accordance with the road surface condition (good road or bad road) which is judged based on the road surface condition signal $dV_{SP}$, the characteristic of a filter used for extracting frequency components around the sprung frequencies is altered in such a manner that a long-term vibration judgment becomes more and more difficult with an increase in the roughness of the road surface. With the filter characteristic thus altered, the vehicle long-term vibration can be suppressed according to the road surface condition with the result that the riding comfort of the vehicle can be improved.

As will be described below in greater detail, according to this embodiment, prior to the computation of a sprung vibration estimation signal $V_{US}$, the road surface condition is discerned among two levels (corresponding to the gad road and the good road, for example) based on the intensity of a road surface condition signal $dV_{SP}$ calculated in the same manner as step G160, and in accordance with the judged road surface condition level (good road or bad road), the characteristic of a band-pass filter used for calculating a sprung vibration estimation signal $V_{US}$ is altered. More specifically, in order to prevent the damping force from switching accidentally to the hard state while the vehicle is running on the bad road, when the road surface condition is judged as a bad road, a low-frequency side cutoff frequency of the band-pass filter is lowered (for example, from 3 Hz in a good-road running condition to 2 Hz in a bad-road running condition). As an alternative, when the result of judgment represents a bad road, the degree of the band-pass filter is lowered (for example, from the primary filter in the good-road running condition to the secondary filter in the bad-road running condition). Thereafter, a sprung vibration estimation signal $V_{US}$ is calculated though a filtering process achieved in a frequency band altered as described above.

By the above-mentioned process, while the vehicle is running on the bad road, it occurs unlikely that the result of judgment on the long-term vibration represents the occurrence of a long-term vibration. It is, therefore, possible to substantially eliminate the bumpy feeling during the bad-road running and thereby improve the riding comfort of the vehicle.

It is also possible to add an acceleration/deceleration detection means or sensor for detecting acceleration/deceleration of the vehicle. As shown in FIGS. 27 and 28, a low-frequency side cutoff frequency and a high-frequency side cutoff frequency of a long-term vibration estimation filter, or the degree of the long-term vibration estimation filter is changed according to the accelerated/decelerated conditions (normal condition running at a constant speed, and an accelerated/decelerated condition) of the vehicle. With this change of the filter characteristic, a long-term vibration suppressing control is achieved while taking into account of the accelerated/decelerated condition of the vehicle and changes of the road surface condition. As a result, the riding comfort of the vehicle is considerably improved.

The accelerated/decelerated condition and the road surface conditions may be judged in a manner other than as specified above. For example, multiple levels, a continuously varying level, or a mapping operation can be used for such judgment in order to perform a fine alteration of the cutoff frequency of the long-term vibration estimation filter or the degree of the long-term vibration estimation filter.

Hereinafter will be described a fifteenth preferred embodiment of the present invention. This embodiment is partly different from the seventh embodiment described above and is characterized in that a judgment on the long-term vibration is performed after the sprung vibration estimation signal $V_{US}$ is corrected based on the road surface condition signal $dV_{SP}$.

Figure 29:
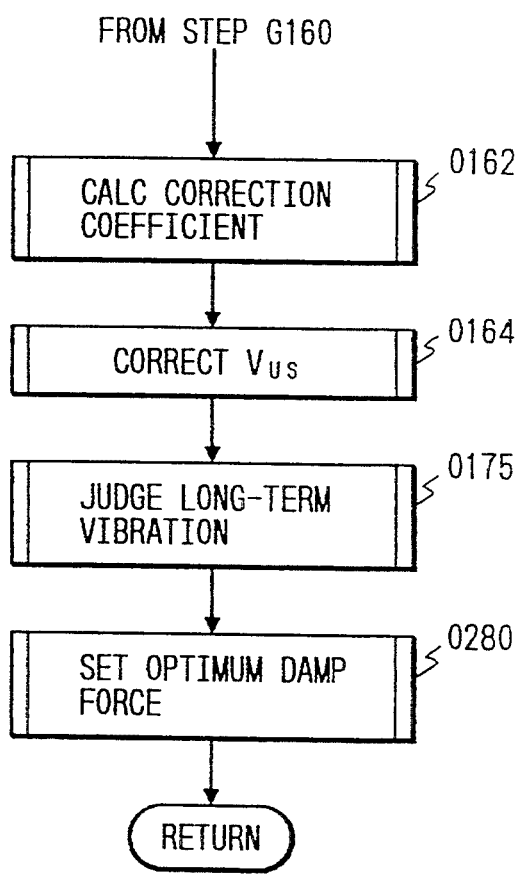
FIG. 29 is a flowchart illustrating the operation of a fifteenth preferred embodiment of the present invention.

More specifically, according to the fifteenth embodiment, the procedures shown in FIG. 29 are achieved in place of a part of the flowchart shown in FIG. 7.

Figure 30:
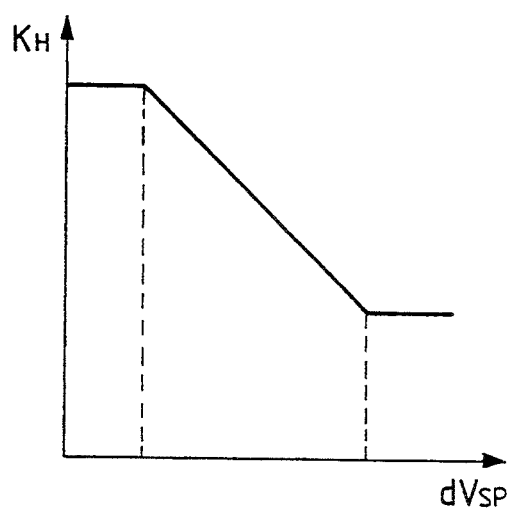
FIG. 30 is a map showing the relationship between the road surface condition signal $dV_{SP}$ and the correction coefficient $K_H$.
Figure 31:
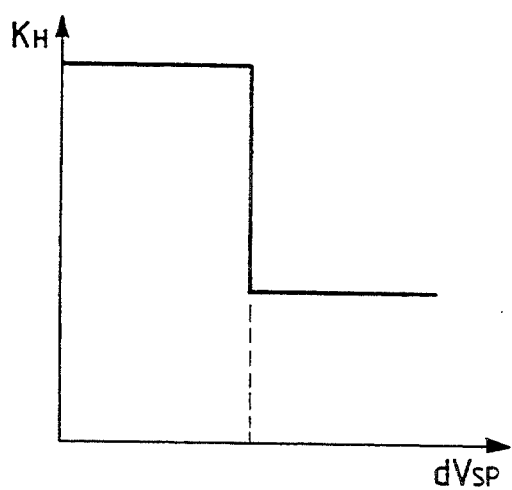
FIG. 31 is another map showing the relationship between the road surface condition signal $dV_{SP}$ and the correction coefficient $K_H$.

At step 0162 shown in FIG. 29, a correction coefficient $K_H$ based on the road surface condition signal $dV_{SP}$ is calculated from maps shown in FIGS. 30 and 31.

Subsequently, at step 0164, the sprung estimation signal $V_{US}$ calculated at step G130 is corrected by the correction coefficient $K_H$ for calculating a corrected sprung vibration estimation signal $V_{USH}$ ($V_{USH}=k_h \times V_{US}$).

Then, step 0175 achieves the same procedure as step G170 excepting that the corrected sprung vibration estimation signal $V_{USH}$ is compared with predetermined long-term vibration judgment (return) levels L1 and L2 to discern the vehicle long-term vibration condition. In this instance, with an increase of the road surface condition signal $dV_{SP}$, the corrected sprung vibration estimation signal $V_{USH}$ becomes small so that a result of judgment representing the occurrence of a long-term vibration is difficult to come out. Accordingly, a difficulty of setting the damping surface to the hard state increases with an increase in the roughness of the road surface.

The correction coefficient $K_H$ may be set for each of the switchable damping force levels. In this instance, it is also possible to realize the same control as done in the case where the long-term vibration judgement levels L1 and L2 and the return levels L1' and L2' are set separately for each of the different road surface conditions.

A description will be given of a sixteenth preferred embodiment of the present invention. This embodiment is characterized by a correction of the sprung vibration estimation signal which is performed in accordance with the vehicle speed.

Figure 32A:
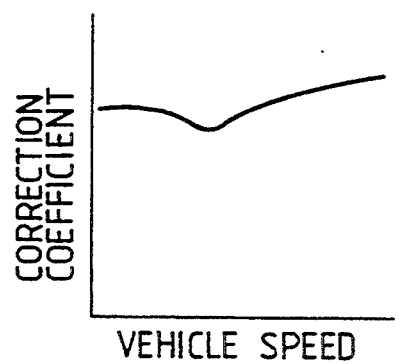
FIG. 32A through 32C are maps showing the relationship between the vehicle speed and the correction coefficient.
Figure 32B:
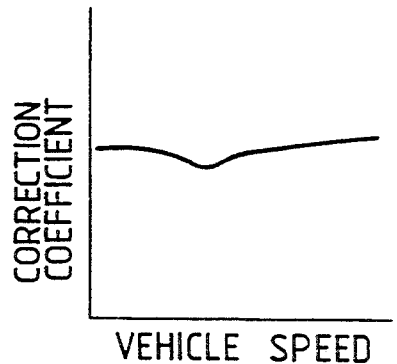
Figure 32C:
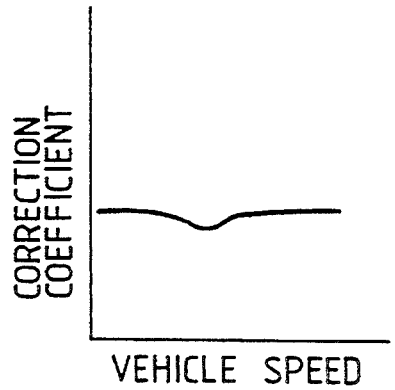

According to this embodiment, the sprung vibration estimated signal is corrected by a correction coefficient which may be provided in the form of a map prepared in conjunction with the vehicle speed. As shown in FIG. 32, a separate map is provided for each of three different road surface conditions (good road, average road and bad road).

As in the case where the long-term vibration judgment levels and return levels are provided as a function map of the vehicle speeds, the correction coefficient used for a speed range in which the vehicle tends to cause long-term vibration is set to a rather low level. On the other hand, for a high speed range which is frequently selected when the vehicle is running on a relatively flat road, the correction coefficient is set to a rather high level.

Figure 33:
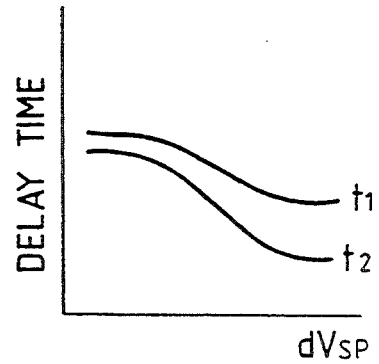
FIG. 33 is a map showing the relationship between the road surface condition signal $dV_{SP}$ and the delay period.

Hereinafter will be described a seventeenth preferred embodiment of the present invention. In this embodiment, delay periods t1 and t2 are variable with the road surface condition signal $dV_{SP}$, as shown in FIG. 33. More specifically, the delay periods t1 and t2 decrease with an increase of the road surface condition signal $dV_{SP}$. With the delay periods t1 and t2 thus set, the long-term vibration is suppressed and the bumpy feeling during a bad-road running can be eliminated.

A description will now be given of a suspension control system according to an eighteenth preferred embodiment of the present invention. This suspension control system is the same in construction as that in the seventh embodiment but the control operation thereof is partly different. That is, the threshold levels L1, L2, L1' and L2' are corrected based on the road surface condition signal $dV_{SP}$, and thereafter the long-term vibration is judged. The control operation of the eighteenth embodiment will be described in greater detail with reference to a flowchart shown in FIG. 34.

Figure 34:
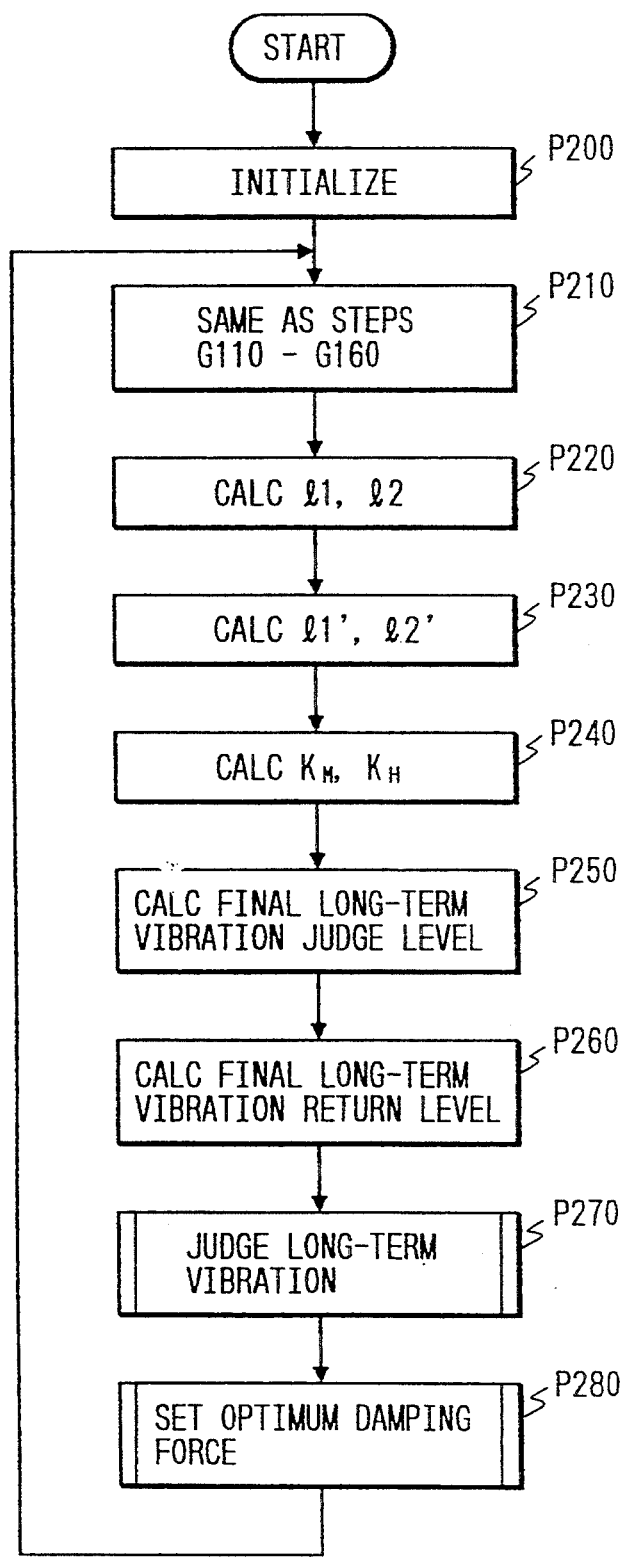
FIG. 34 is a flowchart illustrating the operation of the eighteenth preferred embodiment of the present invention.

As shown in FIG. 34, step P200 initializes the microcomputer. Thereafter, at step P210, the same procedures as steps G110–G160 are achieved so that a wheel speed $V_W$, an estimated vehicle speed $V_B$, a sprung vibration estimation signal $V_{US}$, a wheel acceleration $dV_W$, a filtered wheel acceleration $dV_a$, a filtered wheel acceleration absolute value $dV_b$, and a road surface condition signal $dV_{SP}$ are obtained.

Figure 35:
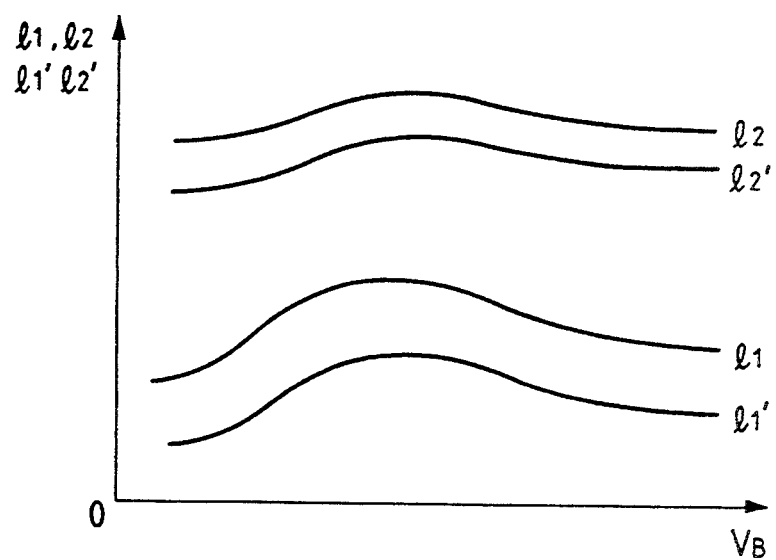
FIG. 35 is a map showing the relationship between an estimated vehicle speed $V_B$ and a flatting judgment basic level.

At step P220, two long-term vibration judgment basic levels l1 and l2 used for correcting the threshold levels L1 and L2 are calculated from a map shown in FIG. 35. Subsequently, at step P230, two long-term vibration return basic levels l1' and l2' used for correcting the threshold levels L1' and L2' are calculated from the map shown in FIG. 35. As appears clear from FIG. 35, the long-term vibration judgment basic levels l1 and l2 and the long-term vibration return basic levels l1' and l2' are variable with the estimated vehicle speed $V_a$.

Figure 36:
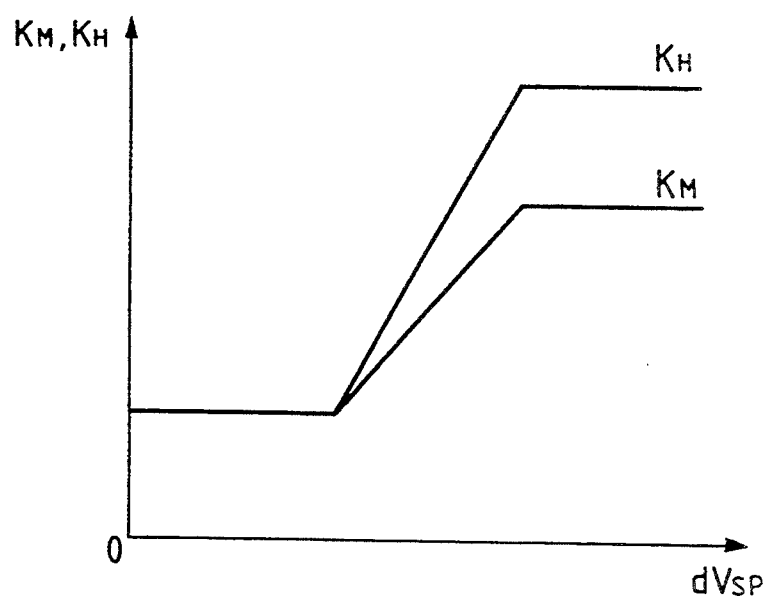
FIG. 36 is a map showing the relationship between the road surface condition signal $dV_{SP}$ and correction coefficients $K_M$, $K_H$.

At step P240, two correction coefficients $K_M$ and $K_H$ used for correcting the threshold levels L1, L2, L1' and L2' are calculated from a map shown in FIG. 36. As appears clear from FIG. 36, the correction coefficients $K_M$ and $K_H$ are variable with the road surface condition signal $dV_{SP}$.

Subsequently, at step P250, the threshold levels L1 and L2 are corrected in accordance with the following equations (4) and (5), using the long-term vibration judgment basic levels l1 and l2 and the correction coefficients $K_M$ and $K_H$ calculated respectively at step P220 and P240.

$$L1 = l1 \times K_M \tag{4}$$

$$L2 = l2 \times K_H \quad (5)$$

Likewise step P250, step P260 corrects the threshold levels L1' and L2' in accordance with the following equations (6) and (7), by using the long-term vibration return basic levels l1' and l2' and the correction coefficients $K_M$ and $K_H$ calculated respectively at step 230 and step 240.

$$L1' = l1' \times K_M \quad (6)$$

$$L2' = l2' \times K_H \quad (7)$$

Figure 37:
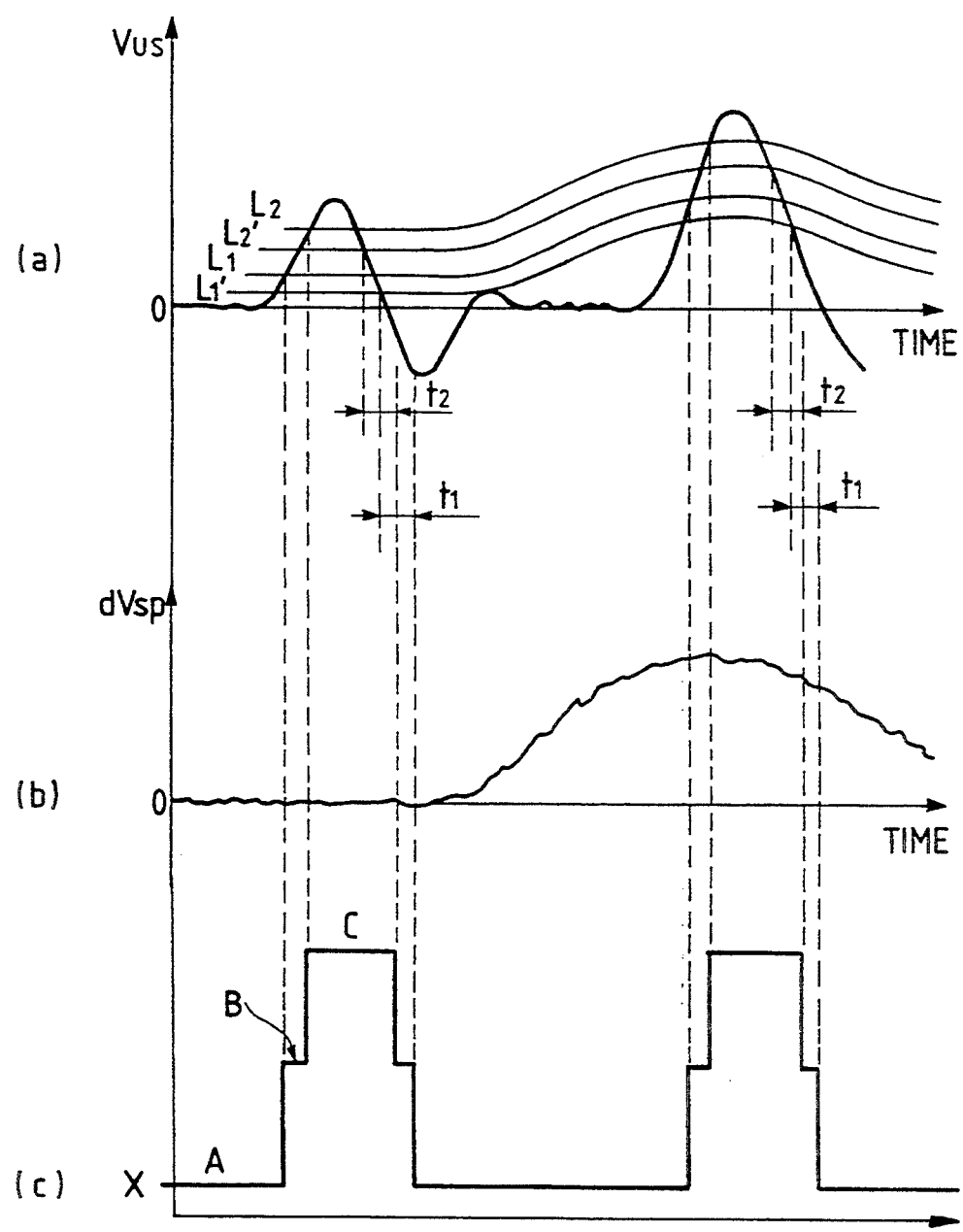
FIG. 37 is a diagram illustrating how threshold levels are corrected.

Thereafter, at step P270, the sprung vibration estimation signal $V_{US}$ is compared with the corrected threshold levels for discerning the long-term vibration. Step P270 will be described below in greater detail. As shown in FIG. 37, when $V_{US} < L1$, it is concluded that the sprung resonance vibration components are small and hence no long-term vibration is produced. Based on this judgment, the long-term vibration judgment level X is set to level "A" (X=A). When $L1 \leq V_{US} \leq L2$, it is judged that a small long-term vibration is generated, and on the basis of this judgment, the long-term vibration judgment level X is set to level "B" (X=B). When $V_{US} > L2$, it is concluded that a remarkable long-term vibration is generated, and based on this judgment, the long-term vibration judgment level X is set to level "C" (X=C). Likewise the first embodiment, in order to prevent chattering, the long-term vibration judgment level X is changed from the level C to the level B when a predetermined period of time t2 expires after the sprung vibration estimation signal $V_{US}$ falls below the threshold level L2' ($V_{US} < L2'$). Similarly, the long-term vibration judgment level X is changed from the level B to the level A upon elapse of a predetermined period of time t1 following the condition of $V_{US} < L1'$.

The judgment on the long-term vibration of the vehicle is thus completed at step P270. Then, the control procedure advances to a step P280 at which an optimum damping force of the shock absorber is set based on the result of judgment at step P270. For instance, when the result of judgment at step P270 represents X=A, then the damping force is set to the soft state. When X=B, the damping force is set to the medium state. And, when X=C, the damping force is set to the hard state.

As described above, according to the eighteenth embodiment, the correction coefficients $K_M$ and $K_H$ are calculated from a road surface condition signal $dV_{SP}$ corresponding to sprung information and, by using these correction coefficients $K_M$ and $K_H$, threshold levels L1 and L2 are corrected. Since the correction coefficients $K_M$ and $K_H$ increases with an increase of the road surface condition signal $dVS_p$, as shown in FIG. 36, the threshold level L1 and L2 are corrected toward higher levels when the vehicle is running on the bad road.

Consequently, even in the instance where a vehicle long-term vibration is generated, when the vehicle is running on the bad road, it is hardly possible that the sprung vibration estimation signal $V_{US}$ exceeds the threshold levels and hence the damping force is unlikely to shift to the hard state. It is, therefore, possible to soften the bumpy feeling resulting from a roughness on the road surface and also prevent the occurrence of the long-term vibration.

Hereinafter will be described a nineteenth preferred embodiment of the present invention. This embodiment differs from the seventh embodiment in that there are provided a steering angle sensor for detecting a steering angle $\theta$, a throttle sensor for detecting a throttle opening judgment THR, and a stop-lamp sensor for judging whether or not a brake pedal is depressed, output signals from the respective sensors being inputted into the microcomputer.

The nineteenth embodiment is characterized in that information on vehicle attitude conditions obtained by a roll judgment, a dive judgment, a squat judgment or a high-speed running judgment are combined with unsprung information so as to set an optimum damping force, thereby softening the bumpy feeling caused by a roughness on the road surface and keeping an optimum vehicle attitude or position.

Figure 38:
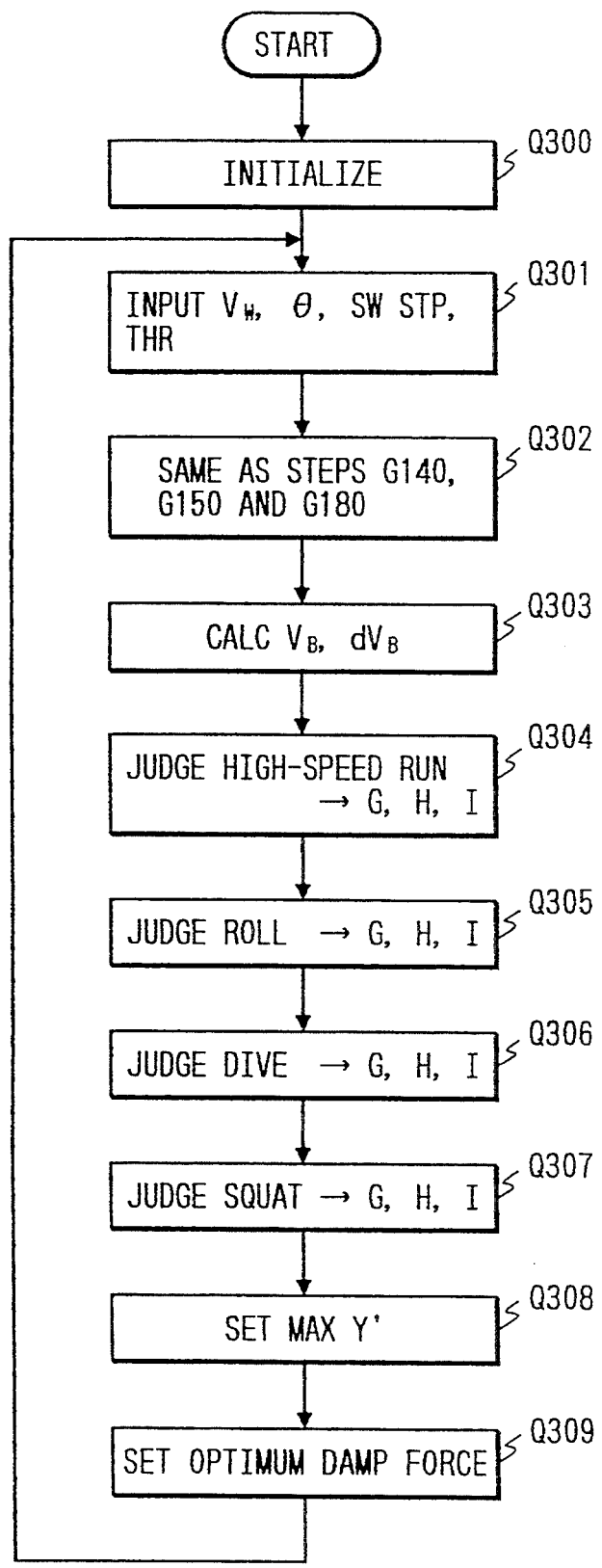
FIG. 38 is a flowchart illustrating the operation of a nineteenth preferred embodiment of the present invention.

Control procedures executed by the microcomputer 16 will be described below in detail with reference to a flowchart shown in FIG. 38.

At first, when an ignition key switch is closed, initialization of the microcomputer 16 is performed at step Q300. Then at step Q301, a wheel speed $V_W$, a steering angle $\theta$ from the steering sensor, a stop lamp switch judgment STP from a stop lamp switch, and a throttle opening judgment THR from the throttle sensor are read or inputted in the microcomputer. The steering angle $\theta$ may be computed from the difference between a left wheel speed and a right wheel speed $V_{WFR}$ in a manner as indicated by the following equation (8).

$$\theta = \frac{N \cdot L}{W} \cdot \frac{V_{WFR} - V_{WFL}}{V_B} \cdot \frac{180}{\pi} \cdot (1 + K \cdot V_B^2) \quad (8)$$

where N is the steering gear ratio, L is the wheel base, W is the tread, K is the stability factor, $V_{WFR}$ is the wheel speed of right front wheel, and $V_{WFL}$ is the wheel speed of left front wheel.

In this embodiment, the steering angle $\theta$ is estimated and computed by a speed difference between the front wheels, however, it is possible to estimate the steering angle $\theta$ through a calculation based on a speed difference between rear wheels.

Thereafter, at step Q302, these procedures which are the same as those executed at steps G140–G160 and step G180 are executed whereby the wheel speed $V_W$, a sprung vibration estimation signal $V_{US}$, a wheel acceleration $dV_W$, a filtered wheel acceleration $dV_a$, a filtered wheel acceleration absolute value $dV_b$ and a road surface condition signal $dV_{SP}$ and obtained, and at the same time, a road surface judgment level "x" is obtained through a judgment on the roughness of the road surface (road surface condition). Then, at step Q303, from the wheel speed $V_W$ is calculated an estimated vehicle speed $V_B$ based on which an acceleration $dV_b$ of the vehicle in a longitudinal direction (moving direction) of the vehicle is calculated. More concretely, the longitudinal vehicle acceleration $dV_B$ is calculated from a rate of change of the estimated vehicle speed $V_B$, or from a rate of change of the wheel speed $V_W$ in a manner as disclosed in Japanese Patent Publication No. 1-47324.

Figure 39:
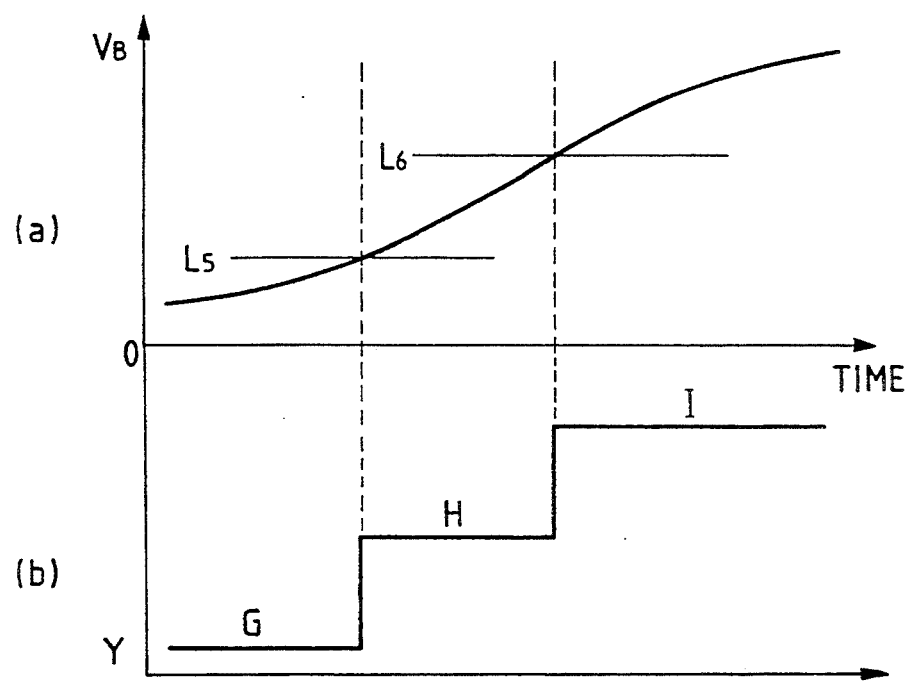
FIG. 39 is a diagram showing the relationship between the estimated vehicle speed $V_B$ and an attitude change judgment level Y.

At step Q304, the estimated vehicle speed $V_B$ is compared with predetermined threshold levels to discern a high-speed running among various attitude changes of the vehicle. Step Q304 will be described in detail with reference to FIG. 39. When the estimated vehicle speed $V_B$ is less than a threshold level L5 ($V_B < L5$), it is concluded that the vehicle is running at a low speed, and an attitude change judgment level Y is set to level G (Y=G). When the estimated vehicle speed $V_B$ is greater than or equal to the threshold level L5 and is smaller than or equal to a threshold level L6 (L5≦$V_B$≦L6), it is concluded that the vehicle is running at a medium speed, and the attitude change judgment level Y is set to level H (Y=H). Similarly, when $V_B$>L6, it is concluded that the vehicle is running at a high speed, and the attitude change judgment level Y is set to level I (Y=I).

Figure 40:
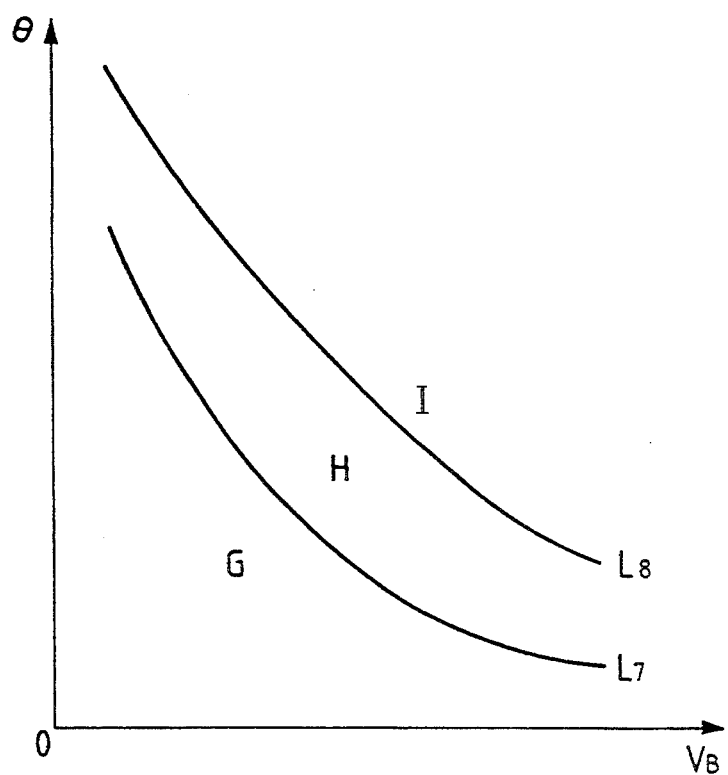
FIG. 40 is a map showing the relationship between the estimated vehicle speed $V_B$ and a steering angle $\theta$.

Subsequently, at step Q305, a judgment is executed in accordance with the steering angle θ and the estimated vehicle speed $V_B$, so as to discern a roll of the vehicle among various vehicle attitude change conditions. This step will be described in detail with reference to FIG. 40. When a value determined by the steering angle θ and the estimated vehicle speed $V_B$ is less than a threshold level L7, it is concluded that rolling of the vehicle does not take place, and the attitude change judgment level Y is set to level G (Y=G). When the value determined by θ and $V_B$ is greater than or equal to L7 and is smaller than or equal to a threshold level L8, it is concluded that a slight rolling of the vehicle is observed, and the attitude change judgment level Y is set to level H (Y=H). Similarly, when the value determined by θ and $V_B$>L8, it is concluded that a considerable rolling of the vehicle is observed, and Y=I is set.

Figure 41:
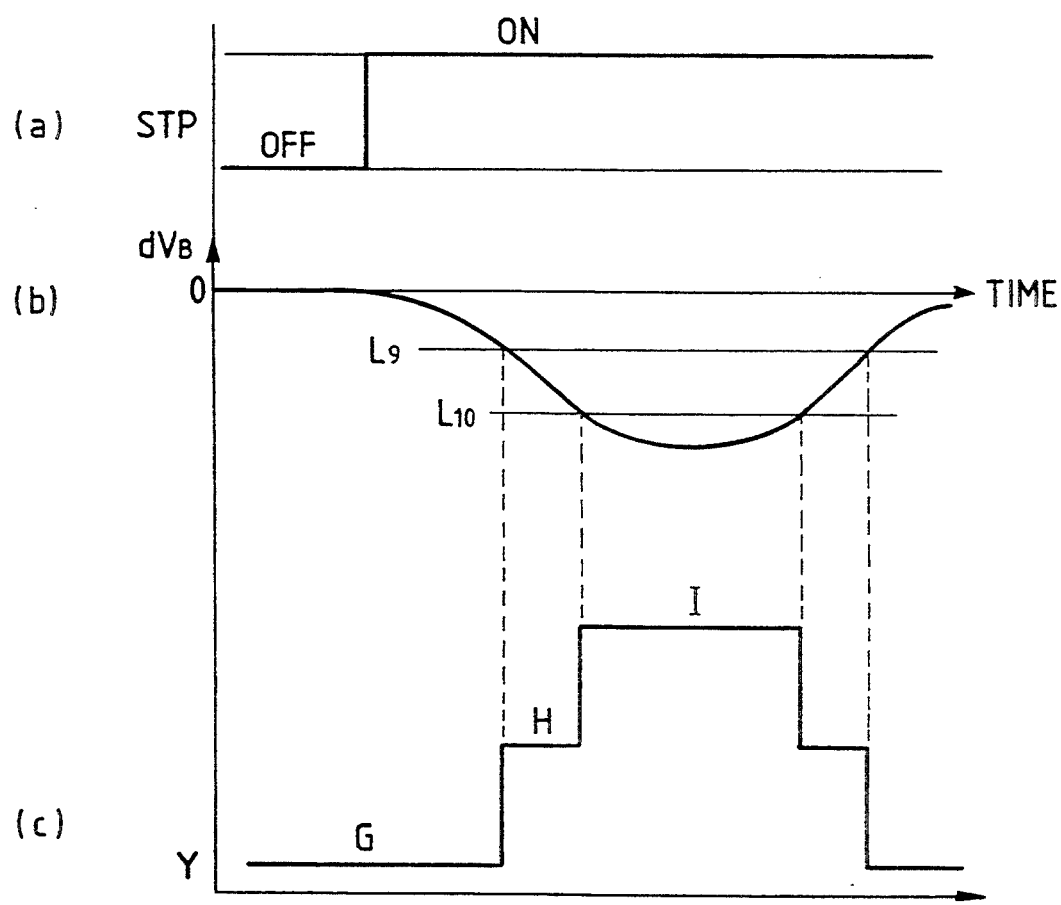
FIG. 41 is a diagram showing the relationship between a stop lamp switch judgment STP, a longitudinal direction acceleration $dV_B$, and the attitude change judgment level Y.

At step Q306, the on-off state of the stop lamp switch judgment STP and the result of comparison made between the longitudinal acceleration $dV_B$ and predetermined threshold levels are used to discern a dive of the vehicle among various vehicle attitude change conditions. This step will be described below in detail with reference to FIG. 41. When the stop lamp switch judgment STP is OFF, or when the longitudinal acceleration $dV_B$ is greater than a threshold level L9, it is concluded that no load is shifted toward the front of the vehicle, and the attitude change judgment level Y is set to level G (Y=G). When the stop lamp switch judgment STP is ON and the longitudinal acceleration $dV_B$ is greater than or equal to a threshold level L10 and is smaller than or equal to the threshold level L9 (L10≦$dV_B$≦L9), it is concluded that load is slightly shifted toward the front of the vehicle due to a soft braking, and the attitude change judgment level Y is set to level H. Similarly, when STP is ON and $dV_B$<L10, it is concluded that load is considerably shifted toward the vehicle front side due to a quick braking, and Y=I is set.

Figure 42:
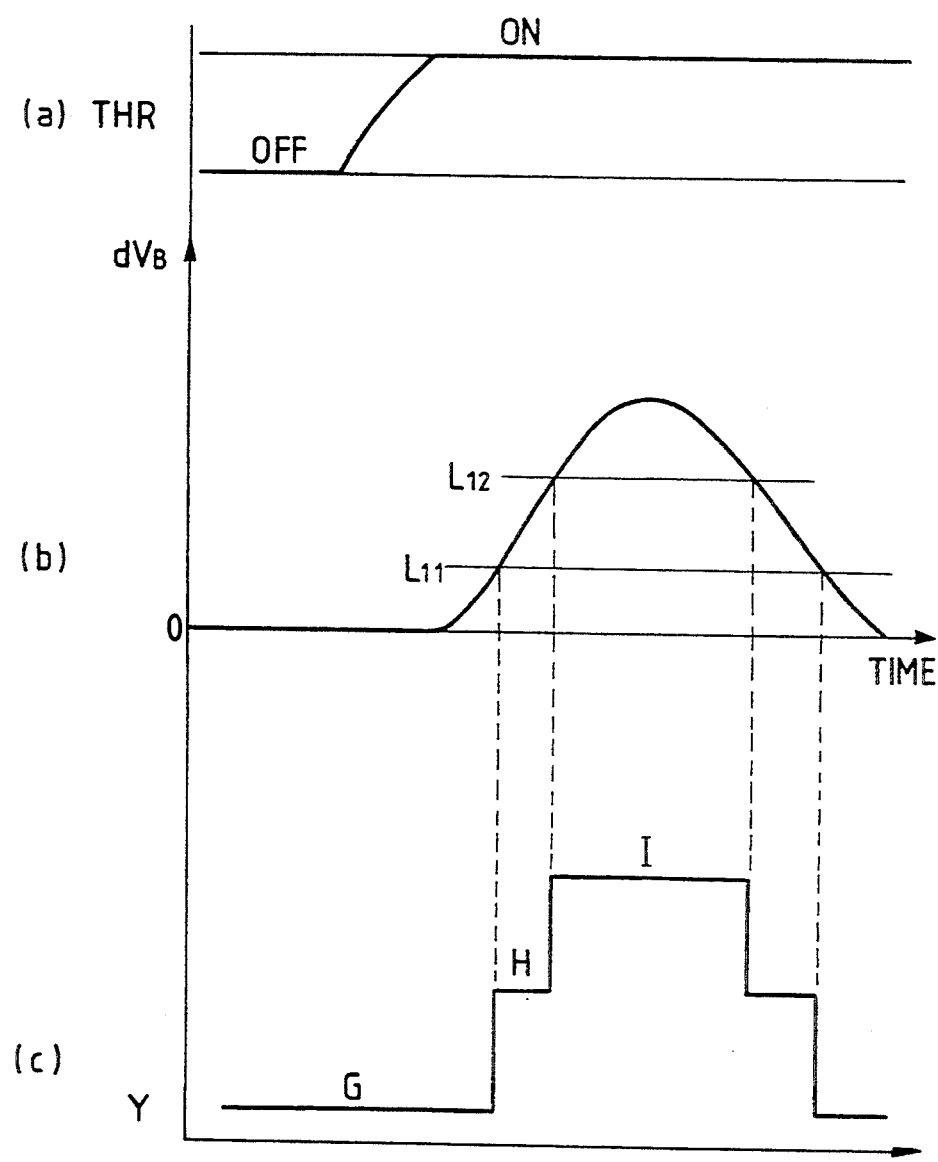
FIG. 42 is a diagram showing the relationship between a throttle opening judgment THR, the longitudinal direction acceleration $dV_B$ and the attitude change judgment level Y.

Then, at step Q307, the on-off state of the throttle opening judgment THR and the result of comparison made between the longitudinal acceleration $dV_B$ and predetermined threshold levels are used to discern a squat of the vehicle among various vehicle attitude change conditions. This step will be described below in detail with reference to FIG. 42. When the throttle opening judgment THR is OFF, or when the longitudinal acceleration $dV_B$ is less than a threshold level L11, it is concluded that no load is shifted toward the rear of the vehicle, and the attitude change judgment level Y is set to level G (Y=G). When THR is ON and the longitudinal acceleration $dV_B$ is greater than or equal to the threshold level L11 and is smaller than or equal to a threshold level L12 (L11≦$dV_B$≦L12), it is concluded that load is slightly shifted toward the vehicle front side due to a soft acceleration, and the attitude change judgment level Y is set to level H. Similarly, when THR is ON and $dV_B$<L10, it is concluded that load is considerably shifted toward the vehicle front side due to a quick acceleration, and Y=I is set.

Judgements on the various vehicle attitude change conditions effected at steps Q304–Q307 are followed by step Q308 at which the attitude change judgment levels Y set at steps Q304–Q307, respectively, are compared with each other and the maximum level is set to a maximum value Y' of all the attitude change judgment levels. In this instance, the attitude change judgment levels have a relation G<H<I. For example, when the attitude change judgment level Y set at step Q304 is G (Y=G), the attitude change judgment level Y set at step Q305 is H (Y=H), the attitude change judgment level Y set at step Q306 is I (Y=I), and the attitude change judgment level Y set at step Q307 is G (Y=G), the maximum value Y' among four attitude change judgment levels is I (Y'=I).

Figure 43:
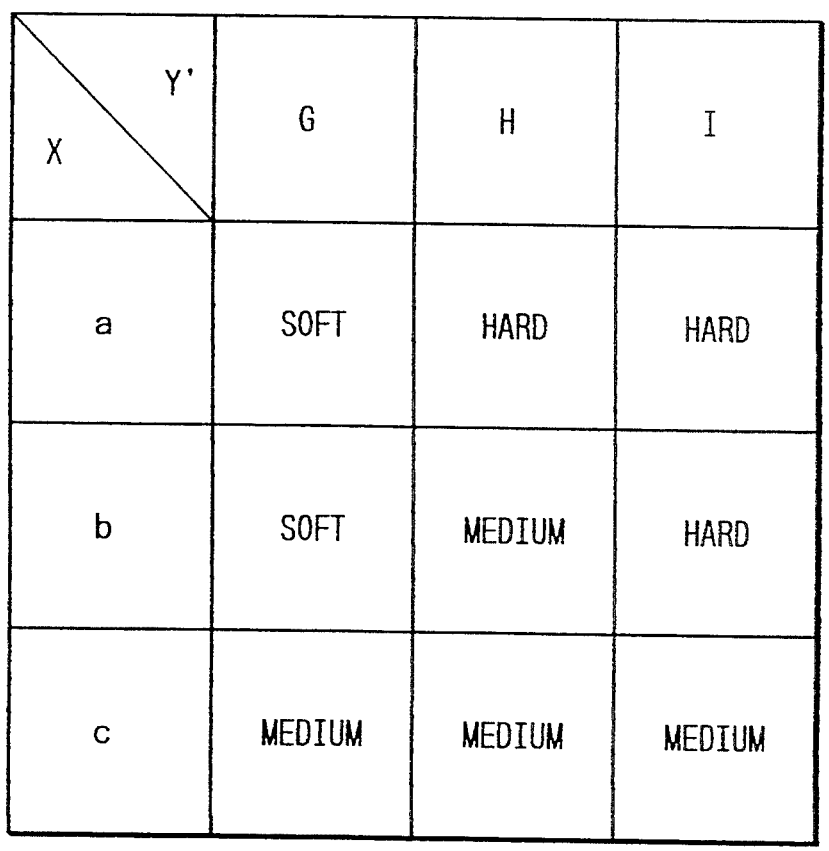
FIG. 43 is a map used for setting a damping force from the attitude change judgment level Y and the road surface judgment level x.

After the judgment on the road surface condition (roughness of the road surface) and the judgment on the various vehicle attitude change conditions complete at step Q302 and steps Q304–Q308, respectively, the control procedure advances to step Q309. At step Q309, an optimum damping force of the shock absorber is set based on the road surface judgment level "x" and the maximum value Y' among four attitude change judgment levels. In this instance, an optimum damping force setting operation is achieved with reference to a map shown in FIG. 43. As shown in FIG. 43, when the vehicle attitude change occurs while the vehicle is running on a good road or an average road, the damping force is set to the hard state. On the other hand, when the vehicle attitude change takes place while the vehicle is running on a bad road, the damping force is set to the medium state. With this damping force setting, a bumpy feeling caused by a roughness on the road surface is substantially reduced and, at the same time, the vehicle is prevented from changing its attitude or posture and thus held in an optimum posture. For example, when Y'=1 at step Q308 and x=b at step Q302, then the damping force of the shock absorber is set to the hard state.

After the damping force of the shock absorber is set at step Q310, the control procedure returns to step Q301.

The characteristic of the map shown in FIG. 43 is illustrative rather than restrictive and, therefore, a map of a different character can be used.

Figure 44:
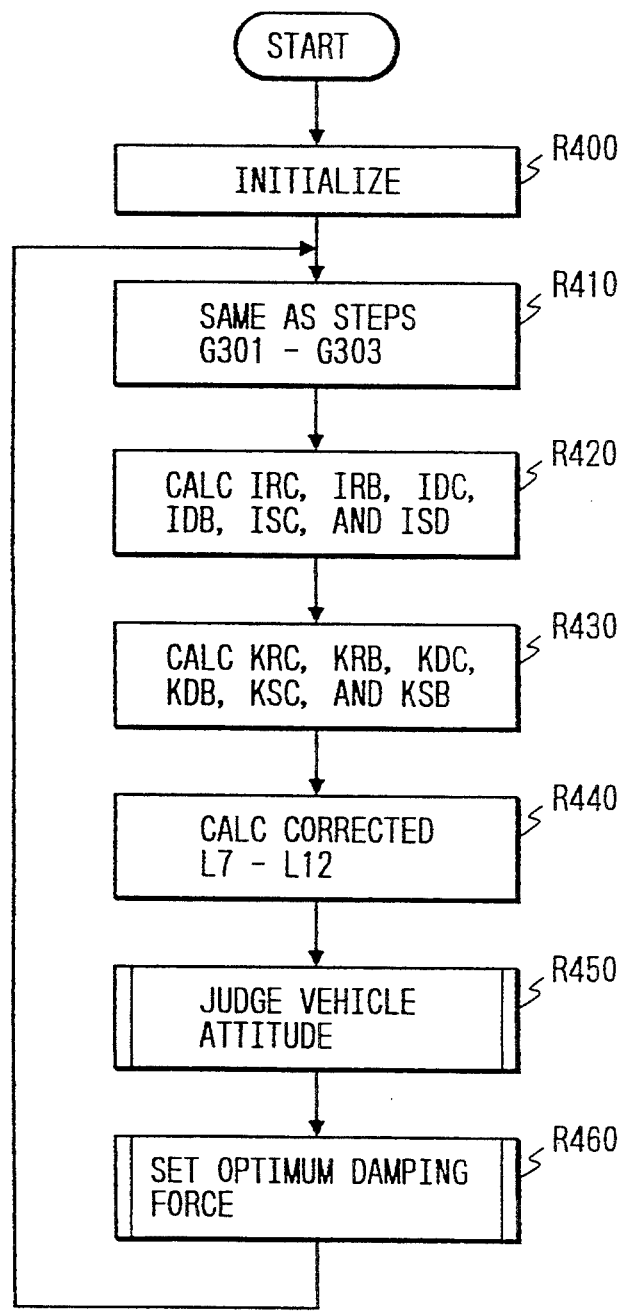
FIG. 44 is a flowchart illustrating the operation of a twentieth preferred embodiment of the present invention.

A description will be given of suspension control system according to a twentieth preferred embodiment of the present invention. The suspension control system of this embodiment is structurally the same as that of the nineteenth embodiment but the control operation thereof is partly different from that of the nineteenth embodiment. The control operation of the twentieth embodiment will be described in greater detail with reference to a flowchart shown in FIG. 44.

At first, step R400 performs initialization of the microcomputer. Then at step R401, the same procedures as G301–G303 shown in FIG. 17 are effected whereby the wheel speed $V_W$, a steering angle θ, a stop lamp switch judgment STP, a throttle opening judgment THR, a filtered estimated vehicle speed $V_{US}$, a wheel acceleration $dV_W$, a filtered wheel acceleration $dV_a$, a filtered wheel acceleration absolute value $dV_b$, a road surface condition signal $dV_{SP}$, an estimated vehicle speed $V_B$, and a longitudinal acceleration $dV_B$ are obtained.

Figure 45:
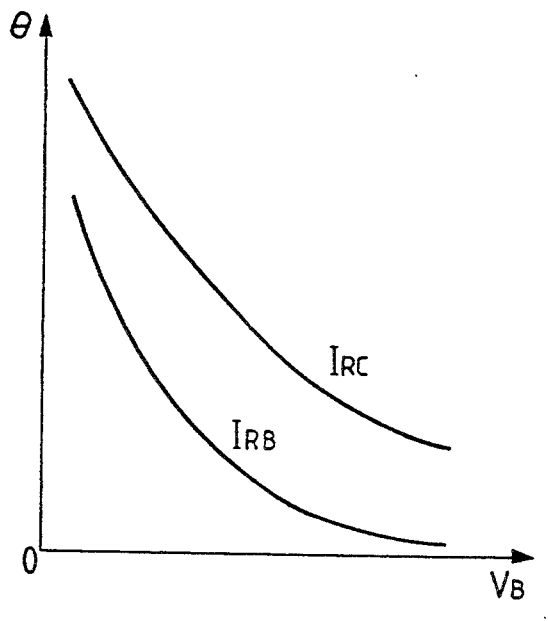
FIG. 45 is a map showing the relationship between the estimated vehicle speed $V_B$ and the steering angle $\theta$.
Figure 46:
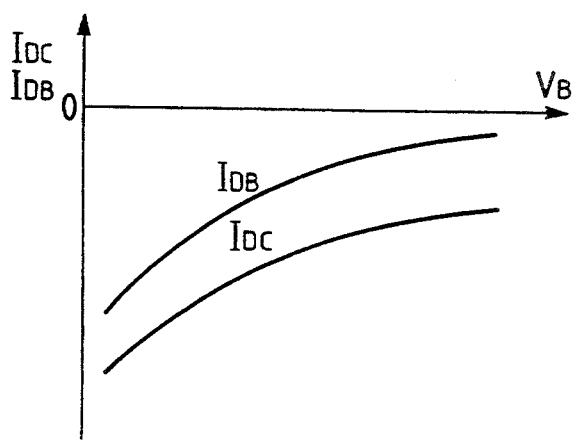
FIG. 46 is a map showing the relationship between the estimated vehicle speed $V_B$ and dive judgment basic levels $1_{DC}$, $1_{DB}$.
Figure 47:
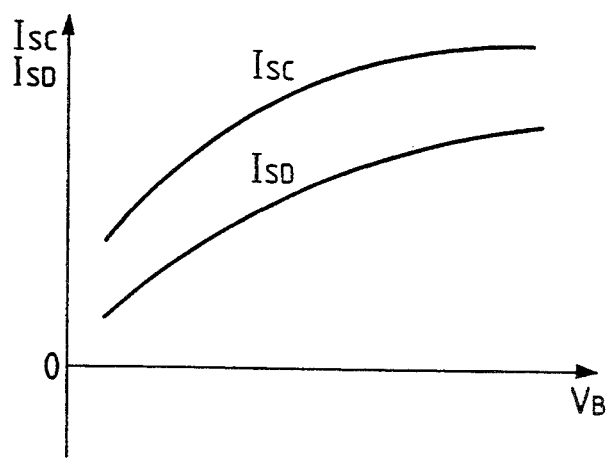
FIG. 47 is a map showing the relationship between the estimated vehicle speed $V_B$ and squat judgment basic levels $1_{SC}$, $1_{SD}$.

Subsequently, step R420 computes, from a map shown in FIG. 45, roll judgment basic levels IRB and IRC used for correcting the threshold levels L7 and L8, and from a map shown in FIG. 46, dive judgment basic levels IDC and IDB used for correcting the threshold levels L9 and L10, and further from a map shown in FIG. 47, squat judgment basic levels ISC and ISD used for correcting the threshold levels L11 and L12. As appears clear from FIGS. 45, 46 and 47, IRB, IRC, IDC, IDB, ISC ISD are variable with the estimated vehicle speed $V_B$.

Figure 48:
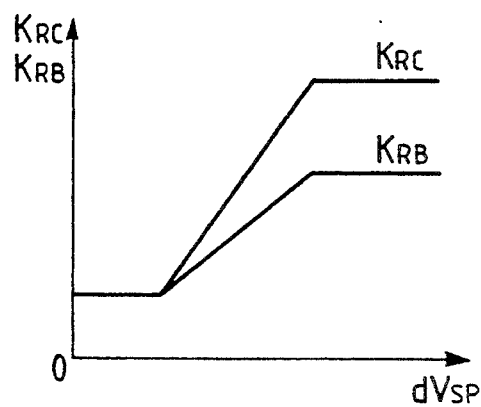
FIG. 48 is a map showing the relationship between the road surface condition signal $dV_{SP}$ and roll judgment correction coefficients $K_{RB}$, $K_{RC}$.
Figure 49:
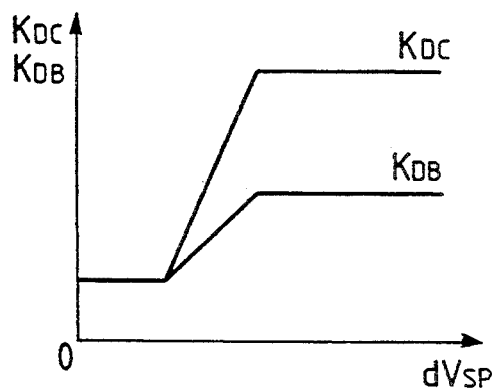
FIG. 49 is a map showing the relationship between the road surface condition signal $dV_{SP}$ and dive judgment correction coefficients $K_{DC}$, $K_{DB}$.
Figure 50:
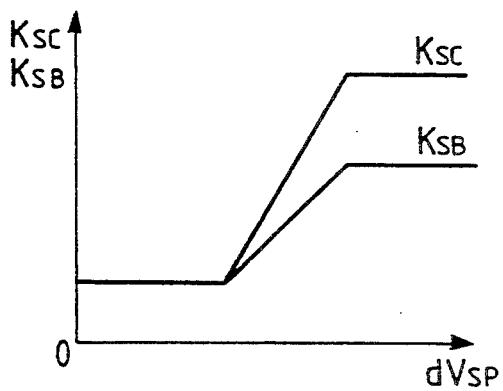
FIG. 50 is a map showing the relationship between the road surface condition signal $dV_{SP}$ and squat judgment correction coefficients $K_{SC}$, $K_{SB}$.

At step R430, from a map shown in FIG. 48 are calculated roll judgment correction coefficients KRB and KRC used for correcting the threshold levels L7 and L8. Similarly, dive judgment correction coefficients KDC and KDB used for correcting the threshold levels L9 and L10 are calculated from a map shown in FIG. 49. In addition, from a map shown in FIG. 50 are calculated squat judgment correction coefficients KSC and KSB used for correcting the threshold levels L11 and L12. As is apparent from FIGS. 48, 49 and 50, KRB, KRC, KDC, KDB, KSC and KSD are variable with the road surface conditions signal $dV_{SP}$.

At step R440, threshold levels L7-12 are corrected with the judgment basic level IRB, IRC, IDC, IDB, ISC and ISD computed at step R420 and the correction coefficients KRB, KRC, KDC, KDB, KSC and KSD computed at step R430, in accordance with the following equations (9)-(14).

$$L7 = IRB \times KRB \quad (9)$$

$$L8 = IRC \times KRC \quad (10)$$

$$L9 = IDB \times KDB \quad (11)$$

$$L10 = IDC \times KDC \quad (12)$$

$$L11 = ISD \times KSD \quad (13)$$

$$L12 = ISC \times KSC \quad (14)$$

At step R450, the corrected threshold levels L7-L12 are used for setting attitude change judgment levels Y (Y=G, H or I) in the same manner as steps Q304-Q307 as well as a maximum value Y' of the attitude change judgment levels in the same manner as step Q308.

When various vehicle attitude change conditions have been discerned at step R450, then an optimum damping force of the shock absorber is set at step R460 on the basis of information obtained at step R450. For instance, when Y'=G at step R450, the damping force is set to the soft state. Similarly, when Y'=H at R450, then the damping force is set to the medium state, and when Y'=I at R450, the damping force is set to the hard state.

As described above, according to the twentieth embodiment, from the road surface condition signal $dV_{SP}$ corresponding to unsprung information there are computed correction coefficients KRB, KRC, KDC, KDB, KSC and KSD which are in turn used to correct the threshold levels L7-L12. As understood from FIGS. 48-50, the correction coefficients KRB, KRC, KDC, KDB, KSC and KSD increase with an increase of the road surface condition signal $dV_{SP}$, so that when the vehicle is running on a bad road, the threshold levels L7-L12 are so corrected as to become greater than before.

Accordingly, even in the instance where a vehicle attitude change occurs, when the vehicle is running on the bad road, it is hardly possible that the signal representing the attitude exceeds the threshold levels and hence the damping force is unlikely to shift to the hard state. It is, therefore, possible to soften the bumpy feeling caused by a roughness on the road surface and also hold the vehicle in an optimum posture or attitude in the same manner as the nineteenth embodiment.

Then, a description will be given of a suspension control system according to a twenty-first preferred embodiment of the present invention. The suspension control system is provided with a mode selection switch which, upon actuation by an occupant (driver or passenger) of the vehicle, is able to switch the damping force of the shock absorber between two states, namely between a normal mode and a sport mode. When the occupant selects the sport mode of the mode selection switch, the damping force is set to a rather hard state. On the other hand, when the normal mode is selected, the damping force is set to a rather soft state than the sport mode. The shock absorber used in this embodiment, likewise one used in any of the foregoing embodiments, has three switchable levels of damping force, namely low, medium and high levels (soft, medium and hard states).

Figure 51:
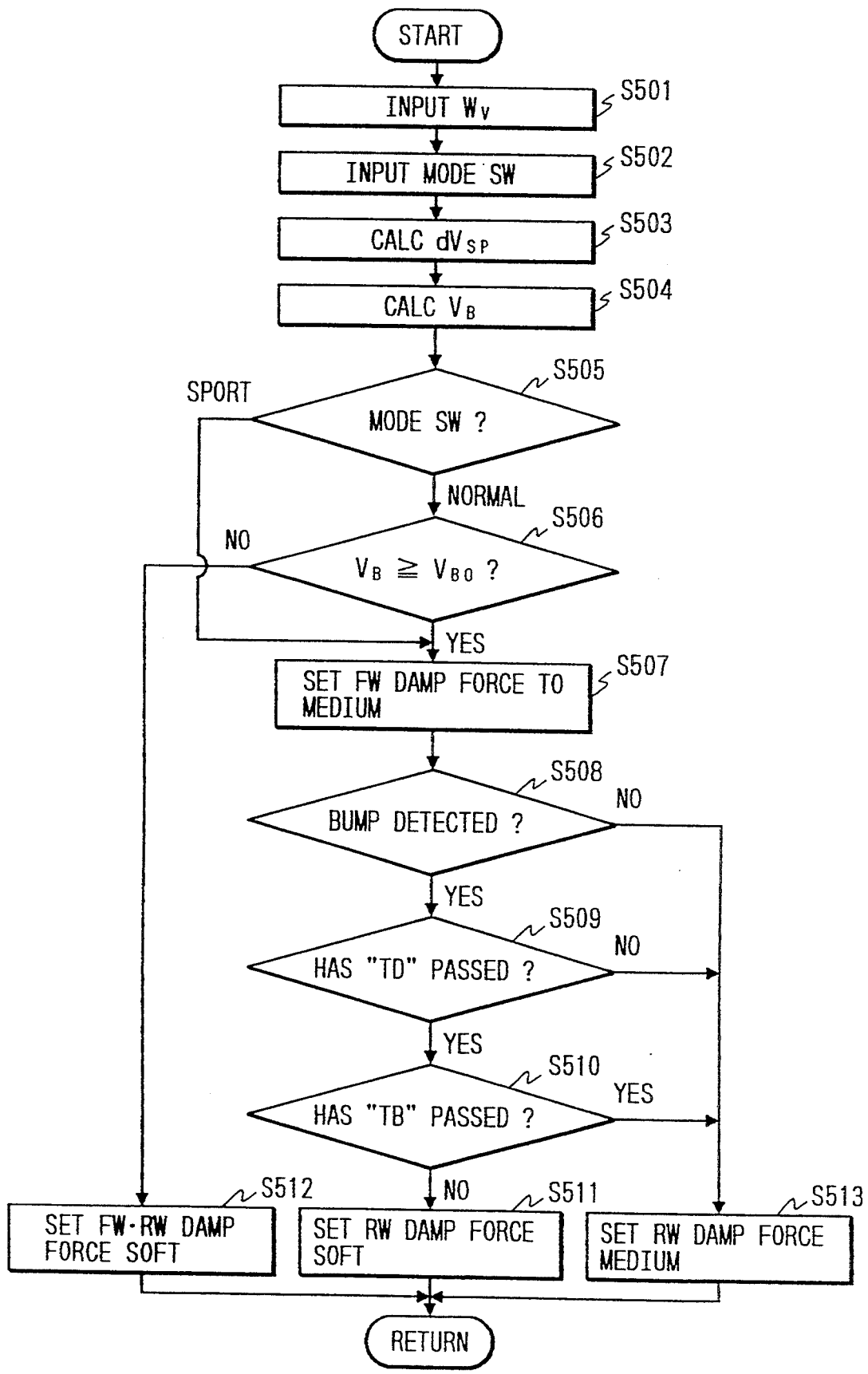
FIG. 51 is a flowchart illustrating the operation of a twenty-first preferred embodiment of the present invention.

The twenty-first embodiment is characterized by a control in which when a roughness on the road surface (a bump on the road surface or a sharp drop in road level) is detected in terms of a change of the front wheel speed in the state that the damping forces of the four shock absorbers are set to a level other than the low level (soft state), the damping force of a shock absorber provided for a rear wheel is temporarily altered to the low level (soft state). The control of this embodiment will be described with reference to a flowchart shown in FIG. 51.

At first, at step S501, the microcomputer inputs the wheel sped $V_W$. Then, the output from the mode selection switch is inputted at step S502 in preparation for determination of the current mode of the damping force of the shock absorbers. Then, at step S503, the same procedures as steps G140-G160 are executed to compute a road surface condition signal $dV_{SP}$. Step S504 executes the same procedures as step G120 to compute an estimated vehicle speed $V_B$. At step S505, it is judged, from the output from the mode election switch inputted at step S502, whether the current setting of the mode selection switch corresponds to the normal mode or the sport mode. If the result at step S505 represents the sport mode, then the control advances to step S507. On the other hand, the result at step S505 indicates the normal mode, the control proceeds to step S506.

Step S506 judges whether or not the estimated vehicle speed $V_B$ is greater than a reference vehicle speed $V_{B0}$. If the result at step S505 is NO, it is concluded that the vehicle is running at a low speed, and the control advances to step S512 at which the damping force of the front wheel side and the damping force of the rear wheel side are both set to the soft state. On the other hand, if result at step S505 corresponds to the sport mode, or if the result at step S506 is YES, the control advances to step S507 at which the damping force of the front wheel side is set to the medium state.

Figure 52:
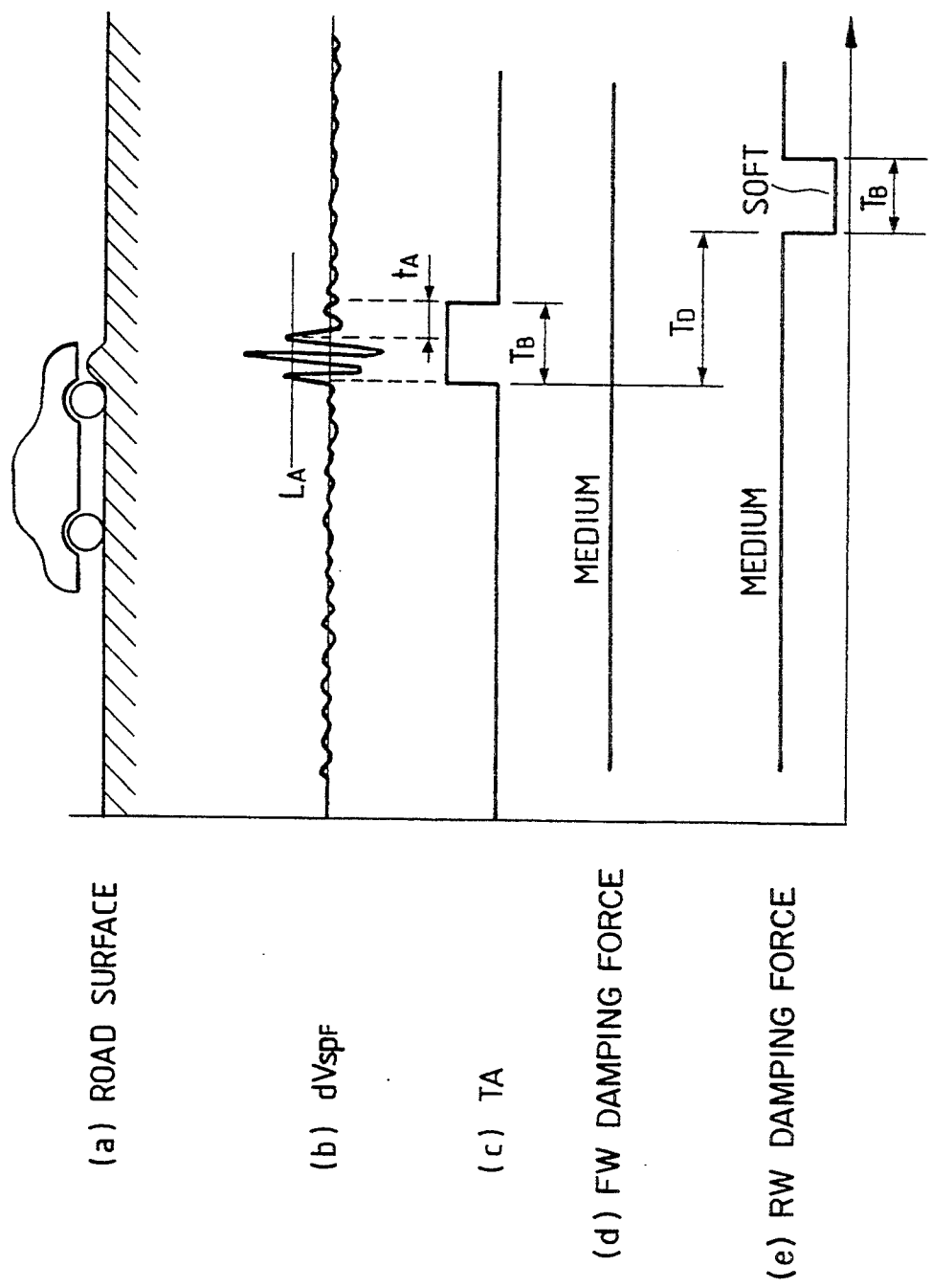
FIG. 52 is a diagram explanatory of the operation of the twenty-first embodiment of the present invention.

Step S508 discerns the road surface condition to determine as to whether or not a bump is present on the road surface. As shown in FIG. 52(b), this step judges whether or not the road surface condition signal $dV_{SPF}$ related to the front wheels is in excess of a threshold level LA. If $dV_{SPF} > LA$, a counter TA associated with the microcomputer stars counting. The counting operation of the counter TA continues until a predetermined time period tA expires after the front wheel side road surface condition signal $dV_{SPF}$ falls below the threshold level LA.

If $dV_{SPF} \leq LA$ at step S508, it is concluded that there is no bump on the road surface, and the control advances to S513 at which the damping force of the rear wheel side is set to the medium state. On the other hand, if $dV_{SPF} > LA$, it is judged that a bump is present on the road surface, and control advances to step S509 which in turn judges whether or not a wheel base delay TD has passed after the front wheel side road surface condition signal $dV_{SPF}$ exceeded the threshold level LA. The wheel base delay TD is calculated, for example, from the following equation (15).

$$TD = W/V_B \qquad (15)$$

where W is the wheel base.

When the result at step S509 indicates that the wheel base delay TD has not expired from the time when the front wheel side road surface condition signal $dV_{SPF}$ became greater than the threshold level LA, it is concluded that the bump on the road surface has cleared the front wheels and is now located between the front wheels and the rear wheels, and the control goes on to step S513 at which the damping force of the rear wheel side is set to the medium state. On the other hand, if the wheel base delay TD has elapsed since $dV_{SPF} > LA$, it is judged that the rear wheels have just cleared the bump or the rear wheels are now clearing the bump, then the control advances to step S510. Step S510 judges whether or not a soft hold time TB has expired from the time when the rear wheel side damping force was set to the soft state. The soft hold time TB is equal to the count number of the counter TA and, hence, it may be said that step S510 judges whether or not a certain time period has elapsed, which time period is equal in length to the time period spent by the front wheels for clearing the bump on the road surface. When the result at step S510 indicates an elapse of the soft hold time TB, it is judged that the rear wheels have passed the bump, and the control advances to step S513 at which the rear wheel side damping force is set to the medium state. On the other hand, the result at step S510 indicates that the soft hold time TB still continues, then the control goes on to step S511 at which the rear wheel side damping force to the soft state.

When any of steps S511, S512 and S513 has completed, the control operation is terminated.

As described above, according to the twenty-first embodiment, in the case where the presence of a bump on the road surface is detected by the front wheels, when a wheel base delay TD from the instance of bump detection elapses, the damping force of the rear wheel side is set to the soft state for a soft hold time TB which is equal in length to the time period needed for the front wheels to clear the bump. Thus, even in the state where the damping forces of the shock absorbers are initially set to the hard state or the medium state, upon detection of the bump on the road surface, the damping force of the rear wheels is rapidly switched to the soft state so that the riding comfort is improved.

In the twenty-first embodiment, the wheel base delay TD is provided. As an alternative, the rear wheel side damping force may be switched to the soft side immediately after a bump on the road surface is detected by the front wheels.

A description will be given of a suspension control system according to a twenty-second preferred embodiment of the present invention. The suspension control system is provided with a brake judgment switch for judging whether or not a brake pedal is depressed, a throttle judgment switch for judging whether or not a throttle pedal is depressed, and an engine rotation sensor for detecting a change of the engine speed. The outputs from these switch and sensor are inputted to the microcomputer.

This embodiment is characterized in that the damping force of the shock absorber is altered in view of sprung resonance frequency components contained in a wheel speed signal and longitudinal speed components generated due to acceleration and deceleration of the vehicle. In this embodiment, the damping force of each shock absorber is switchable between two states, namely between the soft state and the hard state.

The control operation of the twenty-second embodiment will be described with reference to a flowchart shown in FIG. 53.

Figure 54:
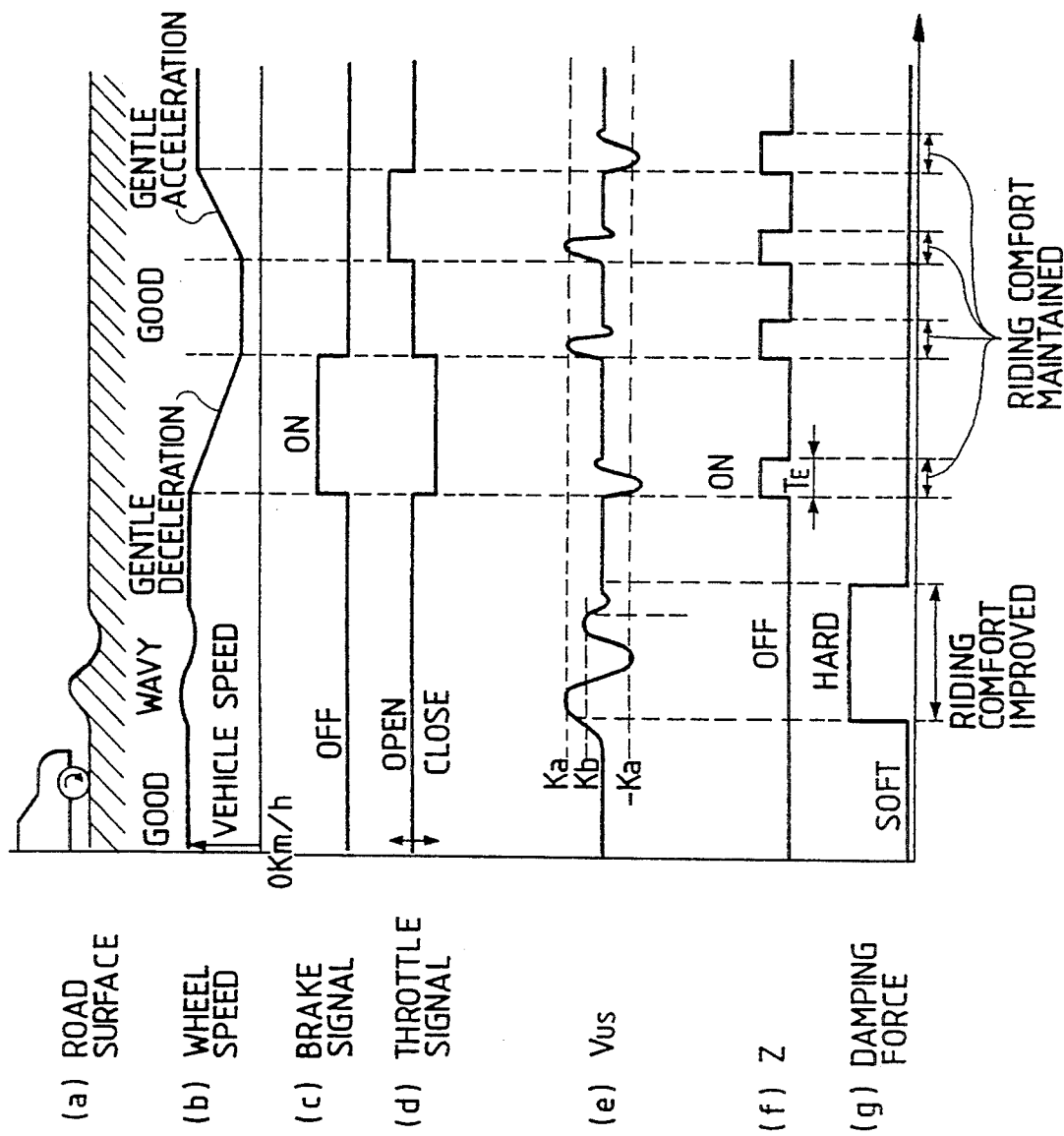
FIG. 54 is a diagram explanatory of the operation of the twenty-second embodiment of the present invention.

At first, the microcomputer is initialized at step T601. Then, at step T602, a wheel speed $V_W$ related to each wheel is inputted. Subsequently, step T603 computes an estimated vehicle speed $V_B$ and a sprung vibration estimation signal $V_{US}$ in the same manner as done at steps G120 and G130 shown in FIG. 17. Then, at step T604, a brake signal and a throttle signal are inputted for discerning a longitudinal behavior of the vehicle. Each time the on-off state of each of the signals inputted at step T604 changes, a longitudinal behavior judgement signal Z is turned on and thereafter holds its ON state for a predetermined period of time TE, as shown in FIG. 54.

Figure 55:
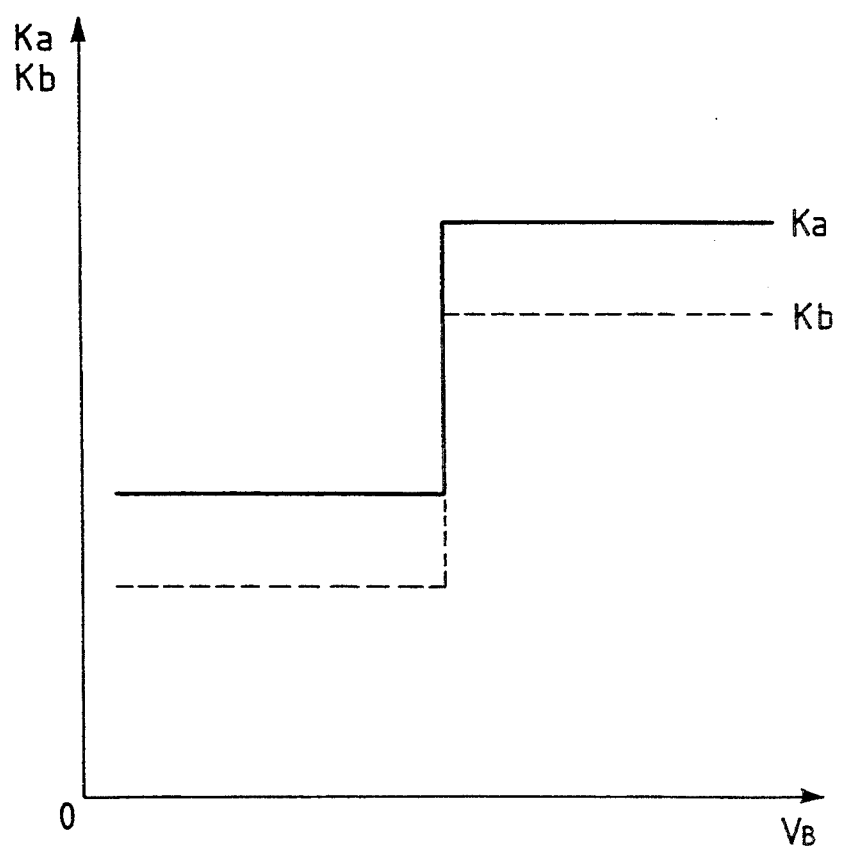
FIG. 55 is a map showing the relationship between the estimated vehicle speed $V_B$ and a judgment level $K_a$ and a return level $K_b$.

At step T605, a judgement level $K_a$ and a return level (end level) $K_b$ are determined by using a map stored in the microcomputer. This map is as shown in FIG. 55. The judgement level $K_a$ and the return level $K_b$ vary with the estimated vehicle speed $V_B$. More specifically, they are set to have higher levels as the vehicle speed increases. In other words, in view of the fact that the entire vehicle behavior becomes greater with an increases of the vehicle speed, the damping force is set to hard to switch to the hard state. The map shown in FIG. 55 should be construed as illustrative rather than restrictive, and a map of a different character can be used.

Step T606 judges whether or not the damping force of the shock absorber is set to the hard state. When the result at T606 is negative, that is, when the damping force is set to the soft state, the control goes on to step T607. Step T607 judges whether or not the sprung vibration estimation signal $V_{US}$ is greater than or equal to the judgement level $K_a$. If the result at step T607 is NO, it is concluded that vibration components having frequencies around the sprung resonance frequency are small and hence no long-term vibration of the vehicle is generated, and the control advances to step T608 at which the damping force of the shock absorber is set to the soft state. On the other hand, if the result at step T607 is YES, it is concluded that vibration components having frequencies around the sprung resonance frequency are great and hence a long-term vibration is generated, and the control goes on to step T612 at which the damping force of the shock absorber is set to the hard state.

When the result at step T606 represents the damping force of the shock absorber set to the hard state, then the control goes on to step T609. Step T609 judges, from the longitudinal behavior judgement signal Z and the sprung vibration estimation signal $V_{US}$, whether or not a longitudinal vehicle behavior is actually generated. In this instance, when the sprung vibration estimation signal $V_{US}$ is greater than or equal to the judgement level $K_a$ and when the longitudinal behavior judgement signal Z is "off", this means that the vehicle speed is not varied even if the driver has not altered the braking and accelerating operations (that is, even if no longitudinal vehicle behavior is generated). Thus, it is concluded that the vehicle is running on a wavy road and a vehicle long-term vibration is generated. On the other hand, when $V_{US} \geq K_a$ and Z is "on", this means that the driver has altered the braking and accelerating operations and thus the vehicle speed is changed due to generation of a longitudinal vehicle behavior. Thus, it is concluded that the vehicle is running on a good road and no long-term vibration is generated, and the control advances to step T613. Step T613 judges whether or not the damping force is to be set to the soft state or to the hard state in view of the degree of acceleration/deceleration. When the result at step T613 is YES, the control advances to step T608 at which the damping force of the shock absorber is set to the soft side. On the other hand, if the result at step T608 is NO, then the control goes on to step T614 at which the damping force of the shock absorber is set to the hard state for a predetermined period of time.

On the other hand, the result of a judgement indicates that no vehicle long-term vibration is generated, the control advances to step T608 at which the damping force of the shock absorber is set to the hard state.

When the result at step T609 indicates the occurence of a long-term vibration, then the control advances to step T610 at which the sprung vibration estimation signal $V_{US}$ is compared with the return level $K_b$. In this instance, if $V_{US} \geq K_b$, the control goes on to step T612 at which the damping force of the shock absorber is set to the hard state, thereby preventing the generation of a long-term vibration. On the other hand, if $V_{US} < K_b$, the control advances to step T611. Step T611 judges whether or not a delay period T0 from the instance where the sprung vibration estimation signal $V_{US}$ becomes below the return level $K_b$ has expired. If the delay period TD has already expired, it is concluded that the vehicle long-term vibration has been suppressed, and the control advances to step T608 at which the damping force of the shock absorber is set to the soft state. On the other hand, the delay period TD has not expired, it is concluded that the vehicle long-term vibration is still existing. Thus, the control goes on to step T612 at which the damping force of the shock absorber is set to the hard state and thus prevents the generation of a long-term vibration.

When the procedure at step T608 or at step T612 has completed, the control operation is terminated.

As described above, according to the twenty-second embodiment of the present invention, a vehicle long-term vibration condition representing sprung information is combined with a longitudinal vehicle behavior condition so as to preclude the unnecessary setting of the damping force to the hard state which would otherwise occur when the vehicle is running on a good road. Thus, a satisfactory riding comfort is maintained. Only when the vehicle is running on a wavy road, the damping force of the shock absorber is set to the hard state to prevent generation of a long-term vibration, thereby improving the riding comfort of the vehicle.

In the twenty-second embodiment, the condition of a longitudinal vehicle behavior is determined based on a brake signal and a throttle signal. If a fine control is necessary, a steering signal, an engine speed signal, and a shift-lever signal may be used in combination with the brake signal and the throttle signal.

Figure 53:
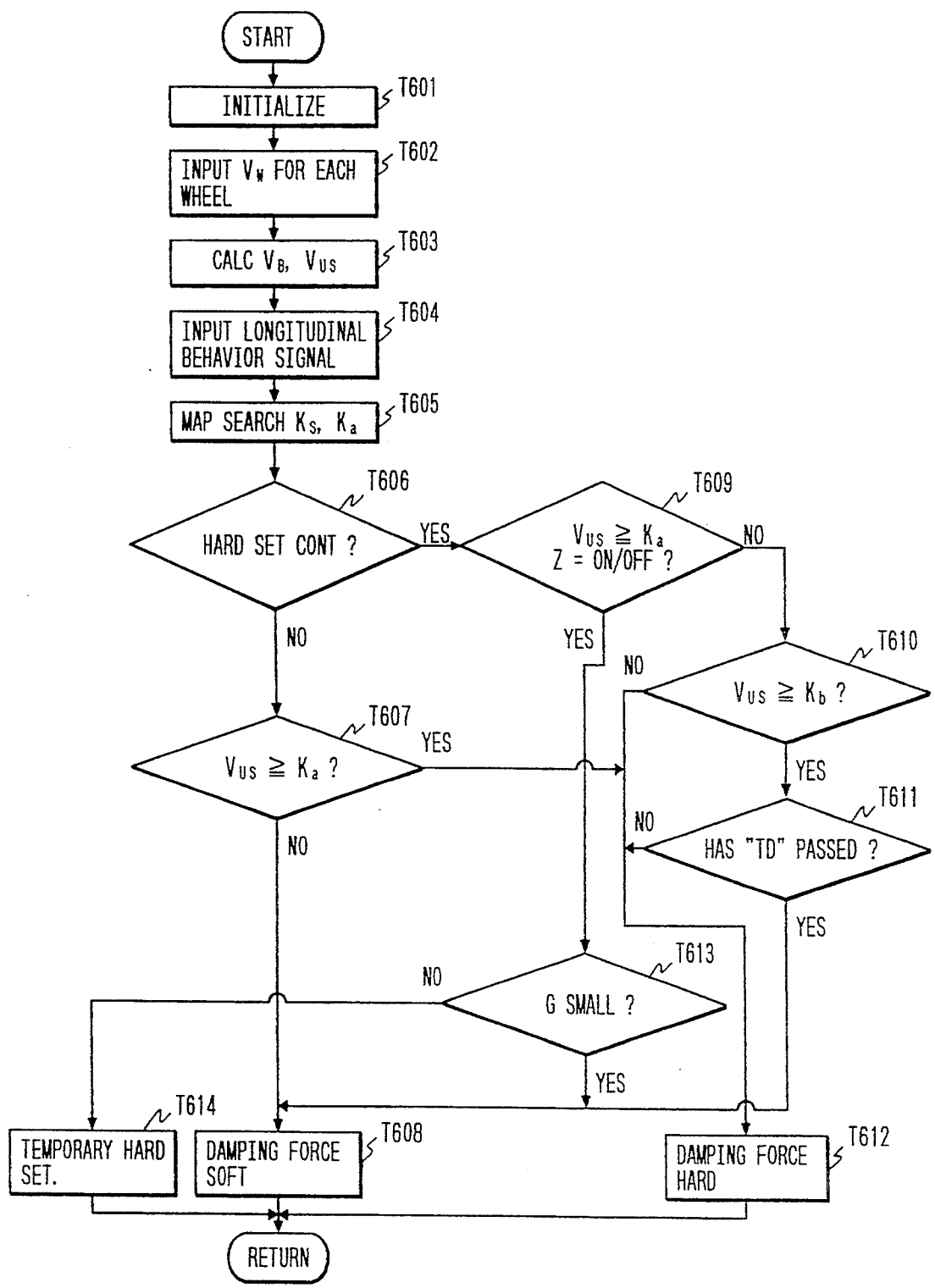
FIG. 53 is a flowchart illustrating the operation of a twenty-second preferred embodiment of the present invention.
Figure 56:
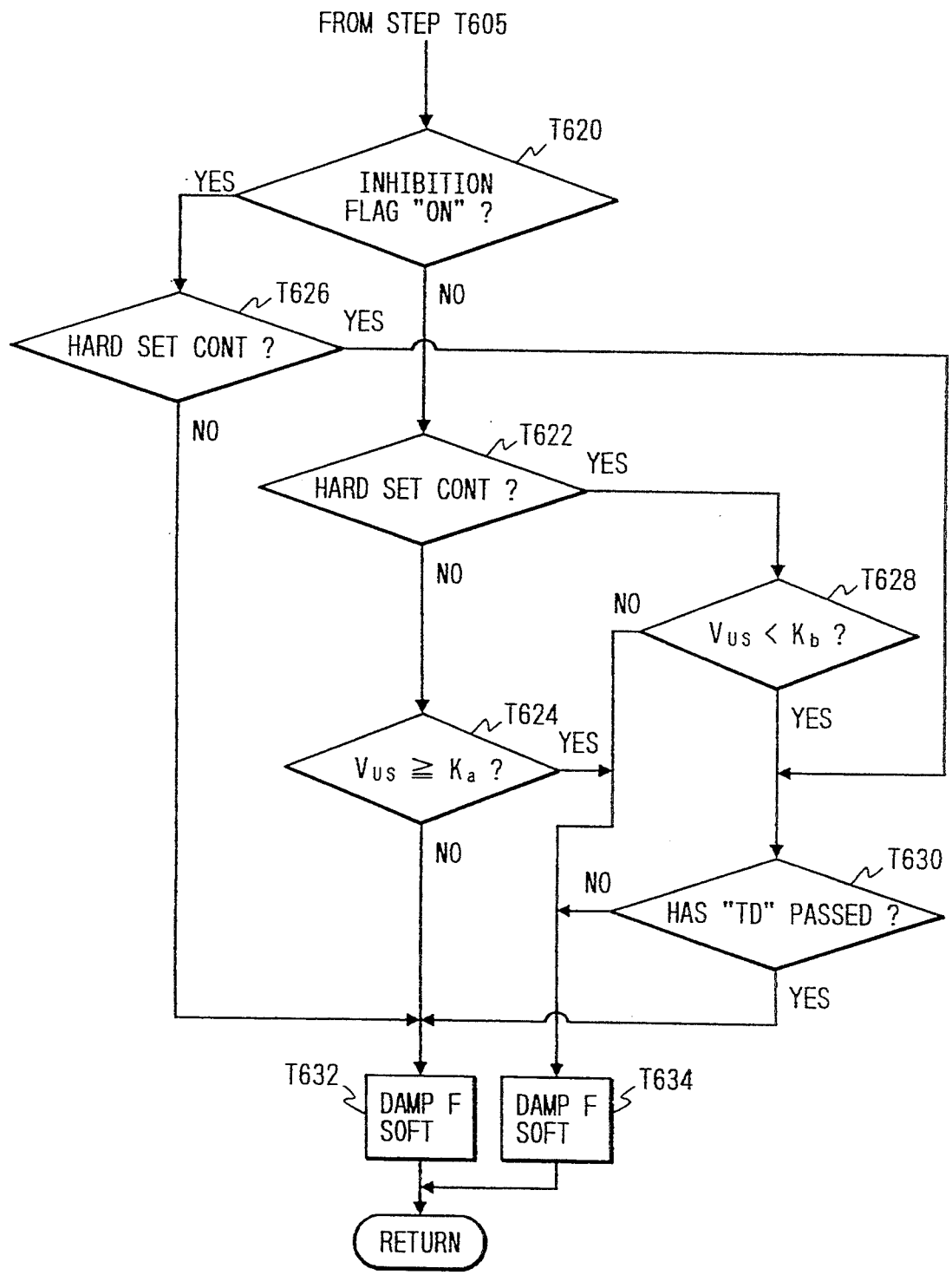
FIG. 56 is a flowchart illustrating the operation of a twenty-third preferred embodiment of the present invention.

When a highly accurate long-term vibration judgment operation is needed, steps T606–T614 of the twenty-second embodiment shown in FIG. 53 can be replaced with steps T620–T634 of a twenty-third embodiment shown in FIG. 56.

Procedures executed at steps T620–T634 will be described below in greater detail.

Step T620 is effected to avoid an erroneous long-term vibration judgment which may be caused when a longitudinal vehicle behavior is estimated. To this end, step T620 judges whether or not any of the conditions (a)–(c) described above with respect to the sixth embodiment is satisfied.

Figure 57:
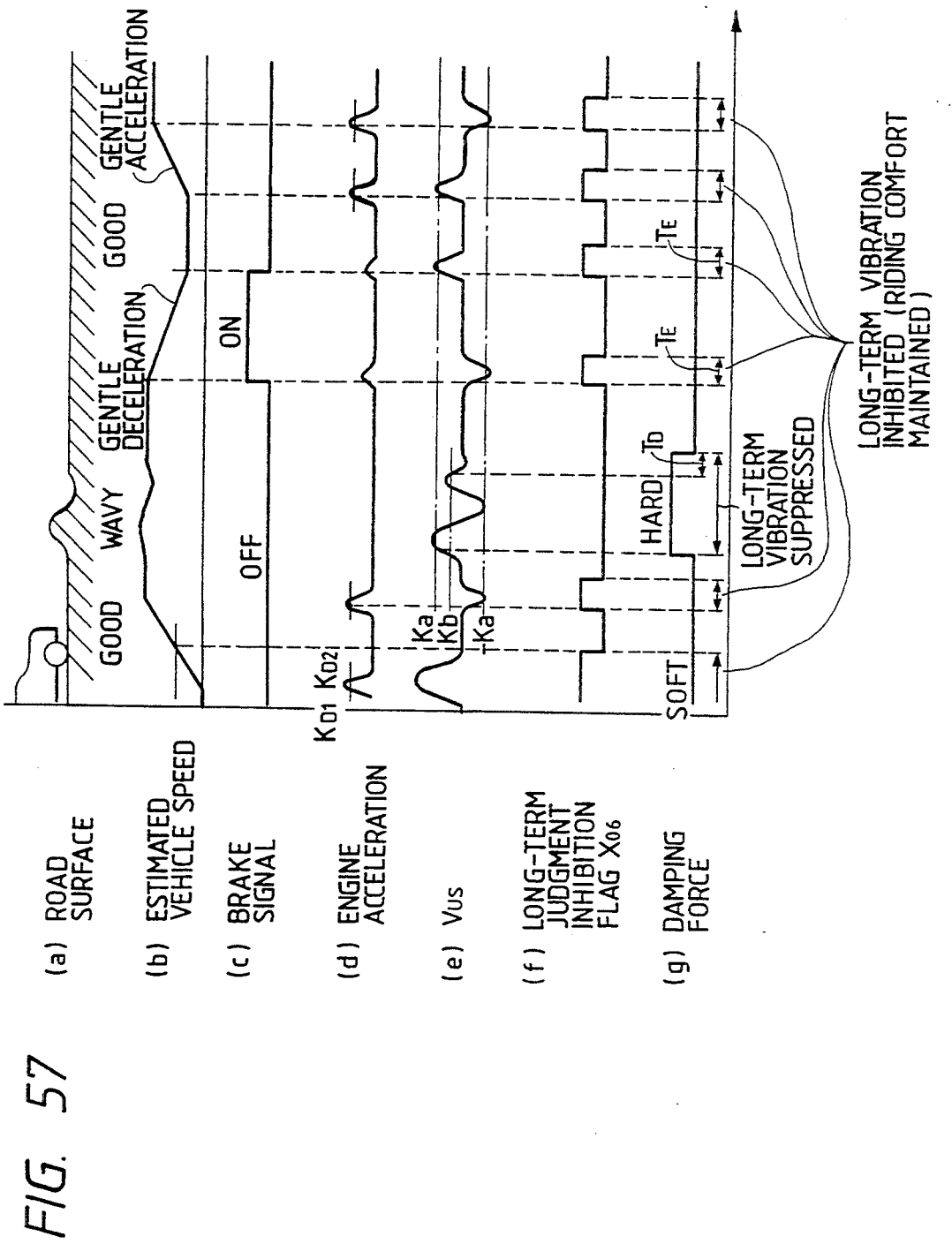
FIG. 57 is a diagram explanatory of the operation of the twenty-third embodiment of the present invention.

When any of the conditions (a)–(c) is satisfied, a long-term vibration judgment inhibition flag $X_{06}$ is set to 1 (ON state), as shown in FIG. 57. An engine acceleration is computed after an engine pulse signal is inputted at step T604 shown in FIG. 53. In order to set the long-term vibration judgment inhibition flag $X_{06}$, at least one or any combination of the conditions (a)–(c) can be used.

When the required condition for inhibiting the long-term vibration judgment is not satisfied, that is, when the long-term vibration judgment inhibition flag $X_{06}$ is reset to zero (OFF state), the control advances to step T622 at which a judgment is carried out to determine as to whether a long-term vibration is generated and the damping force is set to the hard state.

If the result at step T622 indicates the setting of the damping force to the soft state, the control advances to step T624 at which a judgment is achieved to determine as to whether the sprung vibration estimation signal $V_{US}$ is greater than or equal to the judgment level $K_a$. When the result at step T624 is NO, it is concluded that vibration components having frequencies around the sprung resonance frequency are small and hence no long-term vibration is generated, and the control goes on to stop T632 at which the damping force of the shock absorber is set to the soft state. On the other hand, if the result at step T624 is YES, it is concluded that vibration components having frequencies around the sprung resonance frequency are great and hence a long-term vibration is generated. Then, the control advances to step T634 at which the damping force of the shock absorber is set to the hard state.

When the result at step T622 indicates that the damping force is set to the hard state, then the control goes on to step T628. At step T628, the sprung vibration estimation signal $V_{US}$ is compared with the return level $K_b$. In this instance, if $V_{US} \geq K_b$, then the control goes on to step T634 at which the damping force of the shock absorber is set to the hard state, thereby preventing generation of a long-term vibration. On the other hand, if $V_{US} < K_b$, then the control advances to step T630 at which a judgment is achieved to determine whether or not a delay time TD from the instance of $V_{US} < K_b$ has expired. When the delay time TD has already expired, it is concluded that the vehicle longterm vibration has been suppressed, and the control goes on to step T362 at which the damping force of the shock absorber is set to the soft state. On the other hand, the delay time TD has not expired, it is concluded that the long-term vibration is still existing, and the control advances to step T634 at which the damping force of the shock absorber is set to the hard state, thereby suppressing the vehicle long-term vibration.

When the long-term vibration judgment inhibition flat $X_{06}$ is ON at step T620, this means that the vehicle is in accelerated or decelerated condition and a longitudinal vehicle behavior is generated. In this condition, the sprung vibration estimation signal $V_{US}$ becomes great and, hence, the standing condition may be erroneously judged as involving the generation of a long-term vibration. In order to avoid such erroneous judgment, a judgment is executed at step T626 so as to determine whether or not the damping force has already been set to the hard state owing to a long-term vibration occurred at the preceding cycle of control operation. If the result at step T626 is NO, this means that the damping force is set to the soft state. Then the control advances to step T632 and thus maintains the damping force in the soft state. On the other hand, if the result at step T626 is YES, this means that the damping force has already been set to the hard state due to the presence of the prior stay. Then, the control advances to step T630 at which a judgment is made to determine whether or not the delay time TD from the instance of $V_{US} < K_b$ has expired. When the delay time TD has expired, it is concluded that the long-term vibration has been suppressed, and the control advances to step T632 at which the damping force of the shock absorber is set to the soft state. On the other hand, when the delay time TD has not expired, it is concluded that the occurrence of a long-term vibration still continues, and the control advances to step T634 at which the damping force of the shock absorber is set to the hard state, thereby preventing the generation of a long-term vibration.

When the procedure at step T632 or step T634 has completed, the control operation is terminated.

As described above, according to the twenty-third embodiment of the present invention, the condition of a long-term vibration representing sprung information is combined with a longitudinal vehicle behavior condition as shown in FIG. 57, so as to preclude the unnecessary setting of the damping force to the hard state which would otherwise occur when the vehicle is running on a good road. Thus, a satisfactory riding comfort is maintained. Only when the vehicle is running on a wavy road, the damping force of the shock absorber is set to the hard state to prevent generation of a long-term vibration, thereby improving the riding comfort of the vehicle.

Various modifications of the twenty-third embodiment described above are possible according to the present invention.

For example, to the conditions (a)-(c) for setting the long-term vibration judgment inhibition flag may be added a condition (d) which requires that the engine speed is smaller than a predetermined speed (for example, 300 rpm). This condition (d) will supplement the condition (c) when an engine speed signal is not available due to a break in the wire. When the condition (d) is satisfied at step T620 (FIG. 56), it is concluded that an accident happened. Then the control advances to step T632 for returning the damping force of the shock absorber to the i condition (soft state) before the control is effected. As an alternative, an appropriate process for holding the damping force in a fixed level may be performed. As a condition for setting the long-term vibration judgment inhibition flag, it is possible to use a signal representing an accelerated or decelerated condition, such as a wheel acceleration $dV_W$ signal or a variation of the wheel acceleration $dV_W$. In this instance, if the result at step T620 indicates the presence of an accelerated or decelerated condition, the long-term vibration judgment inhibition flag is set to ON and, subsequently, the same procedures as done in the twenty-third embodiment are executed.

A description will be given of a twenty-fourth embodiment of the present invention. This embodiment is characterized in that a vehicle behavior is detected by using sprung information on a wheel speed difference.

Figure 58:
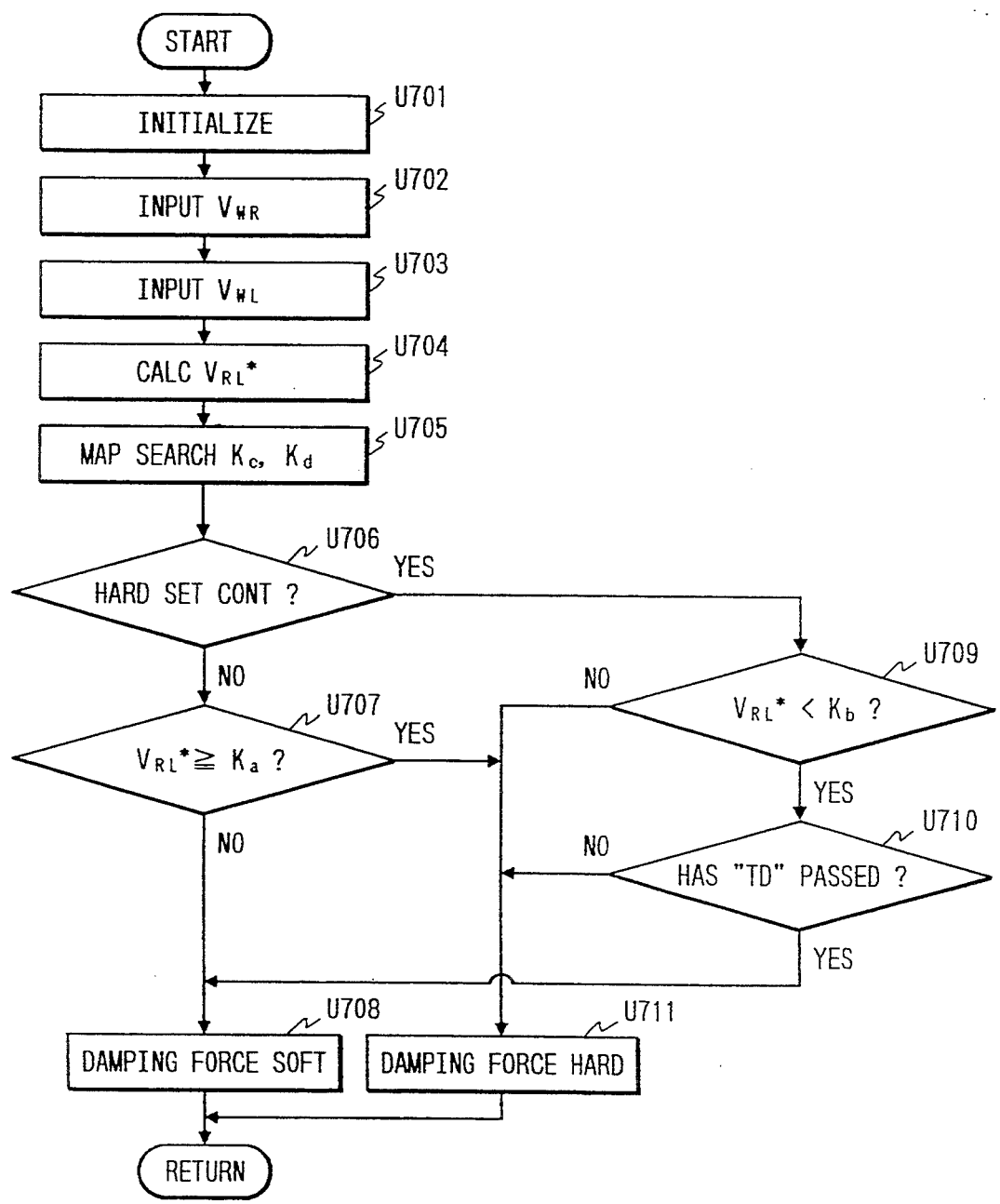
FIG. 58 is a flowchart illustrating the operation of a twenty-fourth preferred embodiment of the present invention.

The control operation according to this embodiment will be described with reference to a flowchart shown in FIG. 58.

At first, the microcomputer is initialized at step U701. Then, at step U702, a right wheel speed $V_{WR}$ and a left wheel speed $V_{WL}$ are inputted to the microcomputer. Subsequently, step U704 computes a speed difference $V_{RL}$ between the right wheel speed $V_{WR}$ and the left wheel speed $V_{WL}$ that are inputted at step U702. The speed difference $V_{RL}$ thus computed is then subjected to a band-pass filtering process using a band-pass filter (B.P.F.) passing only those components having frequencies (1–3 Hz) around the sprung resonance frequency. The filtered speed difference signal is amplified and thus a filtered speed difference $V_{RL}^*$ is computed.

Figure 59:
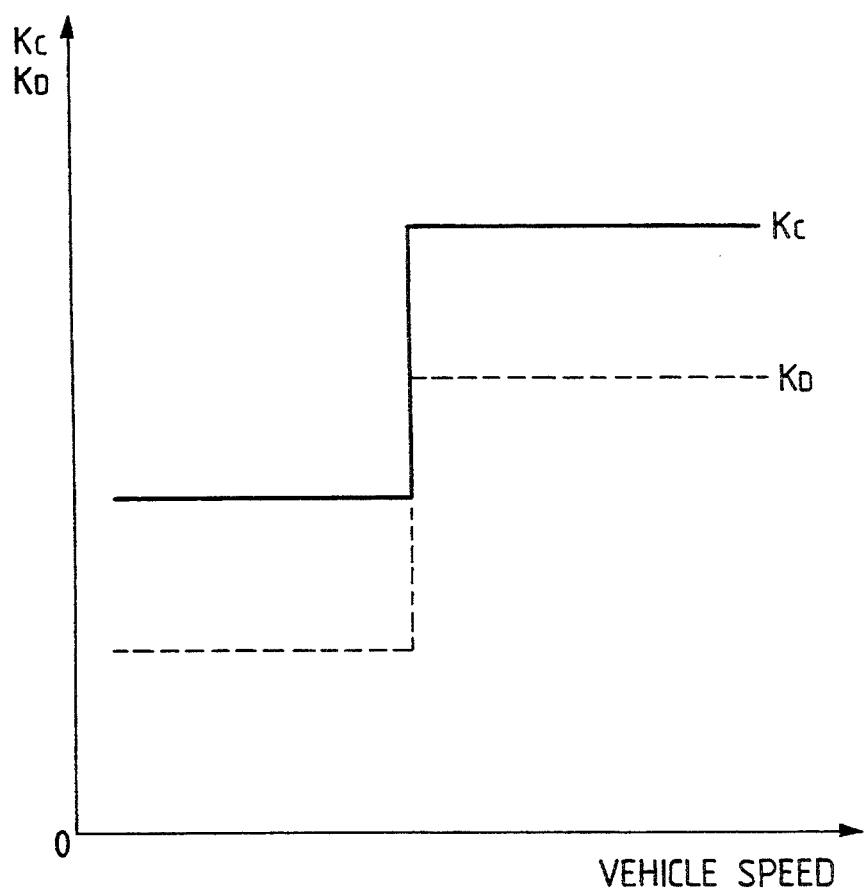
FIG. 59 is a map showing the relationship between the vehicle speed and a judgment level $K_C$ and a return level $K_D$.

At step U705, a judgment level $K_c$ for discerning the occurrence of a roll of the vehicle and a return level (end level) $K_d$ are determined by using a map stored in the microcomputer. This map is as shown in FIG. 59. The judgment level $K_c$ and the return level $K_d$ vary with the vehicle speed. More specifically, they are set to have higher levels as the vehicle speed increases. In other words, as the vehicle speed becomes great, it becomes more and more difficult to switch the damping force to the soft state for a purpose of maintaining a sufficient stability during a high-speed running. The map shown in FIG. 59 should be construed as illustrative rather than restrictive, and a map of a different character can be used.

Step U706 judges whether or not the damping force of the shock absorber is set to the hard state. When the result at U706 is negative, that is, when the damping force is set to the soft state, the control goes on to step U707. Step U707 judges whether or not the filtered speed difference $V_{RL}^*$ is greater than or equal to the judgment level $K_c$. If the result at step U707 is NO, it is concluded that vibration components having frequencies around the sprung resonance frequency are small and hence no rolling is generated, and the control advances to step U708 at which the damping force of the shock absorber is set to the soft state. On the other hand, if the result at step U707 is YES, the control goes on to step U711 at which the damping force of the shock absorber is set to the hard state.

When the result at step U706 represents the damping force of the shock absorber set to the hard state, then the control goes on to step U709 at which the filtered speed difference $V_{RL}^*$ is compared with the return level $K_d$. In this instance, if $V_{RL}^* \geq K_d$, then the control goes on to step U711 at which the damping force of the shock absorber is set to the hard state, thereby preventing the vehicle from rolling. On the other hand, if $V_{RL}^* < K_d$, the control advances to step U710 at which a judgment is made to determine whether or not the delay time TE from the instance of $V_{US} < K_b$ has expired. When the delay time TE has expired, it is concluded that the rolling has been suppressed, and the control advances to step U708 at which the damping force of the shock absorber is set to the soft state. On the other hand, when the delay time TE has not expired, it is concluded that the occurrence of a rolling still continues, and the control advances to step U711 at which the damping force of the shock absorber is set to the hard state, thereby preventing the generation of a rolling.

Figure 60:
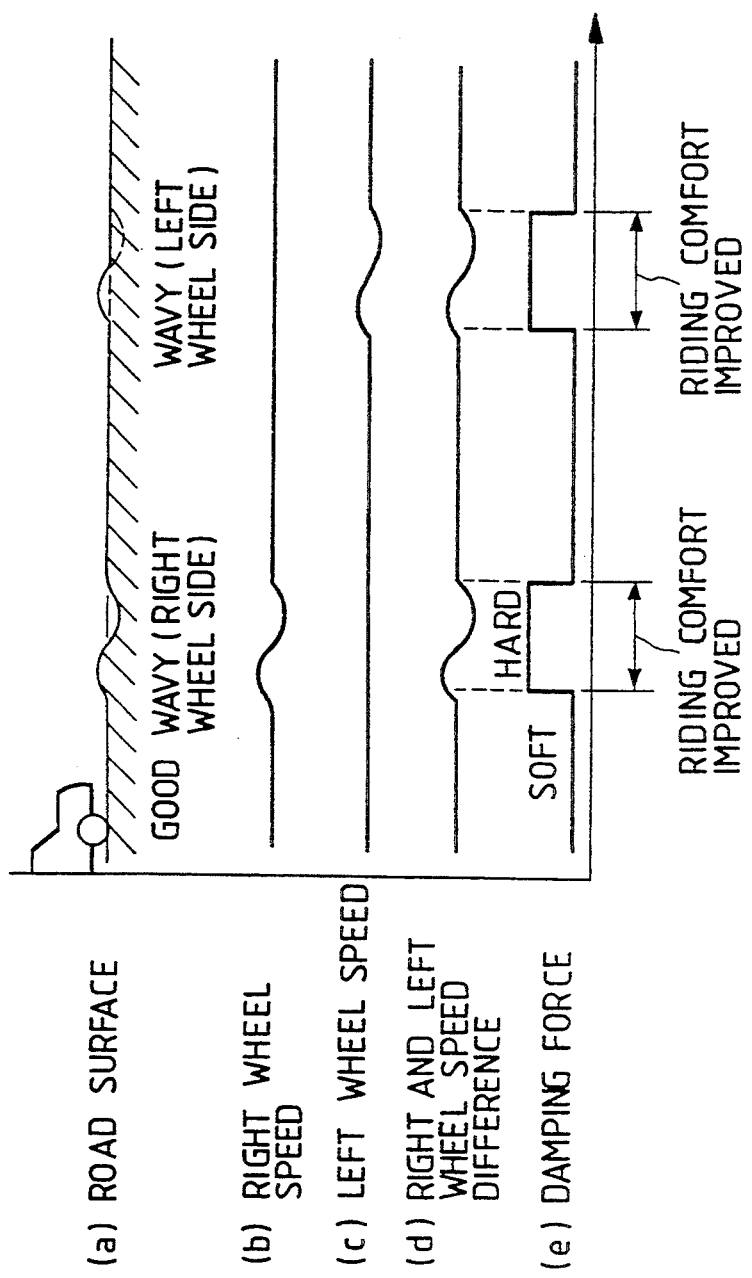
FIG. 60 is a diagram illustrating how the twenty-fourth embodiment operates.

When the procedure at step U708 or step U711 has completed, the control operation is terminated.

according to the twenty-fourth embodiment of this invention, a vehicle roll condition is determined based on the speed difference between right and left wheel speeds, as shown in FIG. 60. Thus, it becomes possible to absorb the occurrence of a rolling caused by asynchronous vertical movements of the right and left wheels when the vehicle is going straight ahead, so that riding comfort is improved.

In the twenty-fourth embodiment described above, a difference in speed between the left and right wheels is used for judging the vehicle roll condition. So far as the judgment of the vehicle behavior depending on the speed difference is concerned, various modifications are possible. For example, the occurrence of a pitching or a bouncing of the vehicle may be judged on the basis of a difference in speed of front and rear wheels. Similarly, a difference in speed of two diagonally opposed wheels may be used to determine the occurrence of a rolling ("warp") about an axis interconnecting the diagonally opposed wheels.

Figure 61:
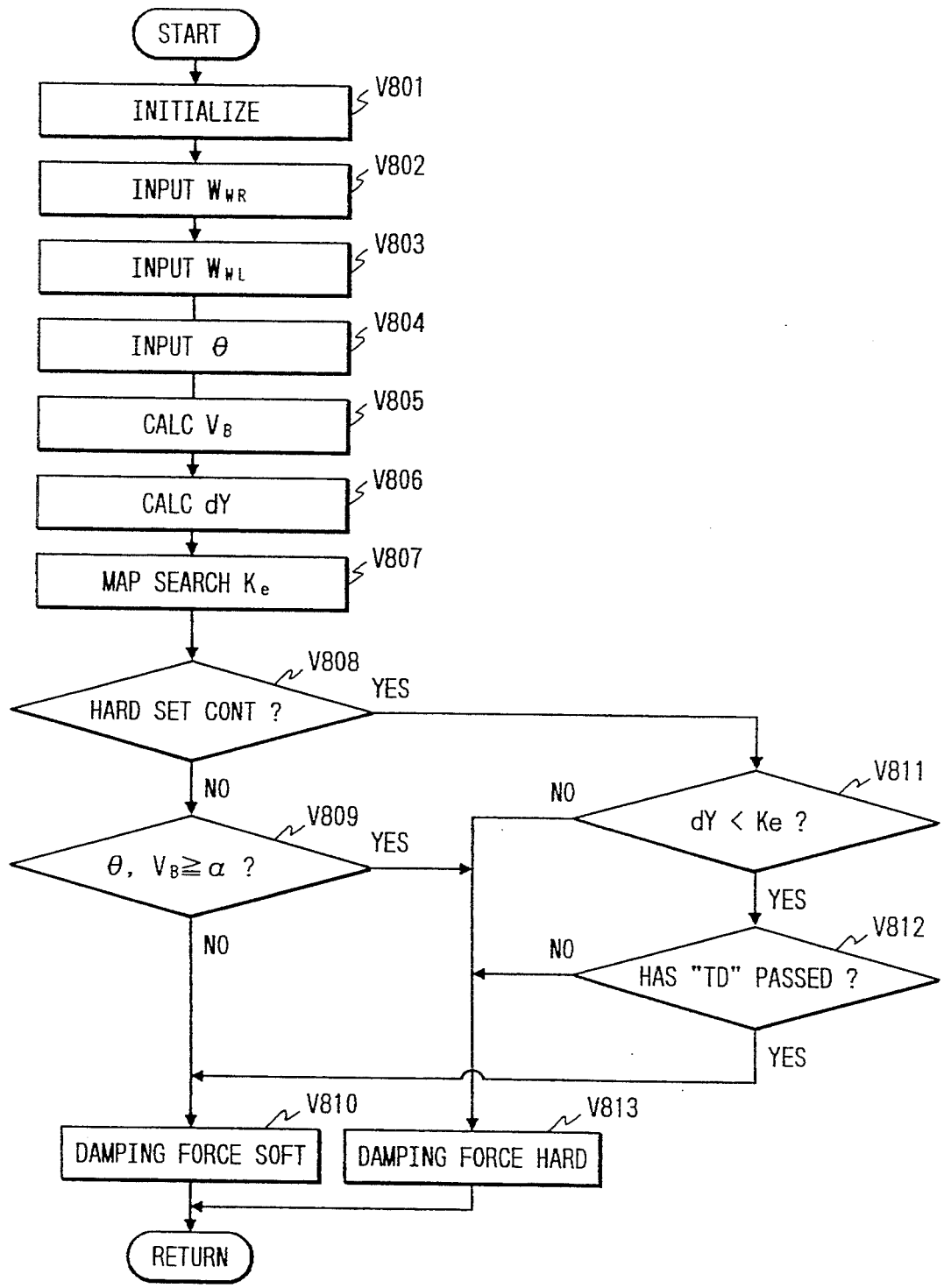
FIG. 61 is a flowchart illustrating the operation of a twenty-fifth preferred embodiment of the present invention.

Then, a twenty-fifth preferred embodiment of the present invention will be described below with reference to a flowchart shown in FIG. 61.

At first, initialization of the microcomputer is effected at step V801. Thereafter, a right wheel speed $V_{WR}$, a left wheel speed $V_{WL}$, and a steering angle $\theta$ calculated in acordance with equation (1) or (8) specified above are inputted at steps V802, V803 and V804, respectively. The steering angle $\theta$ may be inputted via a steering angle sensor provided separately. At step V805, a vehicle speed $V_B$ is computed according to the following equation (16).

$$V_B = (V_{WR} + V_{WL})/2 \quad (16)$$

Thereafter, on the basis of the difference between the right wheel speed $V_{WR}$ and the left wheel speed $V_{WL}$, an actual yaw rate Y is estimated at step V806 in accordance with the following equation (17).

$$Y = \frac{V_{WR} - V_{WL}}{T} \times \frac{180}{\pi} \quad (17)$$

The actual yaw rate Y is differentiated with time to compute a yaw acceleration dY.

Then, at step V807, a return level $K_e$ used for judging yawing is determined by using a map stored in the microcomputer.

Figure 62:
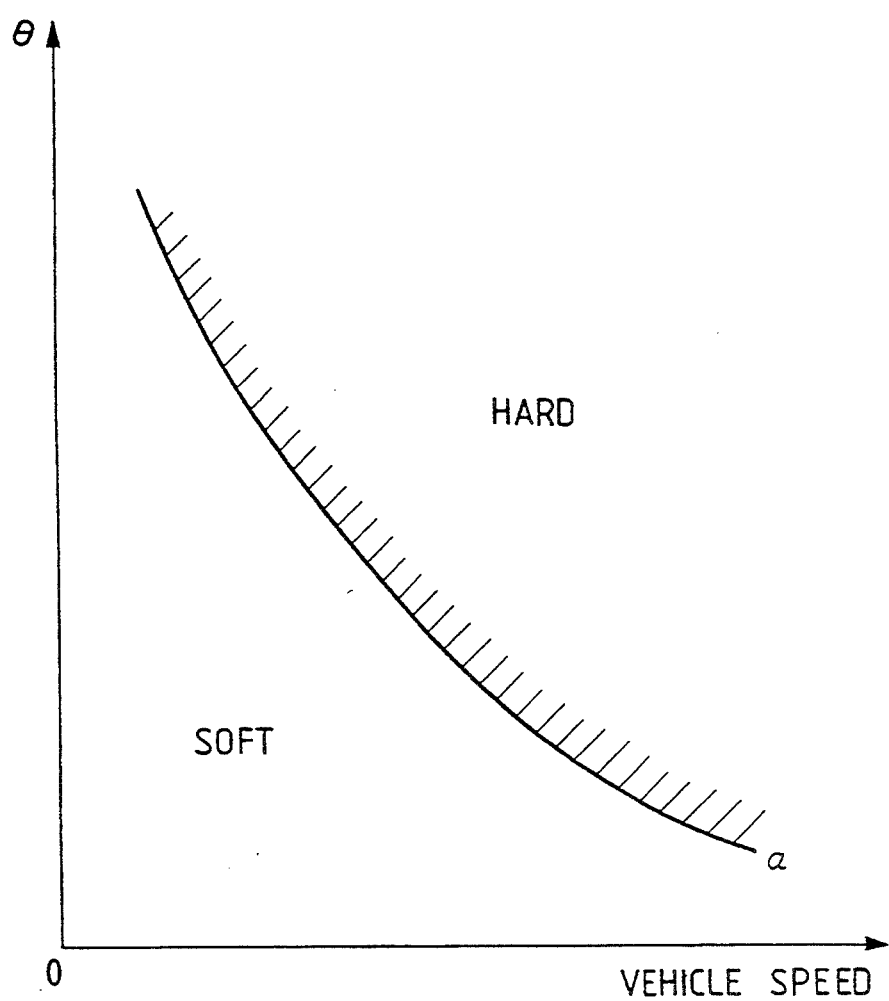
FIG. 62 is a map showing the relationship between the vehicle speed and the steering angle $\theta$.

Subsequently, step V808 judges whether or not the damping force of the shock asorber is set to the hard state. If the result at step V808 is NO, that is, when the damping force is set to the soft state, then the control advances to step V809 at which a judgment on the turning condition is executed using a map shown in FIG. 62. In order to judge the vehicle turning condition, a value which is determined by the vehicle speed $V_B$ and the steering angle $\theta$ is compared with a threshold level $\alpha$, as shown in FIG. 62. When the result at step V809 is NO, that is, when the value determined by $V_B$ and $\theta$ is smaller than the threshold level $\alpha$, it is concluded that the vehicle is making a gentle turn or running without turn, and the control goes on to step V810 at which the damping force of the shock absorber is set to the soft state. On the other hand, when the result at step V809 is YES, then the control goes on to step V813. Thus, the damping force of the shock absorber is set to the hard state at step V813 so that it is possible to dampen a rolling motion caused when the vehicle is making a turn.

When result at step V808 represents the hard state setting of the damping force, the control goes on to step V811 at which the aw acceleration dY is compared with the return level $K_e$. In this instance, when $dY \geq K_e$, it is concluded that a roll is generated due to a sharp or quick turn, and the control advances to step V813 at which the damping force of the shock absorber is set to the hard state, thereby dampening the vehicle roll. On the other hand, when the result at step V808 is $dY < K_e$, the control advances to step V812 at which a judgment is executed to determine whether or not a delay time TF from the instance when $dY < K_e$ has expired. When the delay time has expired, it is decided that the roll has been suppressed. Then, the control goes on to step V810 at which the damping force of the shock absorber is set to the soft state. On the other hand, when the delay time TF has not expired, it is concluded that the roll has not been suppressed. Then, the control advances to step V813 for setting the damping force of the shock absorber to the hard state so that the roll will not occur.

When the procedure at step V810 or step V813 has completed, the control operation is terminated.

Figure 63:
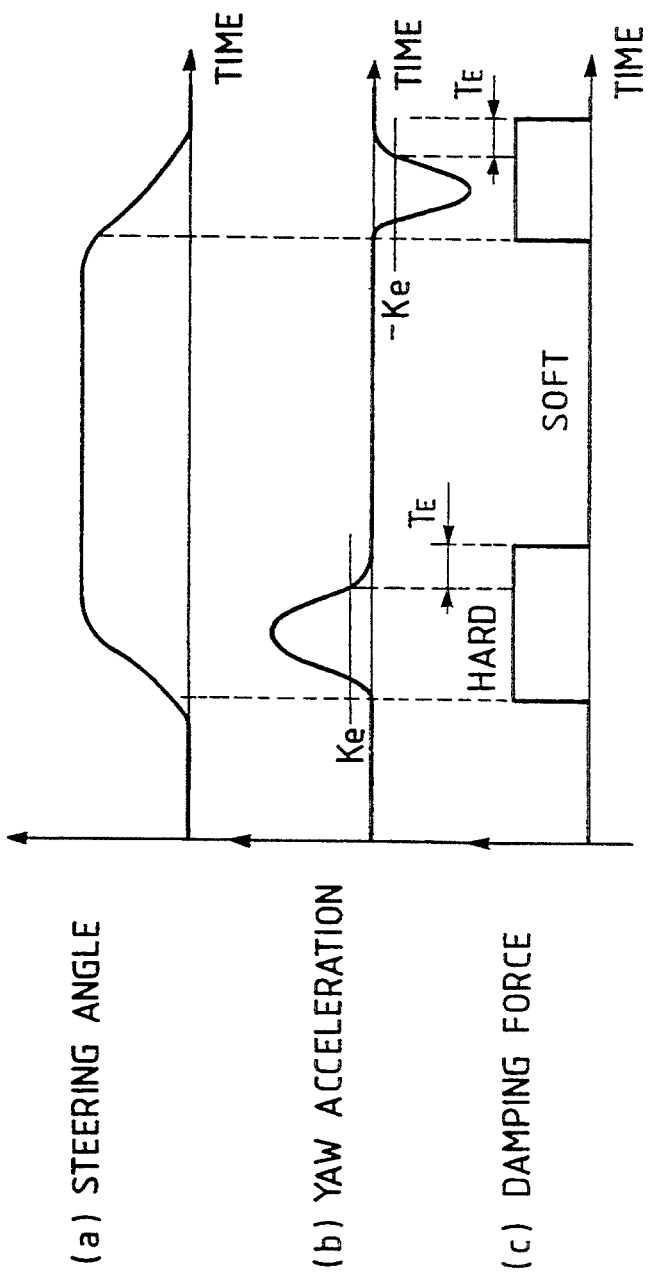
FIG. 63 is a diagram illustrating the operation of the twenty-fifth embodiment of the present invention.

In the twenty-fifth embodiment described above, as shown in FIG. 63, from the map of the steering angle $\theta$ and the vehicle speed $V_B$, the damping force of the shock absorber is set to the hard state. Thereafter, the yaw acceleration dY estimated by the right and left wheel speeds becomes equal to the predetermined level $K_e$, and when the delay time has expired since then, the damping force of the shock absorber is set to the soft state. It is, therefore, possible to control the roll caused by a steering operation so that the riding comfort is improved.

In the foregoing first to twenty-fifth embodiments, the output signals from the respective wheel speed sensors are processed in the microcomputer 16 to obtain variations of the wheel speeds, and based on the wheel speed variations, the road surface condition is detected to control the suspension. According to a twenty-sixth embodiment, however, the road surface condition is detected by the degree of periodic fluctuation of the output signals (output voltages) of the wheel speed sensors.

A description will be given of the principle of operation of the twenty-sixth embodiment.

When a vehicle is running on a road having an asphalt paving, it receives forces in vertical and horizontal directions due to the presence of a small roughness on the road. It became clear after the researches made by the present inventors that the following was caused by the presence of a roughness on a road surface.

(1) Due to a relative displacement between a sprung structure and an unsprung structure, the air-gap of a wheel speed sensor varies within a play in the bearing on an axle shaft so that the output voltage of the sensor is fluctuated.

(2) A bracket used for attaching the wheel speed sensor to the knuckle portion of a suspension resonates with the unsprung vibration so that the output voltage of the sensor is fluctuated.

It appears clear from the foregoing findings that by observing fluctuations in the output of the wheel speed sensor, it becomes possible to determine the road surface condition.

Figure 64:
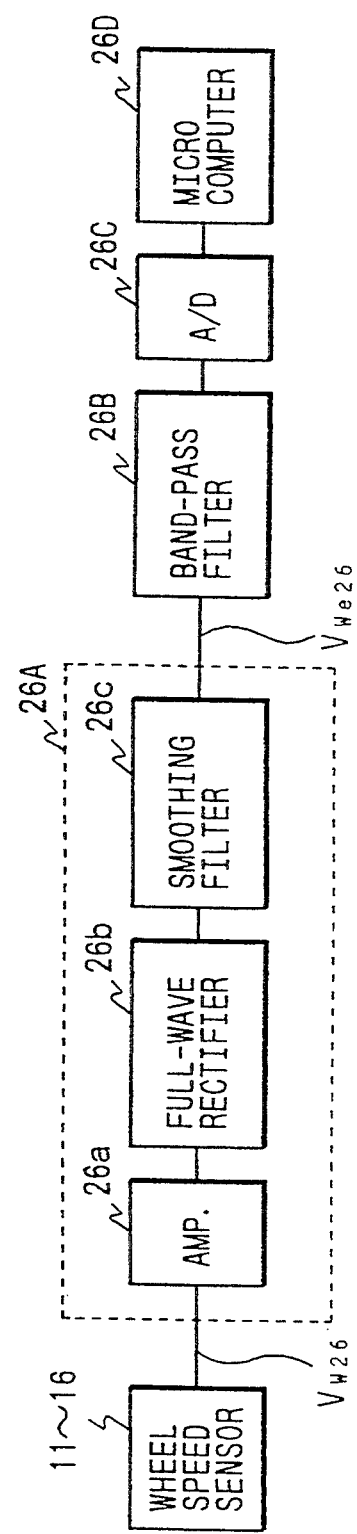
FIG. 64 is a block diagram showing the general construction of a twenty-sixth preferred embodiment of the present invention.

As shown in FIG. 64, a suspension control system according to the twenty-sixth embodiment generally comprises four wheel speed sensors 11, 12, 13 and 14, a periodically fluctuating component extracting means or unit 26A for extracting periodically fluctuating amplitude components $V_{We26}$ from the output signal $V_{W26}$, a resonance frequency band-pass filter 26B for extracting sprung resonance frequency components $V_{Wu26}$ and unsprung resonance frequency components $V_{Wl26}$ from the periodically fluctuating components $V_{We26}$, an analog-to-digital (A/D) converter 26C for digitizing the sprung resonance frequency components $V_{Wu26}$ and unsprung resonance frequency components $V_{Wl26}$, and a microcomputer 26D for inputting the output signal from the A/D converter 26C and detecting the road surface condition. The periodically fluctuating component extracting unit 26A includes an amplifier 26a for amplifying the output voltage signal $V_{W26}$, a full-wave rectifier 26b for extracting absolute value components of the signal amplified by the amplifier 26a, and a smoothing filter 26c for smoothing the absolute value components extracted by the full-wave rectifier 26b and thus extracting the periodically fluctuating components $V_{We26}$.

Figure 65:
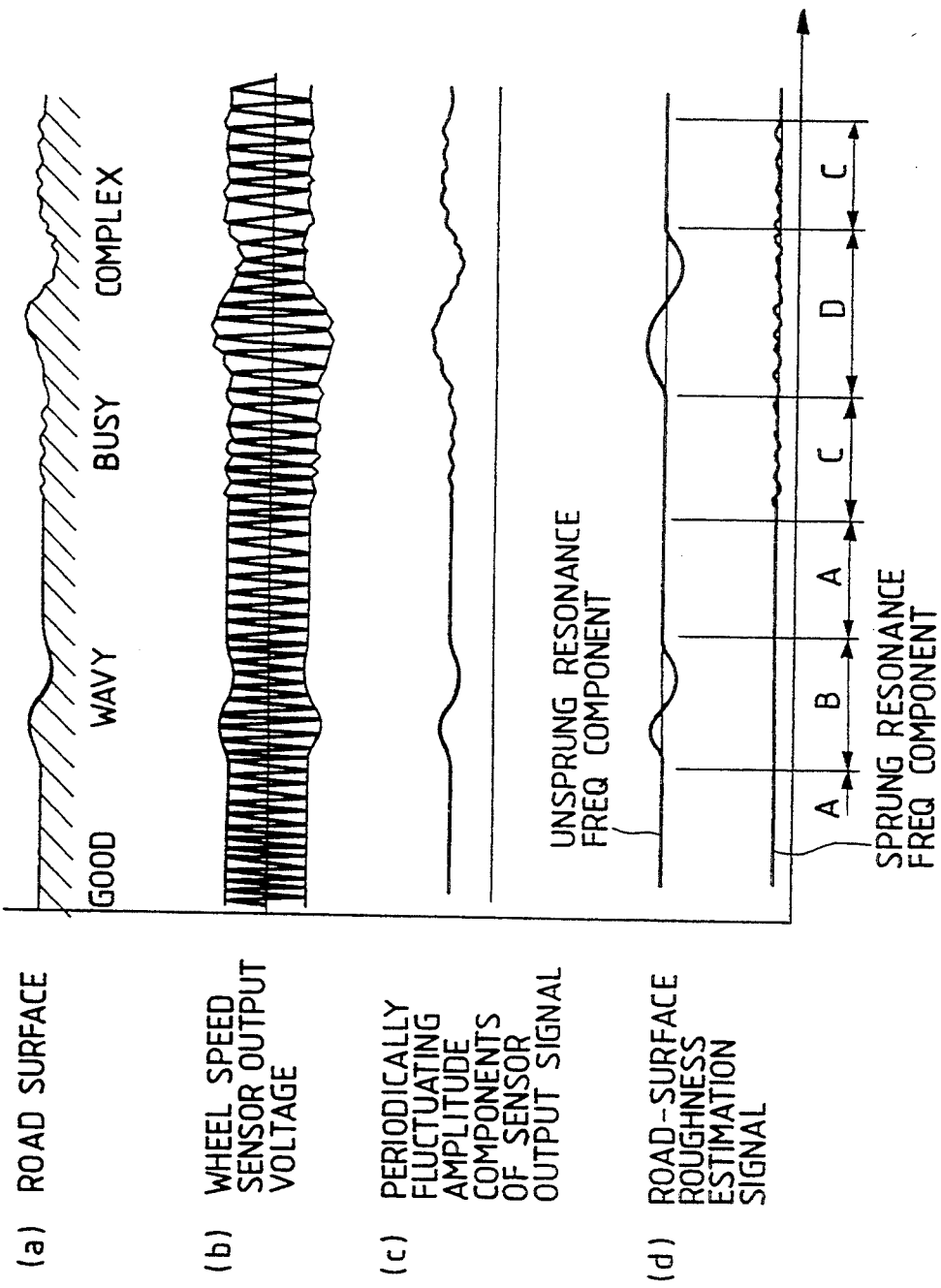
FIG. 65 is a diagram illustrating the operation of the twenty-sixth embodiment of the present invention.

FIG. 65 shows waveforms of a wheel speed signal outputted from a wheel speed sensor when a vehicle is running on a road having different grades of road surface conditions, a periodically fluctuating component $V_{We26}$ signal, a sprung resonance frequency component $V_{Wu26}$ signal, and an unsprung resonance frequency component $V_{Wl26}$ signal. As is apparent from FIG. 65, when the vehicle is running on a wavy road or a complex road, sprung vibrations will occur and the intensity of the sprung resonance frequency component $V_{Wu26}$ signal becomes great. On the other hand, when the vehicle is running on a busy road or the complex road, unsprung vibrations will occur and the intensity of the unsprung resonance frequency component $V_{Wl26}$ signal becomes great. Thus, when the sprung resonance frequency component $V_{Wu26}$ signal and the unsprung resonances frequency component $V_{Wl26}$ signal are combined, it is possible to discerning the different grades of road surface conditions, as shown in FIG. 66.

Figures 66, 67:
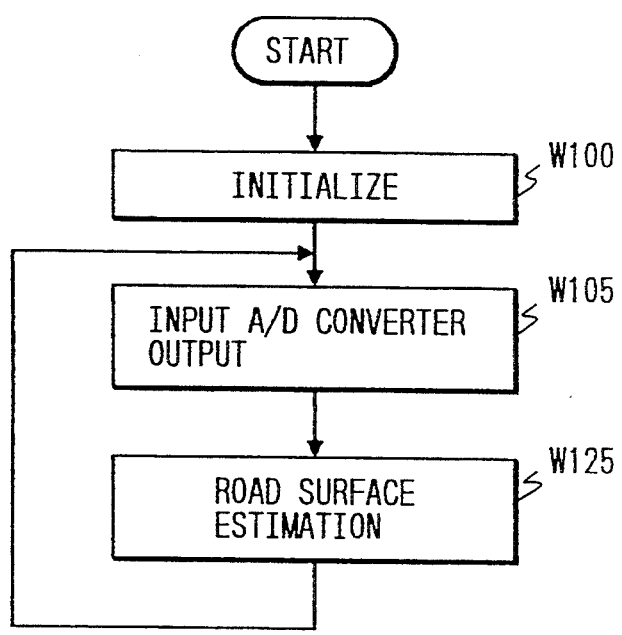
FIG. 66 is a map used for judging the road surface condition from a sprung resonance frequency component and an unsprung resonance frequency component.
FIG. 67 is a flowchart illustrating the operation of the twenty-sixth preferred embodiment of the present invention.

FIG. 67 is a flowchart illustrating a control procedure or routine executed in the microcomputer 26D. At first, the microcomputer 26D executes initialization at step W100. Then, digital signals converted by the A/D converter 26C are inputted at step W105. Subsequently, at step W125, a digitized sprung resonance frequency component $V_{Wu26}$ signal and a digitized unsprung resonance frequency component $V_{Wl26}$ signal are compared with a judgment level, so that it is possible to discriminate different grades of road surface conditions (good or flat road, wavy road, busy road and complex road).

Figure 68:
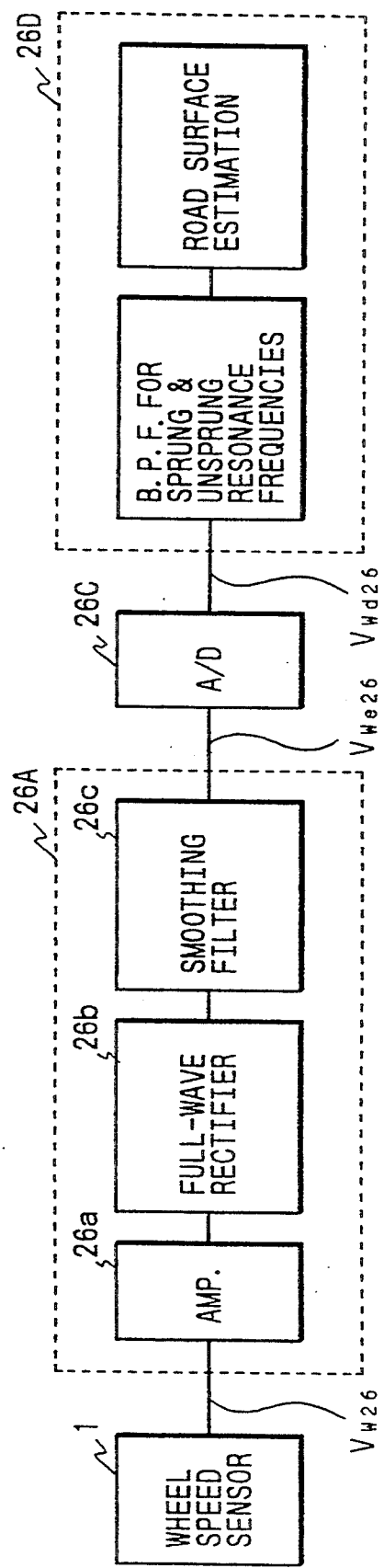
FIG. 68 is a block diagram showing the general construction of a twenty-seventh preferred embodiment of the present invention.
Figure 69:
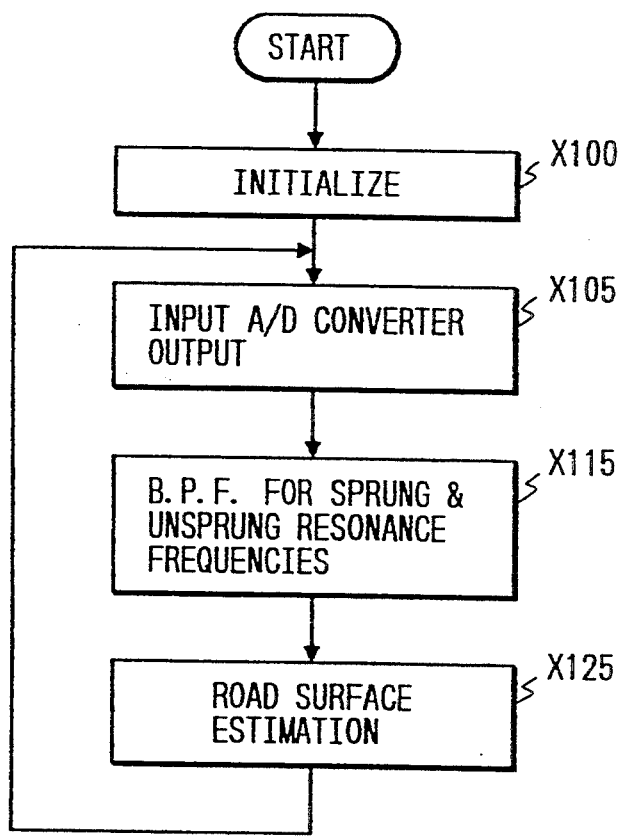
FIG. 69 is a flowchart illustrating the operation of the twenty-seventh embodiment of the present invention.

A description will be given below of a twenty-seventh preferred embodiment of the present invention. As shown in FIG. 68, this embodiment differs from the foregoing twenty-sixth embodiment in that the periodically fluctuating component $V_{Wd26}$ signal is converted by an A/D converter 26C into a digital signal which in turn is inputted into the microcomputer 26d. Then, sprung resonance frequency component $V_{Wu26}$ signal and unsprung and resonance frequency component $V_{Wl26}$ signal are extracted through a data processing operation executed under the control of software used in the microcomputer 26D. FIG. 69 is a flowchart showing the control operation executed in the microcomputer 26D. At step X100, the microcomputer executes initialization. Then, at step X105, a digital signal $V_{Wd26}$ converted by the A/D converter 26C is inputted to the microcomputer 26D. Subsequently at step X115, the digital signal $V_{Wd26}$ is subjected to a band-pass filtering process using a band-pass filter which passes only those components having frequencies around the sprung resonance frequency and the unsprung resonance frequency, so that a sprung resonance frequency component $V_{Wu26}$ signal and an unsprung resonance frequency component $V_{Wl26}$ signal are computed. Thereafter, step X125 executes the same procedure as the step W125, so that the road surface condition is determined.

The foregoing twenty-sixth and twenty-seventh embodiments may be modified in the manner described below.

(1) Two or more judgment levels can be used.

(2) In place of a stepwise discrimination of the road surface condition made between the wavy road, busy road, complex road and good (flat) road, an appropriate mapping operation may be employed to estimate the road surface conditions in terms of a continuously varying level.

(3) The unsprung resonance frequency component $V_{Wl26}$ may be converted into a signal of the nature obtained after a full-wave rectification and smoothing, and on the basis of the thus converted signal, a judgment on the road surface condition is achieved.

(4) When a wheel speed sensor of the type having an electromagnetic pickup coil is used, a fluctuation of the output signal may occur due to a reason other than the presence of a roughness on the road surface. This is because, due to the eccentricity between the electromagnetic pickup and a rotor, an air gap varies in synchronism with the rotation of the associated wheel with the result that the output voltage signal fluctuates. In order to separate fluctuations of the output voltage caused by the eccentricity from those caused by the irregularities on the road surface, a judgment is achieved in accordance with the following equation (18). These periodically fluctuating components which meets the equation (18) are decided as caused by the eccentricity and thus removed by a band-elimination filter, for example.

$$f_z = V/2\pi r \quad (18)$$

where fz is the output fluctuating frequency caused by the eccentricity, r is the radius of tires, and V is the vehicle speed.

The wheel speed sensor may be of the type having an electromagnetic pickup coil or a Hall element, or alternatively of the type which detects a change in the magnetic resistance. Irrespective of the type of detection element used, a satisfactory wheel speed sensor is of the electromagnetic type having an air gap and constructed to output a signal corresponding to an angular velocity or an angle of rotation of the wheel.

(5) The road surface condition may be judged on the basis of the sprung resonance frequency component $V_{Wu26}$ or the unsprung resonance frequency component $V_{W126}$.

The first to twenty-seventh preferred embodiments of the present invention have been described. The present invention, however, is not limited to the specifically described embodiments, and variations and modifications may be made without departing from the scope of the present invention. Typical examples of such modifications are as follows.

(1) The shock absorber having plural modes defining the switchable levels of damping force may be of the construction in which the damping force is switchable either stepwise or linearly.

(2) In order to change the stiffness of the suspension, the spring constant of a spring and/or the stiffness of a stabilizer may be changed simultaneously with the switching of the damping force of the shock absorber.

(3) The signals which are used as representing sprung information and unsprung information may be a wheel speed signal or a wheel acceleration signal.

(4) The amount of variance or fluctuation of the wheel speed increases with an increase in the vehicle speed. Since the sprung vibration estimation signal $V_{US}$ is obtained by filtering fluctuating components of the wheel speed, the thus obtained sprung vibration estimation signal $V_{US}$, as against the actual sprung vibration, has a tendency to increase with the vehicle speed. In order to rectify the tendency, the long-term vibration judgment level is increased with an increase in the vehicle speed.

(5) In order to rectify the tendency described at the preceding paragraph (4), the sprung vibration estimation signal $V_{US}$ may be corrected with a correction coefficient which is set to decrease with an increase in the vehicle speed. The sprung vibration estimated signal $VU_S$ when corrected with the correction coefficient is no longer possible to exceed the actual sprung vibration when the vehicle is running at a high speed.

(6) In general, so far as the drive wheels are concerned, fluctuating components of the torque of an engine or a transmission system are superimposed on fluctuating components of the wheel speed. In addition, the drive wheel might slip on such a road surface which has a low friction coefficient or can provide only a low road holding characteristic between itself and tires. With this difficulty in view, the wheel speed which is used for estimating the sprung vibration is represented by the wheel speed of a wheel other than drive wheels or a wheel supplying a smaller driving power.

What is claimed is:

1. A suspension control system for controlling a suspension of an automotive vehicle, said suspension control system comprising:
   wheel speed detection means for detecting a wheel speed of the vehicle;
   extraction means for extracting at least one of a sprung resonance frequency component of the suspension and an unsprung resonance frequency component of the suspension that are contained in a wheel speed signal detected by said wheel speed detection means; and
   altering means for altering the stiffness of the suspension on the basis of said at least one resonance frequency component.

2. A suspension control system according to claim 1, wherein said extraction means is a band-pass filter.

3. A suspension control system according to claim 1, wherein said extraction means comprises a band-pass filter which passes said first resonance frequency component which has frequencies between 0.5 Hz and 3.0 Hz.

4. A suspension control system according to claim 1, wherein said extraction means comprises a band-pass filter which passes said second resonance frequency component which has frequencies between 10 Hz and 15 Hz.

5. A suspension control system according to claim 1, wherein said altering means compares said at least one resonance frequency component extracted by said extraction means, with a reference value and alters the stiffness of the suspension according to a comparison result.

6. A suspension control system according to claim 5, wherein said altering means alters the stiffness of the suspension to an increased level when a frequency of said at least one resonance frequency component exceeds said reference value.

7. A suspension control system according to claim 6, further including a timer means which sets a predetermined period of time when said altering means alters the stiffness of the suspension to said increased level.

8. A suspension control system according to claim 5, further including running condition computing means for computing a running condition of the vehicle including a vehicle speed, a steering angle and a longitudinal acceleration/deceleration, on the basis of said wheel speed detected by said wheel speed detection means, wherein said altering means includes reference-value change means for changing said reference value in accordance with said running condition computed by said running condition computing means.

9. A suspension control system according to claim 8, wherein said reference-value change means comprises a map.

10. A suspension control system according to claim 1, further including vehicle speed computing means for computing an estimated vehicle speed of the vehicle on the basis of the wheel speed detected by said wheel speed detection means, and different speed computing means for computing a speed difference between the wheel speed detected by said wheel speed detection means and the vehicle speed computed by said vehicle speed computing means, wherein said extraction means extracts said at least one resonance frequency component from a speed difference signal generated from said speed difference computing means, for estimating a sprung or an unsprung resonance of the suspension.

11. A suspension control system according to claim 10, wherein said extraction means comprises a band-pass filter which passes said first resonance frequency component which has frequencies between 1.0 Hz and 2.0 Hz.

12. A suspension control system according to claim 10, wherein said extraction means comprises a band-pass filter which passes said second resonance frequency component which has frequencies between 10 Hz and 15 Hz.

13. A suspension control system according to claim 10, wherein said at least one resonance frequency component is said first resonance frequency component, and wherein said altering means alters the stiffness of the suspension to a decreased level when said first resonance frequency component is less than said reference value.

14. A suspension control system according to claim 1, further including wheel acceleration computing means for computing a wheel acceleration of the vehicle on the bases of said wheel speed detected by said wheel speed detection means, wherein said extraction means extracts said at least one resonance frequency component from a wheel acceleration signal generated from said wheel acceleration computing means for estimating a sprung or an unsprung resonance of the suspension.

15. A suspension control system according to claim 14, wherein said extraction means comprises a band-pass filter which passes said first resonance frequency component which has frequencies between 1.0 Hz and 2.0 Hz.

16. A suspension control system according to claim 14, wherein said extraction means comprises a band-pass filter which passes said second resonance frequency component which has frequencies between 10 Hz and 15 Hz.

17. A suspension control system according to claim 14, wherein said extraction means comprises a band-pass filter which passes said second resonance frequency component which has frequencies between 1.0 Hz and 20 Hz.

18. A suspension control system according to claim 14, wherein said extraction means comprises a band-pass filter which passes said second resonance frequency component which has frequencies between 3.0 Hz and 20 Hz.

19. A suspension control system according to claim 14, wherein said extraction means comprises a low-pass filter which passes frequency components of said wheel acceleration signal which have frequencies less than 20 Hz, wherein said altering means compares said at least one resonance frequency component with a reference value and alters the stiffness of the suspension to an increased level when the frequency of said at least one resonance component exceeds said reference value, and further including correction means, coupled with said altering means, for correcting the stiffness of the suspension so that when said altering means alters the stiffness of the suspension to said increased level, if a predetermined condition provided for detecting the occurrence of a small acceleration/deceleration is satisfied, the stiffness of the suspension is altered to a decreased level.

20. A suspension control system according to claim 1, further including processing means for estimating a long-term vibration of the vehicle and a road surface condition on which the vehicle is running, on the basis of the wheel speed, said sprung resonance frequency component, and said unsprung resonance frequency component, and combining the estimated long term vibration and the estimated road surface condition for setting a proper stiffness of the suspension.

21. A suspension control system according to claim 20, wherein said processing means including:
first means for computing an estimated vehicle speed on the basis of said wheel speed detected by said wheel speed detection means;
second means for computing an sprung vibration estimation signal on the basis of said wheel speed detected by said wheel speed detection means, said second means including a first filter which passes said sprung resonance frequency component contained said wheel speed signal detected by said wheel speed detection means;
third means for computing a wheel acceleration on the basis of said wheel speed detected by said wheel speed detection means;
fourth means for computing a filtered wheel acceleration on the basis of said wheel acceleration computed by said third means, said fourth means including a second filter which passes frequency components having frequencies at least the same as a frequency of said unsprung resonance frequency component;
fifth means for computing a filtered wheel acceleration absolute value on the basis of said filtered wheel acceleration, and a road surface condition signal on the basis of said filtered wheel acceleration absolute value;
sixth means for determining whether or not said sprung vibration estimation signal exceeds a first level range provided for detecting the degree of a long-term vibration of the vehicle and for outputting a first determination result;
seventh means for determining whether or not said road surface condition signal exceeds a second level range provided for detecting the degree of roughness of the road surface on which the vehicle is running and for outputting a second determination result; and
eighth means for setting a proper damping force for the suspension on the basis of said first and second determination results.

22. A suspension control system according to claim 21, wherein said first filter is a band-pass filter which passes frequency components having frequencies between 1.0 Hz and 2.0 Hz, and said filter is a low-pass filter which passes frequency components having frequencies less than 20 Hz.

23. A suspension control system according to claim 21, wherein said first filter is a band-pass filter which passes frequency components having frequencies between 1.0 Hz and 2.0 Hz, and said second filter is a band-pass filter which passes frequency components having frequencies between 1 Hz and 20 Hz.

24. A suspension control system according to claim 21 wherein said eight means including a map.

25. A suspension control system according to claim 21, further including ninth means for detemining whether or not the vehicle is in accelerated/decelerated condition and for outputting a determination result, and tenth means for changing the characteristic of said first filter when said ninth means determines that the vehicle is in accelerated/decelarated condition.

26. A suspension control system according to claim 25, wherein said ninth means outputs said determination result on the basis of said wheel speed, said wheel acceleration, or a longitudinal vehicle acceleration computed from said wheel acceleration.

27. A suspension control system according to claim 25, wherein said tenth means increases a cut-off frequency of said first filter.

28. A suspension control system according to claim 20, wherein said processing means including:
first means for computing an estimated vehicle speed on the basis of said wheel speed detected by said wheel speed detection means;
second means for computing an sprung vibration estimation signal on the basis of said wheel speed detected by said wheel speed detection means, said second means including a first filter which passes said sprung resonance frequency component contained said wheel speed signal detected by said wheel speed detection means;

third means for computing a wheel acceleration on the basis of said wheel speed detected by said wheel speed detection means;

fourth means for computing a filtered wheel acceleration on the basis of said wheel acceleration computed by said third means, said fourth means including a second filter which passes frequency components having frequencies at least the same as a frequency of said unsprung resonance frequency component;

fifth means for computing a filtered wheel acceleration absolute value on the basis of said filtered wheel acceleration, and a road surface condition signal on the basis of said filtered wheel acceleration absolute value;

sixth means for determining whether or not the vehicle is in accelerated/decelerated condition;

seventh means for computing a correction coefficient when said sixth means determines that the vehicle is in accelerated/decelerated condition;

eighth means for correcting said sprung vibration estimation signal with said correction coefficient and thereby computing a corrected sprung vibration estimation signal;

ninth means for determining whether or not said corrected sprung vibration estimation signal exceeds a first level range provided for detecting the degree of a long-term vibration of the vehicle and for outputting a first determination result;

tenth means for determining whether or not said road surface condition signal exceeds a second level range provided for detecting the degree of roughness of the road surface on which the vehicle is running and for outputting a second determination result; and eleventh means for setting a proper damping force for the suspension on the basis of said first and second determination results.

29. A suspension control system according to claim 28, wherein said six means outputs a determination result on the basis of said wheel speed, said wheel acceleration, or a longitudinal vehicle acceleration computed from said wheel acceleration.

30. A suspension control system according to claim 28, wherein said seventh means computes said correction coefficient from said wheel acceleration, a longitudinal vehicle acceleration computed on the basis of said wheel acceleration, or a variation of said longitudinal vehicle acceleration.

31. A suspension control system according to claim 28, wherein said seventh means computes said correction coefficient from a map.

32. A suspension control system according to claim 21, wherein said second level range used in determination by said seventh means is composed of a plurality of judgment levels corresponding to different degrees of roughness of the road surface, a plurality of judgment return levels each corresponding to one of said judgment levels, and further including means for setting a plurality of delay times each corresponding to one of said levels, said delay times increasing with an increase in the roughness on the road surface.

33. A suspension control system according to claim 32, wherein said judgment levels, judgment return levels are provided in the form of maps in which said judgment levels and said judgment return level are function to a vehicle speed.

34. A suspension control system according to claim 21, wherein said delay times are provided in the form of maps in which said delay times are function to a vehicle speed.

35. A suspension control system according to claim 21, further including means for correcting the characteristic of said first filter on the basis of said road surface condition signal computed by said fifth means before said second means computes said sprung vibration estimation signal.

36. A suspension control system according to claim 21, further including means for computing a correction coefficient on the basis of said road surface condition signal computed by said fifth means, and means for correcting said sprung vibration estimation signal computed by said second means before said sixth means determines the degree of the long-term vibration.

37. A suspension control system according to claim 36, wherein said means for computing said correction coefficient is a map in which said correction coefficient is functional to a vehicle speed.

38. A suspension control system according to claim 37, wherein said map is provided for each of different degrees of roughness of the roads.

39. A suspension control system according to claim 32, wherein said delay times are provided in the form of maps in which said delay times are correlated to said road surface condition signal computed by said fifth means, said delay times increasing with an increase in the intensity of said road surface condition signal.

40. A suspension control system according to claim 21, wherein said first level range comprises a plurality of threshold levels, said threshold levels being corrected on the basis of said road surface condition signal before said sixth means determines the degree of the long-term vibration.

41. A suspension control system according to claim 21, further including means for generating a running attitude signal representing an attitude or position of the vehicle including at least one of diving, squat, roll, means for determining whether or not said running attitude signal exceeds a predetermined level range and for outputting a third determination result, means for determining an attitude of the vehicle on the basis of said second determination result and said third determination result and for outputting a fourth determination result to said eight means for setting a proper damping force for the suspension.

42. A suspension control system according to claim 41, wherein said means for determining an attitude of the vehicle determine the attitude on the basis of a larger one of said second determination result and said third determination result.

43. A suspension control system according to claim 42, wherein said predetermined level range being defined by a pair of threshold levels, further including attitude judgment basic level computing means for computing a pair of attitude judgment basic levels used for correcting said threshold levels, correction coefficient computing means for computing a pair of correction coefficients used for correcting said threshold levels, and correction mans for correcting said threshold levels with said attitude judgment basic levels and said correction coefficients before said means for determining an attitude of the vehicle determines the attitude of the vehicle, wherein said attitude judgment basic levels are variable with said estimated vehicle speed, and said correction coefficients are variable with said road surface condition signal.

44. A suspension control system according to claim 42, wherein said attitude judgment basic levels are determined from a map, and said correction coefficients are determined by a map.

45. A suspension control system according to claim 1, wherein said suspension includes a shock absorber provided each of two front wheels and two rear wheels of the vehicle, said shock absorber has plural modes defining switchable levels of damping force including at least a hard level and a soft level, and said wheel speed detection means is provided for each of the four wheels, and wherein said suspension control system further comprises switch means for temporarily switching the damping force of the shock absorber provided for one of the rear wheel to the soft level when a bump or a step on a road surface on which the vehicle is running is detected by a change in said wheel speed of the front wheel corresponding to said one rear wheel.

46. A suspension control system according to claim 45, wherein said switch means includes:

first computing means for computing a road surface condition signal on the basis of said wheel speed detected by said wheel speed detection means, said road surface condition signal being computed by first computing a wheel acceleration on the basis of said wheel speed, then computing a filtered wheel acceleration by filtering said wheel acceleration with a filter means which passes frequency components having frequencies around said unsprung resonance frequency of the suspension, subsequently computing a filtered wheel acceleration absolute value on the basis of said filtered wheel acceleration, and finally smoothing said filtered wheel acceleration absolute value; and first determining means, coupled to said first computing means and said altering means, for determining whether or not said road surface condition signal regarding at least one of two front wheels exceeds a threshold level provided for detecting the presence of a bump or a step on the road surface, wherein said altering means alters said the damping force level of a rear wheel on the same side as said one front wheel to the soft level when said determining manes that said road surface condition signal exceeds said predetermined threshold level.

47. A suspension control system according to claim 46, wherein said switch means further includes:

second determining means, coupled to said altering means, for determining whether or not a predetermined first time period TD has passed after said road surface condition signal exceeds said predetermined threshold level, said predetermined first time TD being provided for detecting the arrival of said rear wheel at the bump or step on the road surface;

third determining means, coupled to said second determining means and said altering means, for determining whether or not a predetermined second time period TB has passed after said first time period expires, wherein said altering means delays its operation needed for altering the damping force of the shock absorber for said rear wheel to the soft level until an elapse of said first time period, and wherein said altering means continuously keeps the damping force of the shock absorber to the soft level until an elaspse of said second time period.

48. A suspension control system according to claim 47, wherein said switch means further includes second computing means for computing an estimated vehicle speed $V_B$ on the basis of said wheel speed, and wherein said first time period TD is determined by $TD = W/V_B$ where $W$ = wheel base of the vehicle.

49. A suspension control system according to claim 1, wherein said suspension includes a shock absorber provided for each of two front wheels and two rear wheels of the vehicle, said shock absorber has plural modes defining switchable levels of damping force including at least a hard level and a soft level, and said wheel speed detection means is provided for each of the four wheels, and wherein said suspension control system further comprises:

signal generation means for generating a signal indicative of a longitudinal behavior of the vehicle which will occur when the vehicle is in accelerated/decelerated condition;

processing means for estimating a vehicle speed and a long-term vibration of the vehicle on the basis of the wheel speed and said sprung resonance frequency component; and longitudinal vehicle behavior judgment means, coupled to said signal generation means and said processing means, for judging whether or not said estimated long-term vibration exceeds a predetermined level range in the absence of said signal from said signal generation means, and wherein said altering means alters the damping force of the shock absorber to the high level when said longitudinal vehicle behavior judgement means judges that said estimated long-term vibration exceeds said predetermined level range in the absence of said signal from said signal generating means.

50. A suspension control system according to claim 1, wherein said suspension includes a shock absorber provided for each of two front wheels and two rear wheels of the vehicle, said shock absorber has plural modes defining switchable levels of damping force including at least a hard level and a soft level, and said wheel speed detection means is provided for each of the four wheels, and wherein said suspension control system further comprises:

signal generation means for generating a signal indicative of a sign of the occurrence a longitudinal behavior the vehicle;

processing means for estimating a vehicle speed and a long-term vibration of the vehicle on the basis of the wheel speed and said sprung resonance frequency component;

longitudinal vehicle behavior judgment means, coupled to said signal generation means and said processing means, for judging whether or not said estimated long-term vibration exceeds a predetermined level range in the absence of said signal from said signal generation means;

long-term vibration judgment inhibiting means, coupled to said signal generation means and said judgment means for inhibiting said judgment means form judging so long as said signal from said signal generation means continues, and wherein said altering means alters the damping force of the shock absorber to the high level when said longitudinal vehicle behavior judgment means judges that said estimated long-term vibration exceeds said predetermined level range in the absence of said signal from said signal generating means.

51. A suspension control system according to claim 1, wherein said vehicle has four wheels including left and right front wheels and left and right rear wheels, said suspension includes four shock absorbers provided one for each of said four wheels, each of the shock absorbers has plural modes defining switchable levels of damping force including at least a hard level and a soft level, and said wheel speed detection means is provided for each of the four wheels and generates a wheel speed signal for each respective wheel, and wherein said suspension control system further comprises:

speed difference computing means for computing a speed difference between a left wheel speed signal and a right wheel speed signal detected by said wheel speed detection means;

filtered speed difference computing means, coupled to said speed difference computing means, for computing a filtered speed difference by filtering said speed difference with a band-pass filter which passes said sprung resonance frequency component, said band-pass filter forming said extraction means;

determining means, coupled to said filtered speed difference computing means and said altering means, for determining whether or not said filtered speed difference exceeds a predetermined level range and for outputting a determination result to said altering means, wherein said altering means alters the damping forces of two shock absorbers associated with two damping wheels or two rear wheels to the hard level when said determining means determines that said filtered speed difference exceeds said predetermined level range.

52. A suspension control system according to claim 51, wherein said predetermined level range is defined by two threshold levels which increase with a vehicle speed.

53. A suspension control system according to claim 52, wherein said predetermined level range is determined by a map.

54. A suspension control system according to claim 1, wherein said vehicle has four wheels including left and right front wheels and left and right rear wheels, said suspension includes four shock absorbers provided one for each of said four wheels, each of the shock absorbers has plural modes defining switchable levels of damping force including at least a hard level and a soft level, and said wheel speed detection means is provided for each of the four wheels and generates a wheel speed signal for each respective wheel, and wherein said suspension control system further comprises:

reading a left wheel speed and a right wheel speed detected by said wheel speed detecting means;

first computing means for computing a steering angle on the basis of said left wheel speed and right wheel speed detected by said wheel speed detection means;

second computing means for computing a vehicle speed on the basis of said left wheel speed and left wheel speed detected by said wheel speed detecting means;

third computing means for computing a yaw acceleration on the basis of a speed difference between said left wheel speed and said right wheel speed detected by said wheel speed detection means;

first determining means for determining whether or not a first value is greater than a predetermined threshold level and for outputting a first determination result, said first value being determined by said vehicle speed and said steering angle; and second determining means for determining whether or not said yaw acceleration exceeds a predetermined levle and for outputting a second determination result, wherein said altering means alters the damping force of two shock absorbers associated with two front wheels to the hard level when said first determining means determines that said first value exceeds said threshold level, and when said second determining means determines that said yaw acceleration exceeds said predetermined level.

55. A suspension control system according to claim 1, wherein said wheel speed detection means comprises an electromagnetic sensor producing an output voltage signal proportional to the wheel speed, wherein said suspension control system further comprises means, operatively connected with said magnetic sensor, for discerning different grades of road surface conditions on the basis of periodical changes in the output voltage of said magnetic sensor.

56. A suspension control system according to claim 55, wherein said discerning means comprises a periodically fluctuating component extracting means for extracting periodically fluctuating amplitude components from the output voltage signal of said electromagnetic sensor, a resonance frequency band-pass filter for extracting said sprung resonance frequency components and said unsprung resonance frequency components from the periodically fluctuating components of said output voltage signal, an analog-to-digital (A/D) converter for digitizing the sprung resonance frequency components and unsprung resonance frequency components, and a microcomputer for inputting the output signal from said A/D converter and for detecting a condition of a road surface on which the vehicle is running, said microcomputer having a judgement level stored therein and compares said sprung resonance frequency components and said unsprung resonance frequency components with said judgment level to determine the condition of the road surface.

57. A suspension control system according to claim 56, wherein said periodically fluctuating component extracting means includes an amplifier for amplifying the output voltage signal of said electromagnetic sensor, a full-wave rectifier for extracting absolute value components of the signal amplified by said amplifier, and a smoothing filter for smoothing the absolute value components extracted by said full-wave rectifier and thus extracting said periodically fluctuating components.

58. A suspension control system according to claim 55, wherein said discerning means comprises a periodically fluctuating component extracting means for extracting periodically fluctuating amplitude components from the output voltage signal of said electromagnetic sensor, an analog-to-digital (A/D) converter for digitizing said periodically fluctuating amplitude components received from said periodically fluctuating component extracting means, and a microcomputer for inputting the output signal from said A/D converter and for detecting a condition of a road surface on which the vehicle is running, said microcomputer performing a band-pass filtering process for extracting said sprung resonance frequency components and said unsprung resonance frequency components, and subsequently comparing said sprung resonance frequency components and said unsprung resonance frequency components with a judgment level stored therein to determine the condition of the road surface.

59. A suspension control system according to claim 58, wherein said periodically fluctuating component extracting means includes an amplifier for amplifying the output voltage signal of said electromagnetic sensor, a full-wave rectifier for extracting absolute value components of the signal amplified by said amplifier, and a smoothing filter for smoothing the absolute value components extracted by said full-wave rectifier and thus extracting said periodically fluctuating components.

60. A suspension control system for controlling a suspension of an automotive vehicle, said suspension control system comprising:

wheel speed detection means for detecting a wheel speed of the vehicle;

extraction means for extracting at least one of a sprung resonance frequency component of the suspension and an unsprung resonance frequency component of the suspension that are contained in a wheel speed signal detected by said wheel speed detection means;

altering means for altering the stiffness of the suspension on the basis of said at least one resonance frequency component; and processing means for estimating a long-term vibration of the vehicle and a road surface condition on which the vehicle is running on the basis of the wheel speed, said sprung resonance frequency component, and said unsprung resonance frequency component, and combining the estimated long term vibration and the estimated road surface condition for setting a proper stiffness of the suspension, wherein said processing means includes:

first means for computing an estimated vehicle speed on the basis of said wheel speed detected by said wheel speed detection means;

second means for computing a sprung vibration estimation signal on the basis of said wheel speed detected by said wheel speed detection means, said second means including a first filter which passes said sprung resonance frequency component contained said wheel speed signal detected by said wheel speed detection means;

third means for computing a wheel acceleration on the basis of said wheel speed detected by said wheel speed detection means;

fourth means for computing a filtered wheel acceleration on the basis of said wheel acceleration computed by said third means, said fourth means including a second filter which passes frequency components having frequencies at least the same as a frequency of said unsprung resonance frequency component;

fifth means for computing a fitered wheel acceleration absolute value on the basis of said filtered wheel acceleration, and a road surface condition signal on the basis of said filtered wheel acceleration absolute value;

sixth means for determining whether or not said sprung vibration estimation signal exceeds a first level range provided for detecting the degree of a long-term vibration of the vehicle and for outputting a first determination result;

seventh means for determining whether or not said road surface condition signal exceeds a second level range provided for detecting the degree of roughness of the road surface on which the vehicle is running and for outputting a second determination result;

eighth means for setting a proper damping force for the suspension on the basis of said first and second determination results;

ninth means for determining whether or not the vehicle is an accelerated/decelerated condition and for outputting a determination result; and tenth means for changing the characteristic of said first filter when said ninth means determines that the vehicle is in accelerated/decelerated condition, wherein said tenth means increases a cut-off frequency of said first filter.

61. A suspension control system for controlling a suspension of an automotive vehicle, said suspension control system comprising:

wheel speed detection means for detecting a wheel speed of the vehicle;

extraction means for extracting at least one of a sprung resonance frequency component of the suspension and an unsprung resonance frequency component of the suspension that are contained in a wheel speed signal detected by said wheel speed detection means;

altering means for altering the stiffness of the suspension on the basis of said at least one resonance frequency component; and processing means for estimating a long-term vibration of the vehicle and a road surface condition on which the vehicle is running on the basis of the wheel speed, said sprung resonance frequency component, and said unsprung resonsance frequency component, and combining the estimated long term vibration and the estimated road surface condition for setting a proper stiffness of the suspension, wherein said processing means includes:

first means for computing an estimated vehicle speed on the basis of said wheel speed detected by said wheel speed detection means;

second means for computing a sprung vibration estimation signal on the basis of said wheel speed detected by said wheel speed detection means, said second means including a first filter which passes said sprung resonance frequency component contained said wheel speed signal detected by said wheel speed detection means;

third means for computing a wheel acceleration on the basis of said wheel speed detected by said wheel speed detection means;

fourth means for computing a filtered wheel acceleration on the basis of said wheel acceleration computed by said third means, said fourth means including a second filter which passes frequency components having frequencies at least the same as a frequency of said unsprung resonance frequency component;

fifth means for computing a filtered wheel acceleration absolute value on the basis of said filtered wheel acceleration, and a road surface condition signal on the basis of said filtered wheel acceleration absolute value;

sixth means for determining whether or not said sprung vibration estimation signal exceeds a first level range provided for detecting the degree of a long-term vibration of the vehicle and for outputting a first determination result;

seventh means for determining whether or not said road surface condition signal exceeds a second level range provided for detecting the degree of roughness of the road surface on which the vehicle is running and for outputting a second determination result; and eighth means for setting a proper damping force for the suspension on the basis of said first and second determination results; and means for correcting the characteristic of said first filter on the basis of said road surface condition signal computed by said fifth means before said second means computes said sprung vibration estimation signal.

* * * * *